US007908835B2

(12) United States Patent
Bertino

(10) Patent No.: US 7,908,835 B2
(45) Date of Patent: Mar. 22, 2011

(54) GRAIN REAPER

(75) Inventor: Luiz Henrique Bertino, Pindorama (BR)

(73) Assignee: Industrias Reunidas Colombo Ltda., Pindorama (BR)

( * ) Notice: Subject to any disclaimer, the term of this patent is extended or adjusted under 35 U.S.C. 154(b) by 339 days.

(21) Appl. No.: 11/870,888

(22) Filed: Oct. 11, 2007

(65) Prior Publication Data

US 2008/0295476 A1 Dec. 4, 2008

(30) Foreign Application Priority Data

May 28, 2007 (BR) .................................... 0702108

(51) Int. Cl.
*A01D 41/00* (2006.01)
*A01F 12/00* (2006.01)
(52) U.S. Cl. .......................................... 56/122; 460/59
(58) Field of Classification Search .................. 460/59, 460/98, 142, 97, 111, 114, 119; 56/12.4, 56/14.3, 122
See application file for complete search history.

(56) References Cited

U.S. PATENT DOCUMENTS

| 134,114 | A | * | 12/1872 | Watkins ........................ 460/59 |
| 2,526,141 | A | * | 10/1950 | Knowiton ..................... 56/364 |
| 3,669,122 | A | * | 6/1972 | Rowland-Hill ................. 460/73 |
| 3,826,267 | A | * | 7/1974 | Scribner ........................ 460/142 |
| 4,761,051 | A | * | 8/1988 | Crespo et al. .................. 385/54 |
| 5,454,758 | A | * | 10/1995 | Tophinke et al. ............... 460/68 |
| 5,556,237 | A | * | 9/1996 | Rexius ............................ 406/32 |
| 6,701,701 | B2 | * | 3/2004 | Wigdahl et al. .................. 56/28 |
| 7,127,876 | B2 | * | 10/2006 | Ligouy ...................... 56/16.4 R |
| 2002/0151336 | A1 | * | 10/2002 | McLeod et al. ................. 460/12 |
| 2008/0261671 | A1 | * | 10/2008 | Stukenholtz et al. ......... 460/114 |

FOREIGN PATENT DOCUMENTS

| BR | 9202621-4 A | 7/1992 |
| BR | 9404196-2 A | 10/1994 |
| BR | 0404489-4 | 10/2004 |
| MU | 6600822 | 5/1986 |
| MU | 7101502 | 7/1991 |
| MU | 7801088-8 U | 6/1998 |
| MU | 7900686 | 4/1999 |
| MU | 8201891-0 | 8/2002 |
| MU | 8301200-1 | 7/2003 |
| MU | 8301613-9 | 7/2003 |

* cited by examiner

*Primary Examiner* — Thomas B Will
*Assistant Examiner* — Joan D Misa
(74) *Attorney, Agent, or Firm* — Patterson Thuente Christensen Pedersen P.A.

(57) ABSTRACT

A reaper of grains is for reaping bean grains that is classified as a trailer. More specifically, a bean reaper for carrying out two different operations, the first one of which is gathering various plants, such as bean plants, peanuts and other grains, which have been previously plucked and aligned, whereas the second function of which is to perform a whole cleaning process by separating the grains (seeds) from the remaining unwanted parts.

18 Claims, 55 Drawing Sheets

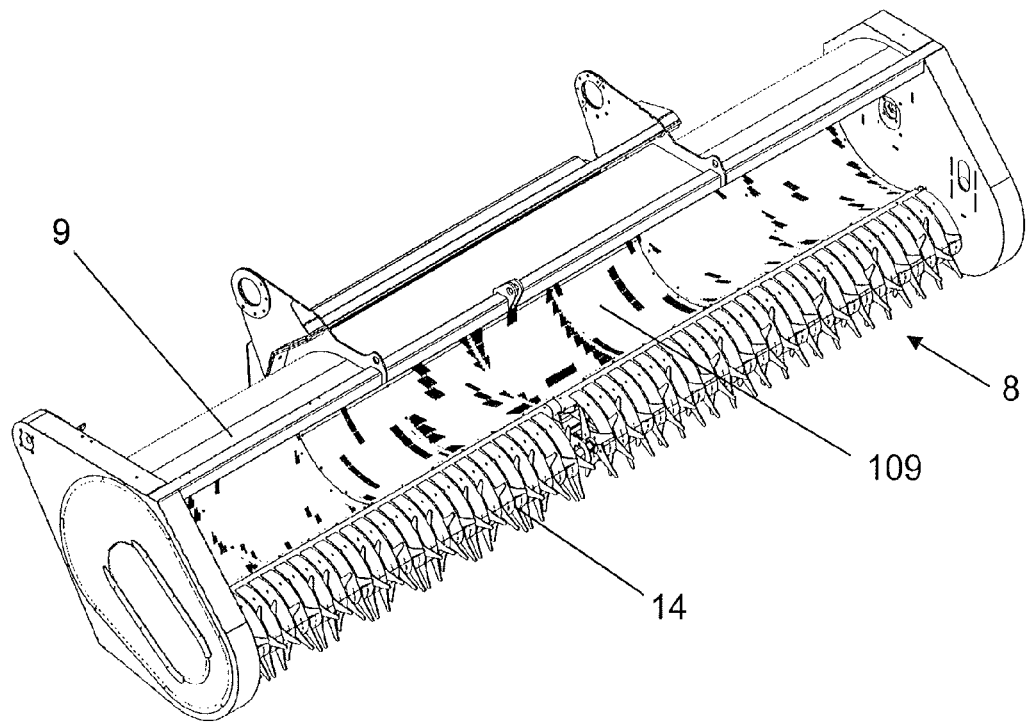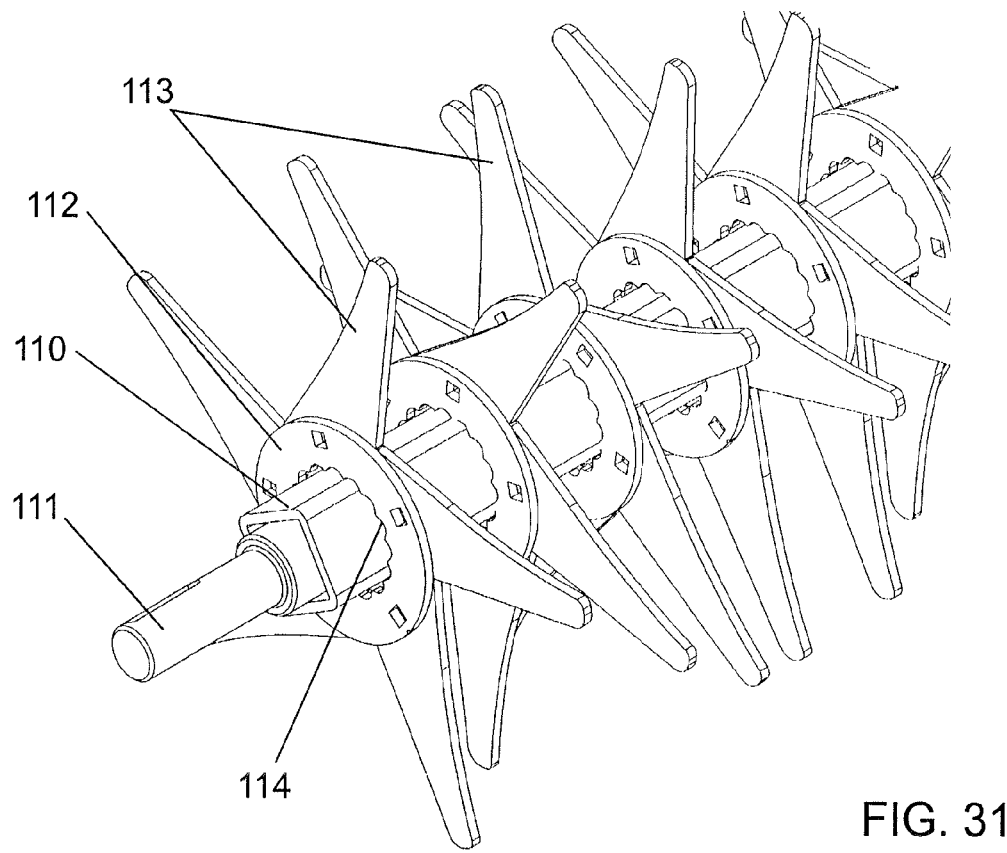
FIG. 31

GRAIN REAPER

RELATED APPLICATION

The present application claims priority to Brazilian Application No. PI0702108-9 filed May 28, 2007, which is incorporated herein in its entirety by reference.

FIELD OF THE INVENTION

The present invention relates to a reaper for grains, specially for the bean grains. More specifically, the present invention refers to technical and functional improvements specially developed and introduced in the subparts which configure a bean reaper that is classified as a trailer to carry out two different operations, the first one of which is gathering various plants, such as bean plants, peanuts and other grains, plants which are previously plucked and aligned, whereas the second function of which is to perform a whole cleaning process by separating the grains (seeds) from the remaining unwanted parts.

BACKGROUND OF THE INVENTION

There are currently several machines made for the above purposes, some of which are designed to harvest and clean the grains and others only for the cleaning process, such as those which are disclosed in the documents: PI0404489 of 20 Oct. 1994—accessory for cleaning bean grain collected by reaper; MU 8301200 of 14 Jul. 2003—arrangement introduced in beating cylinder for bean and peanut reaper; MU 8301613 of 14 Jul. 2003—arrangement introduced in fixed sieve for bean and peanut reaper; PI 0004195 of 01 Sep. 2000—bean gathering platform coupled with a universal reaper; MU 8201891 of 13 Aug. 2002—arrangement introduced in gathering mouth for bean and peanut harvester; PI 0006329 of 28 Nov. 2000—remover of peanuts, beans and other vegetables; MU 7900789 of 21 May 1999—arrangement introduced in bean and peanut harvester; MU 7900686 of 27 Apr. 1999—arrangement introduced in bean and peanut harvester; MU 7801088 of 08 Jun. 1998—arrangement introduced in bean and peanut harvester; PI 9404196 of 17 Oct. 1994 weeder-like bean harvester; PI9202621 of 07 Jul. 1992—bean reaper; MU 7101502 of 05 Jul. 1991—bean reaper; and MU 6600822 of 30 May 1986—bean mini-reaper.

There is no doubt that the current known machines have the necessary means to harvest and clean numerous grains, noticeably beans. However, some of these machines are limited and others have a really high manufacturing cost, not configuring an ideal equipment for medium and small producers. On the other hand, the traditional machines have assembling details that wear out very easily, particularly regarding the gathering roller, which is responsible to rise and drive the aligned plants to the first branch concentrating set since, as it is known, one of the most demanded set of the machine is the gathering roller, wherein the grips must be carefully designed to be wear-resistant and chock-resistant in relation to the impact with other matters that are not plants. This machine part must, consequently, have peculiarities to resist the aggressive work, not that caused by the plants, but the unexpected ones that are represented by small stones, land, thick branches and others. Such a situation is not always easily dealt with by the conventional machines. They consequently require frequently corrective and preventive maintenance, which rises considerably the final cost of the processed product.

On the other hand, it is also known that, afterwards the gathering roller, the beating rollers and the vibrating sieve are put in action, and such two sets are rigorously demanded likewise, such as it occurs with the sieve, wherein its fluctuant condition and the vibrating system demands a special care to prevent premature wastage, which do not happen with the known machines.

In view of the above circumstances, and with a purpose of overcoming them, it has been developed the present improvement which, in general terms, incorporates a plurality of changes in all the sets of the machine, featuring a trailered machine specially designed to carry out two different operations, the first one of which is gathering the bean plants, previously plucked and aligned, whereas the second function of which is to perform a whole cleaning process by separating the grains (seeds) from the remaining unwanted parts.

SUMMARY OF THE INVENTION

The first goal of the invention is the materialization of a double gathering roller, that is, two rollers that are axially aligned, a right one and a left one, both of which are appropriate to harvest aligned plants simultaneously, wherein each one is defined by a square tubular axis with cylindrical ends of axis for their bearing on the structure, the square axis of which having several discs that are distributed equidistantly, all of them provided with plates that are ordinarily triangular, radially placed, which configure gathering grips, each disc of which is preferentially provided with five plates or gathering grips, and, furthermore, the central portion of such disc is perforated by a star-like bore (toothed), so that the same may be placed in different angles regarding the four corners of said tube, consequently, the grips are also positioned in angles, in a different manner of each other, originating a substantially resistant set since the combination of various grips defines a vigorous gathering roller that is capable of resisting the aggressive work of harvesting the plants, even when the plants bring stones, land, thick branches and other matters. On the other hand, an even roller is also specially provided above the gathering roller to arrange and drive the plants to the concentrating set, which are two reverse threads designed to concentrate the gathered material and, at the same time, throw it into the subsequent set, which is the routing thread which, in turn, have the necessary means to drive and uniformly divide all the gathered material inside the two beating cylinders, placed longitudinally, assembled inside the respective thick screens (cylindrical sieve), where the bulkier unwanted material is retained, such as branches and leaves, peels and others, which step out directly from the mouths located at the end portion of the beating cylinders and driven to the sides of the machine, whereas the bean and other minor impurities drop by gravity on a vibrating sieve, wherein the grains are retained, whereas particles such as land, sand and the like passes through this sieve and drop by gravity on the ground, whereas the grains and small light particles are vibrated and shaken towards the posterior portion of the machine, wherein ventilators separate the light particles by means of suspension (suction), discarding them through other mouth that is turned to the back of the machine, while the entirely clean grains are driven to two posterior elevators, wherein they are driven until a grain bucket which, in turn, is assembled to laterally incline at the moment they are unloaded, the inclined motion of which is done hydraulically, the grain bucket of which furthermore is provided with openings so that the level of the grains may be seen and, in addition, is provided with a lateral inclined mouth to facilitate the unloading by free drop.

Therefore, it is noted that each set of said machine has had modifications so that, on the end, all of them have cooperated simultaneously to improve considerably the performance of the machine, featuring resources to further speed up the reaping process of various grain cultures, notably the bean and the peanut, further with additional technical and operational advantages, particularly regarding the operational simplicity, reduced maintenance and, consequently, it is obtained a considerable productivity increase.

Another detail that is pointed out in said machine is undoubtedly its operational simplicity since all of its running depends only on a single person, which is the tractor operator, since the machine is simply driven onto the plucked and aligned material and, afterwards, all the process is automatically carried out, separating the grains from the unwanted material.

The reaper of the present invention is classified as a trailered one and may be coupled with conventional tractors with power socket, hydraulic system and reduced gear. Either the coupling or the uncoupling is extremely easy and fast.

BRIEF DESCRIPTION OF THE DRAWINGS

For a better understanding of the present invention, a detailed description of it is given below, referring to the attached drawings, wherein:

FIGS. 28-33 are perspective views detailing the gathering set;

DETAILED DESCRIPTION OF THE INVENTION

Figure 1:
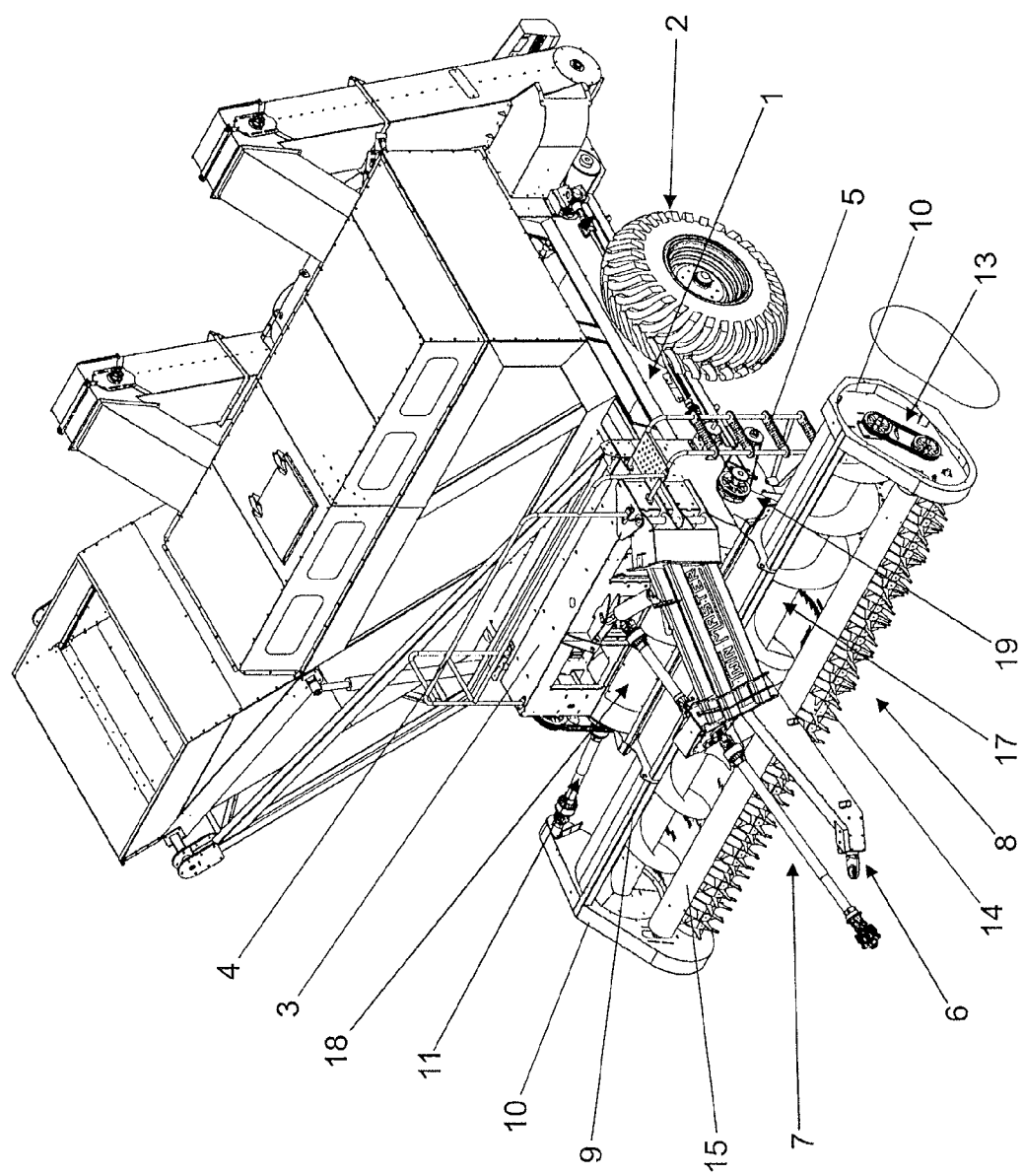
FIG. 1 is a perspective view at an anterior top angle of the machine depicting the left side of the same.
Figure 2:
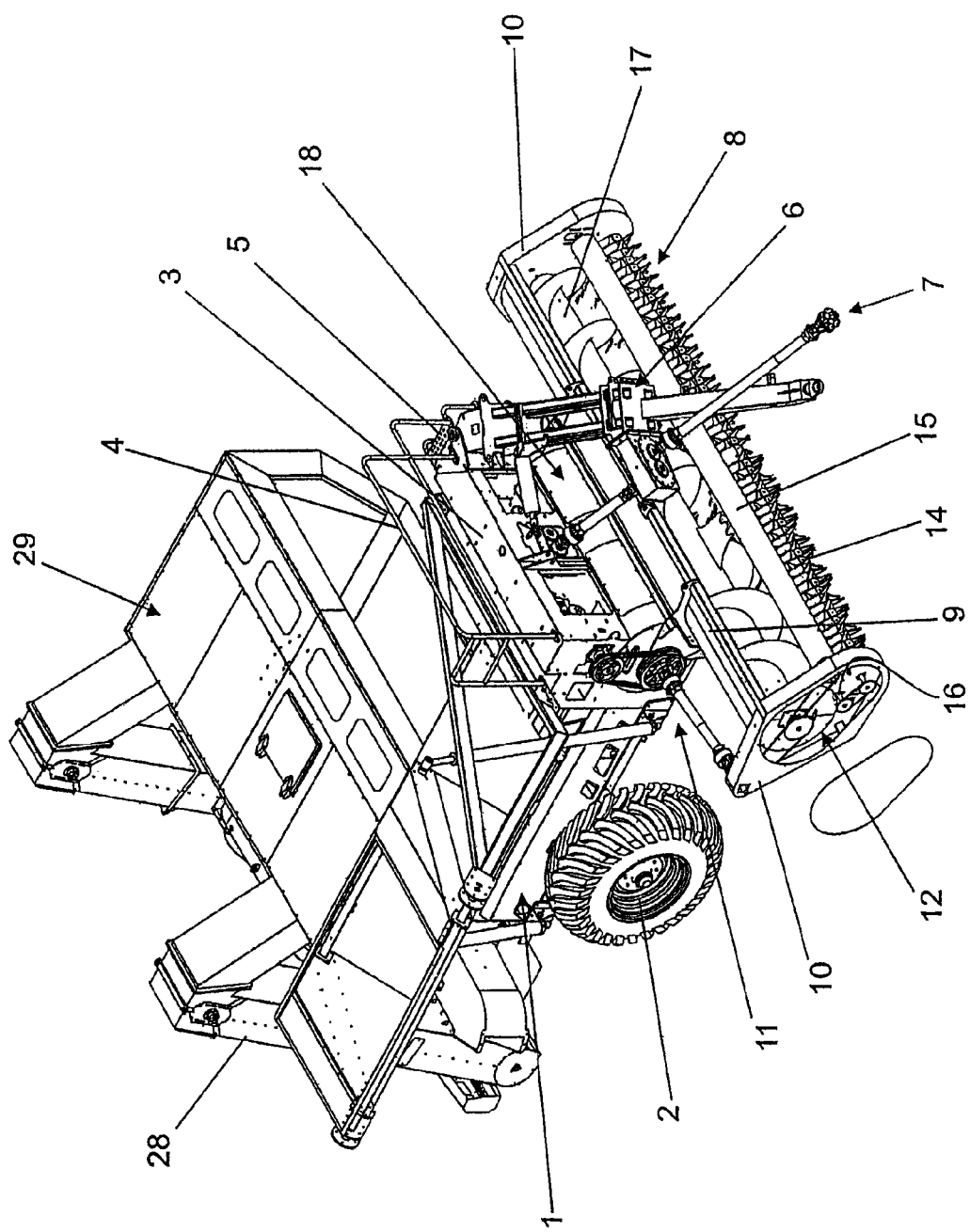
FIG. 2 is a perspective view from the right side.
Figure 3:
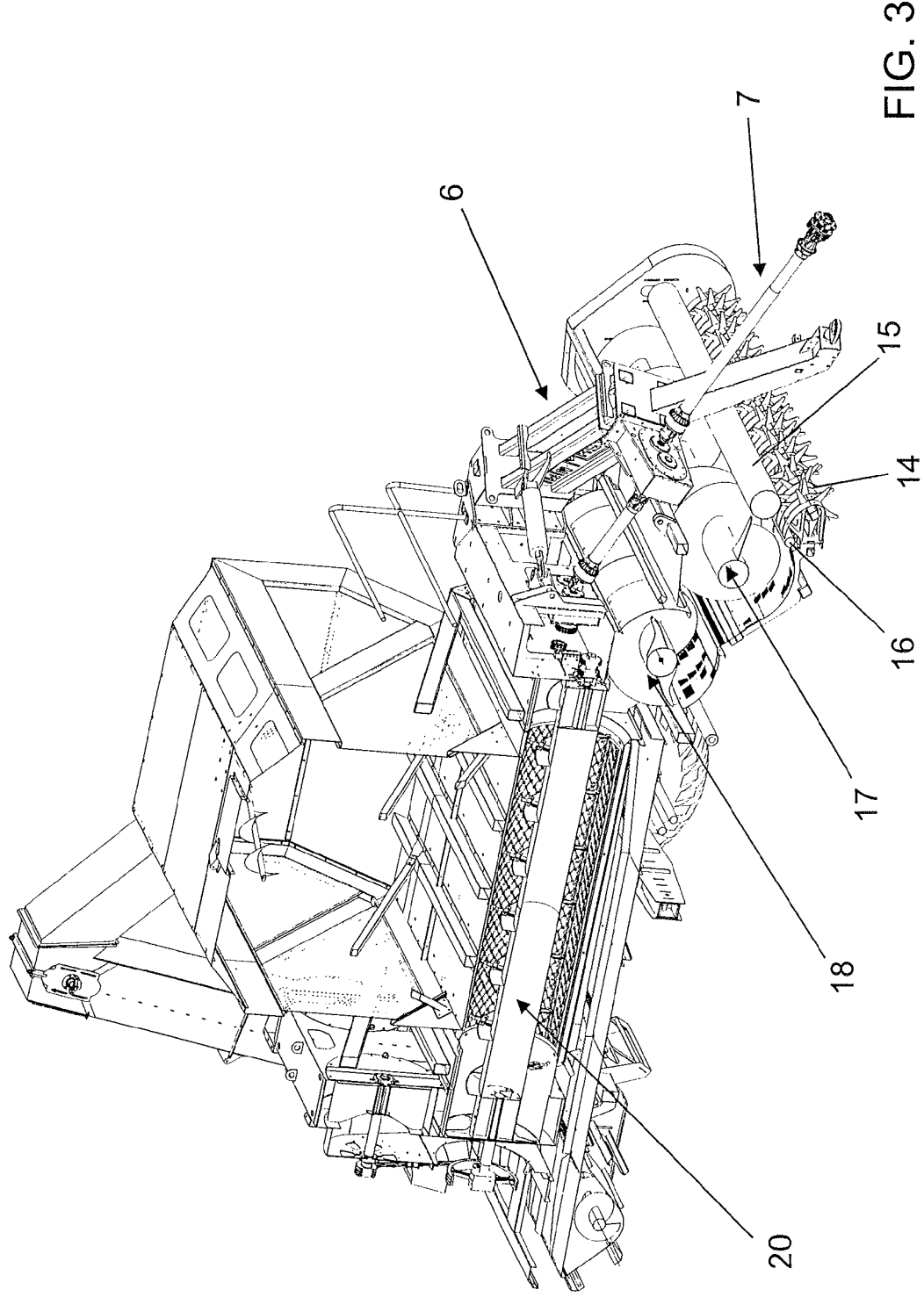
FIG. 3 is a middle section perspective view that points out the inside sets of the machine.
Figure 4:
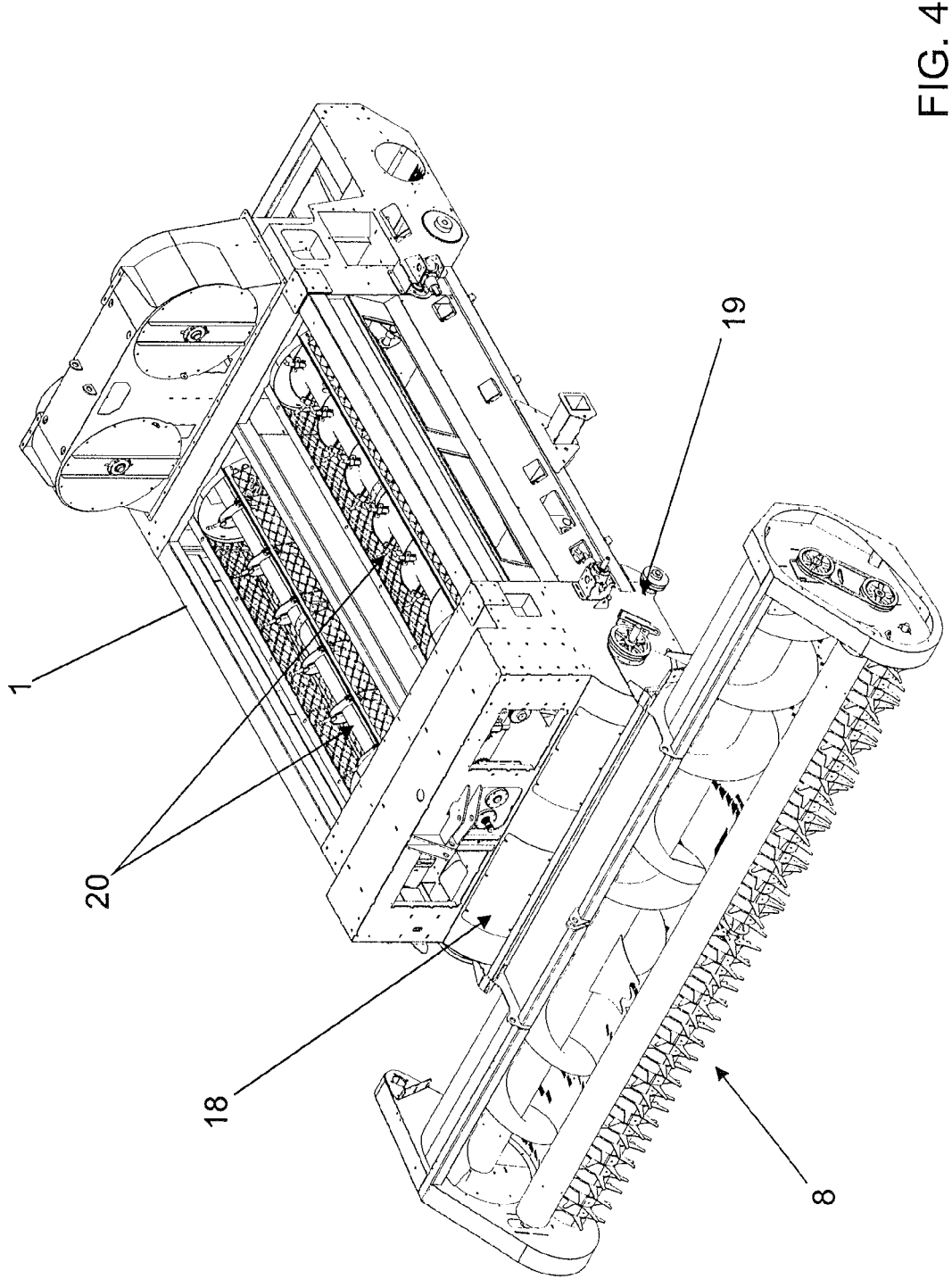
FIG. 4 is a partial perspective view depicting the gathering set and the machine structure.
Figure 5:
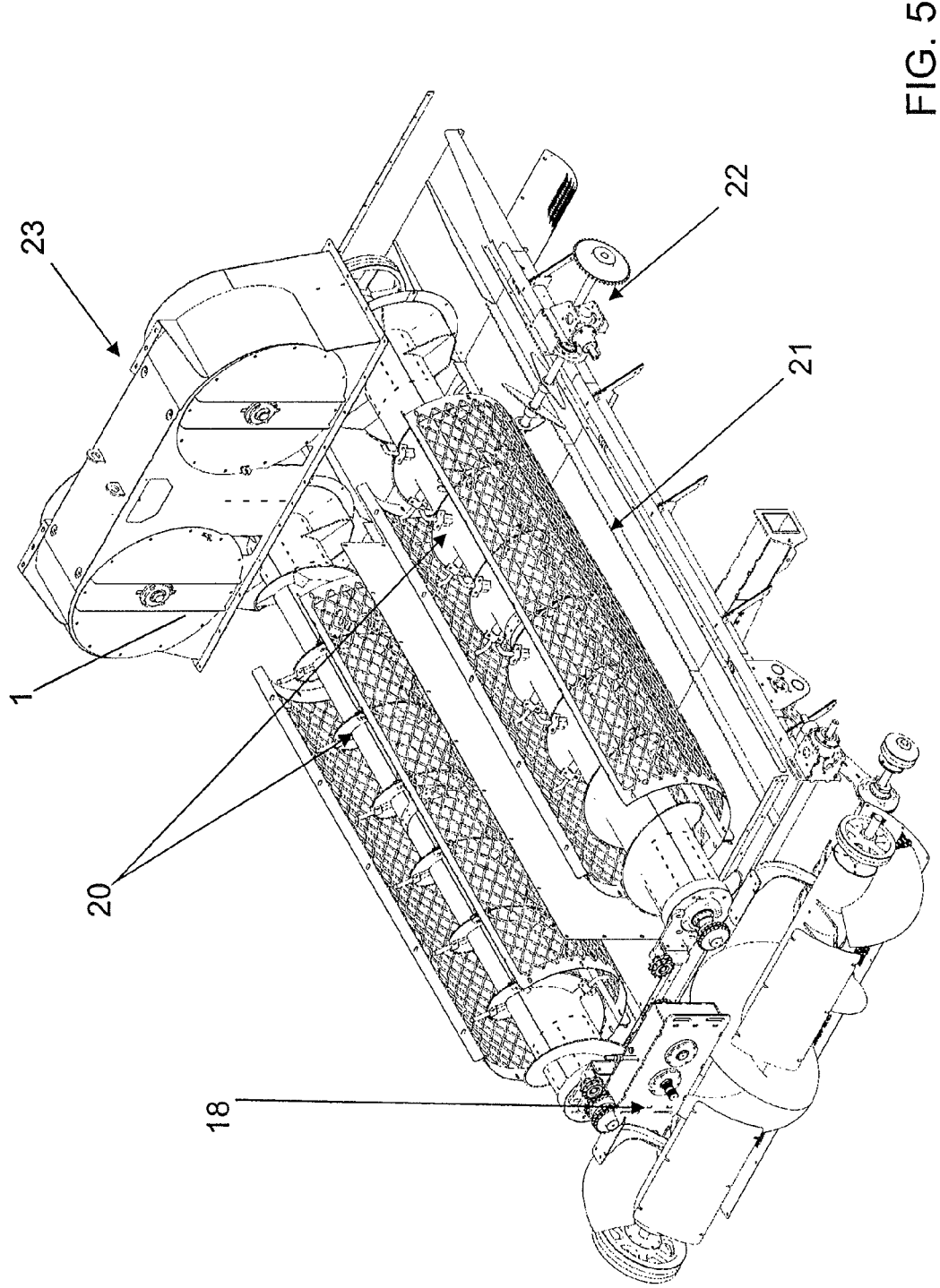
FIGS. 5-8 are section perspective views that point out the inside sets, mainly the joining roller, beating rollers and cleaning sets.
Figure 6:
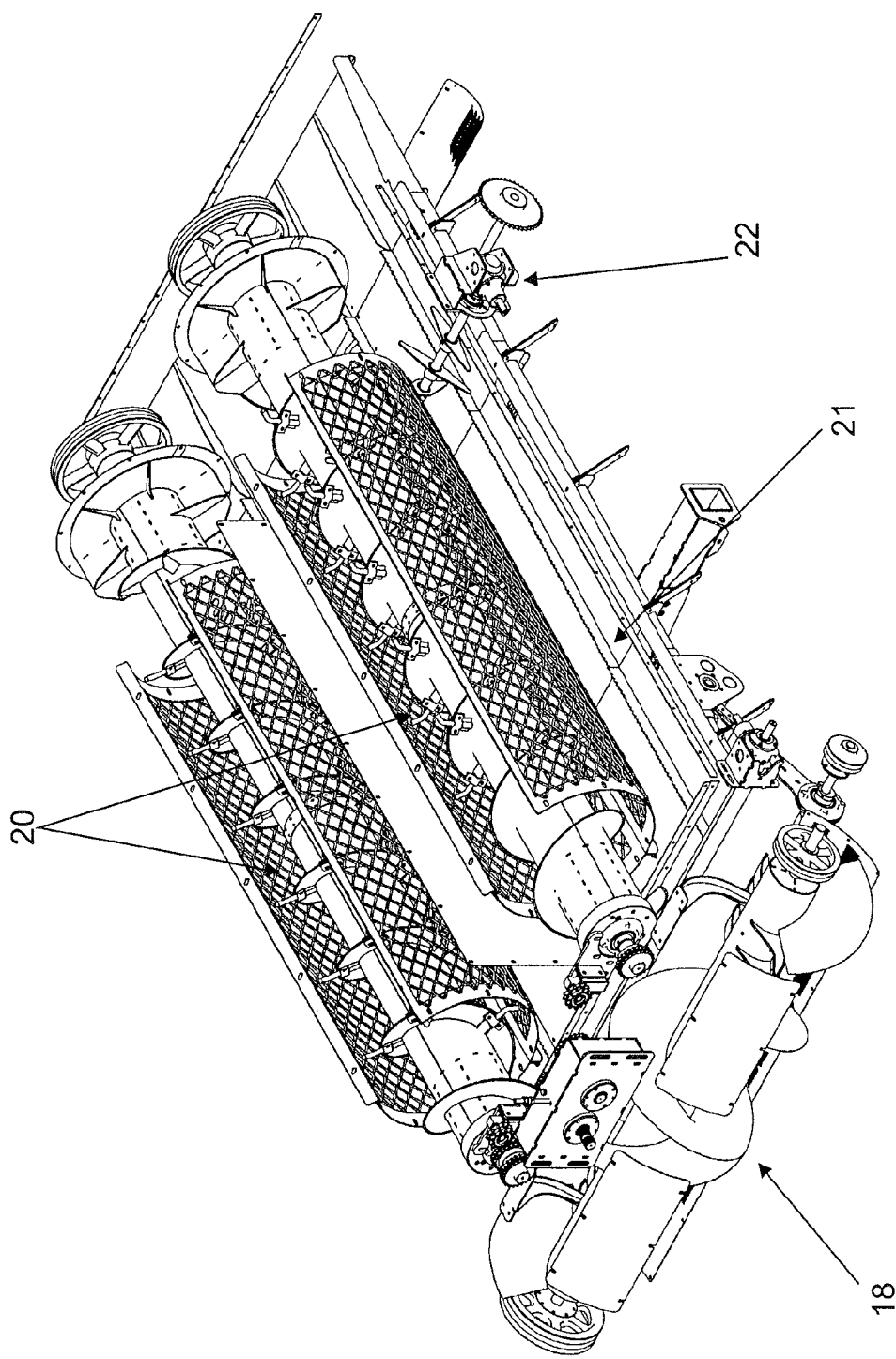
Figure 7:
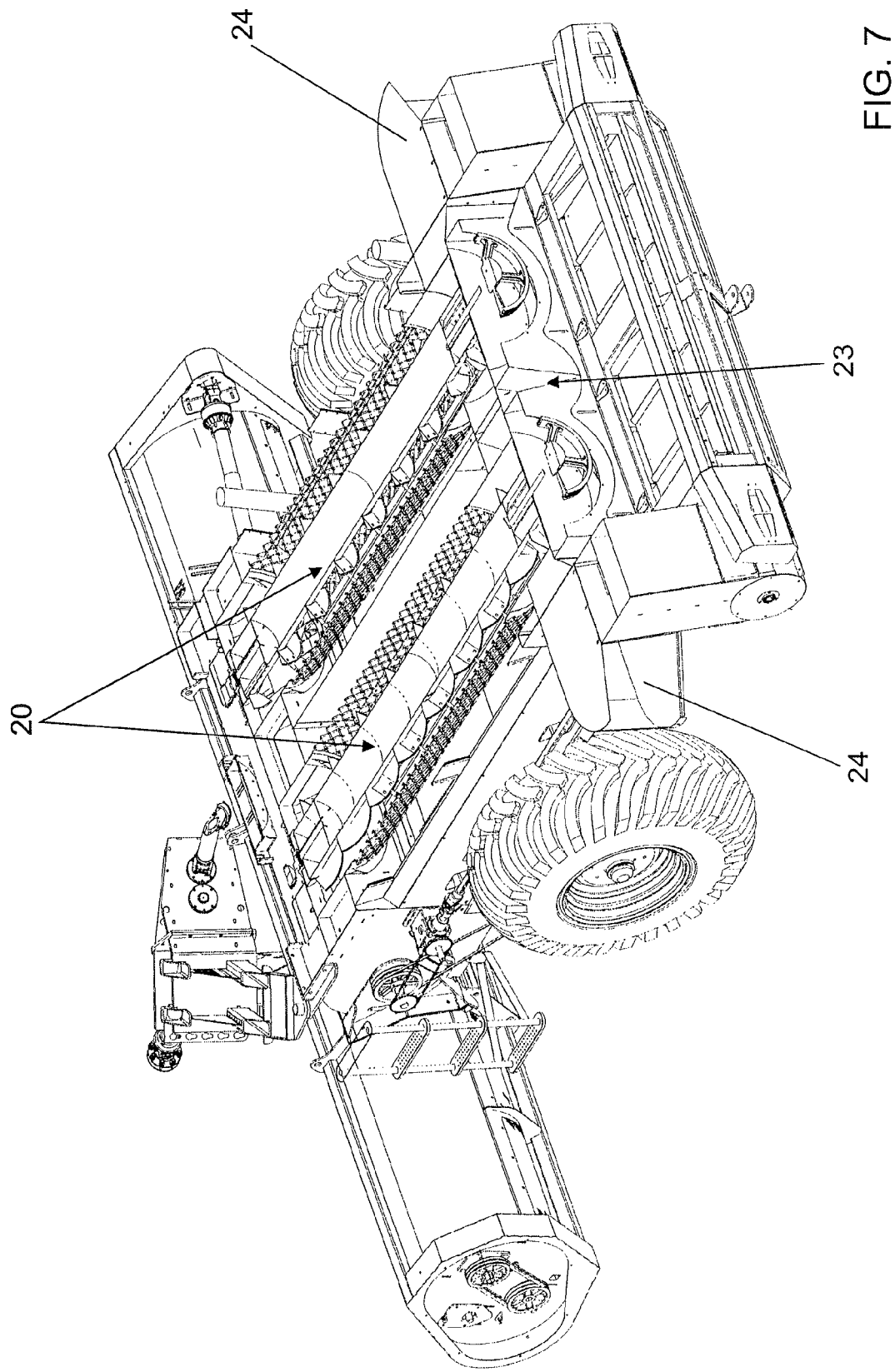
Figure 8:
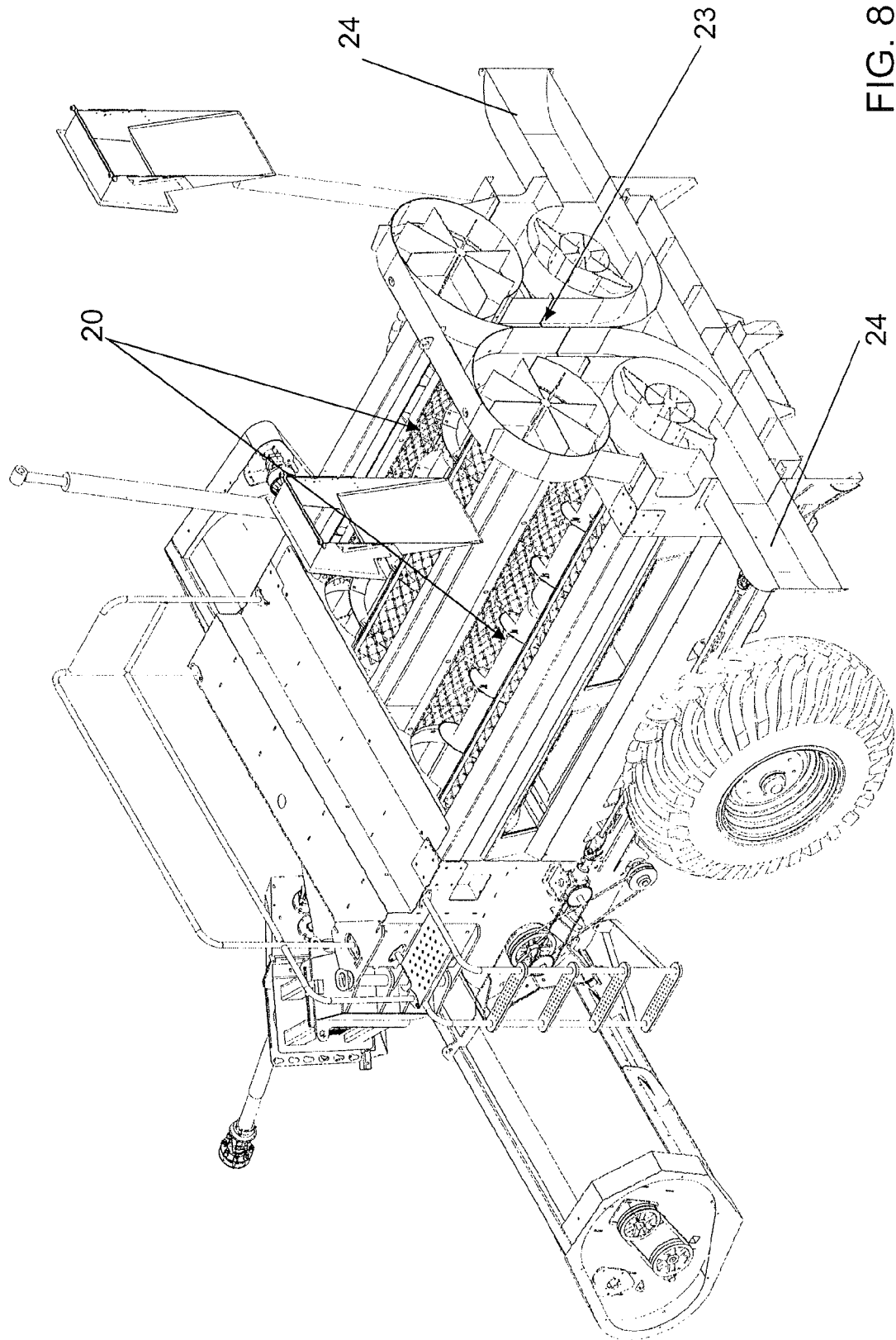
Figure 9:
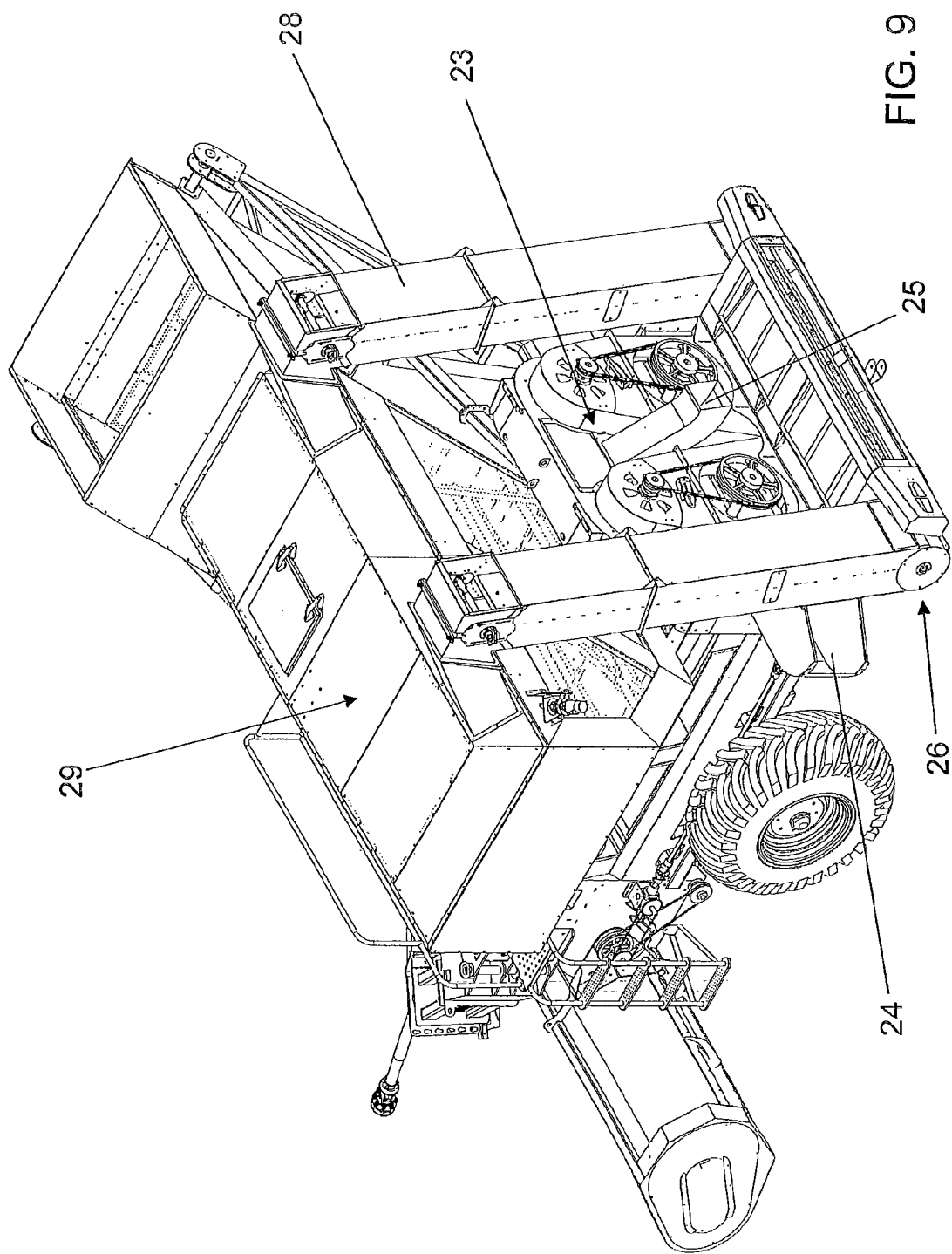
FIG. 9 is a perspective view depicting the rear portion of the machine, pointing out the outlets for the thick and thin straws.
Figure 10:
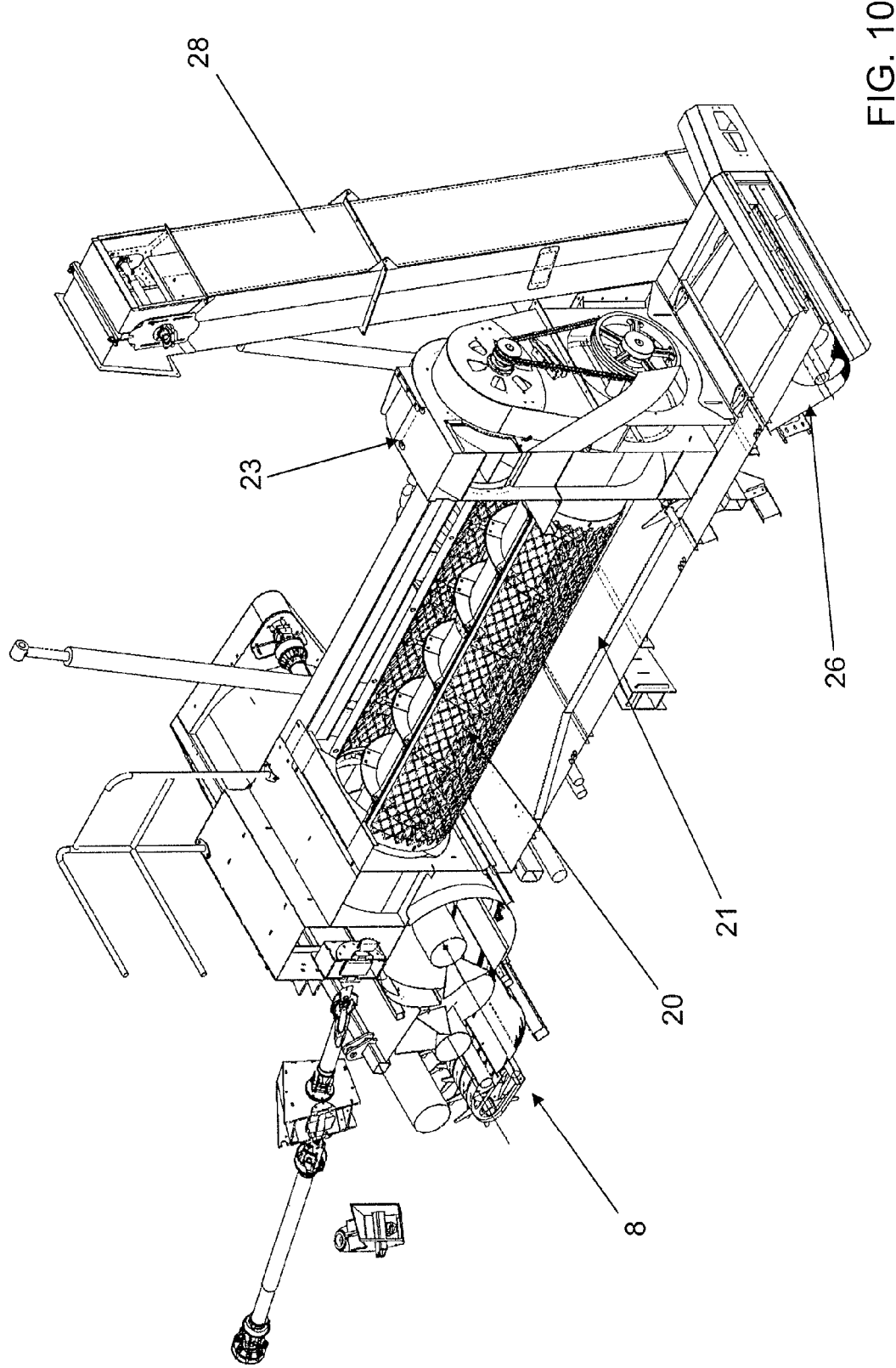
FIGS. 10 and 11 are other different section perspective views, focusing on other inside details of the machine, mainly the outlet of the vibrating sieve.
Figure 11:
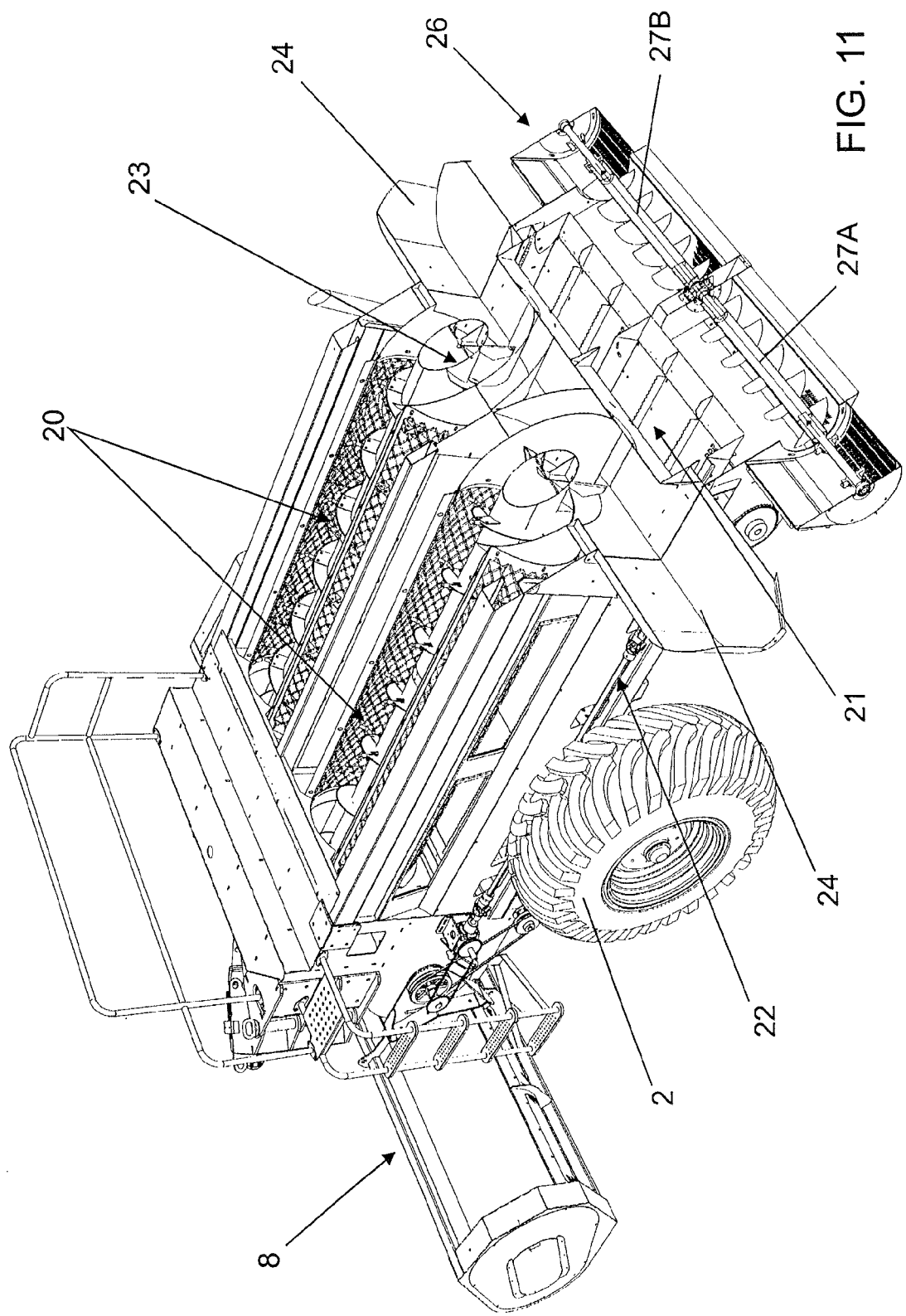
Figure 12:
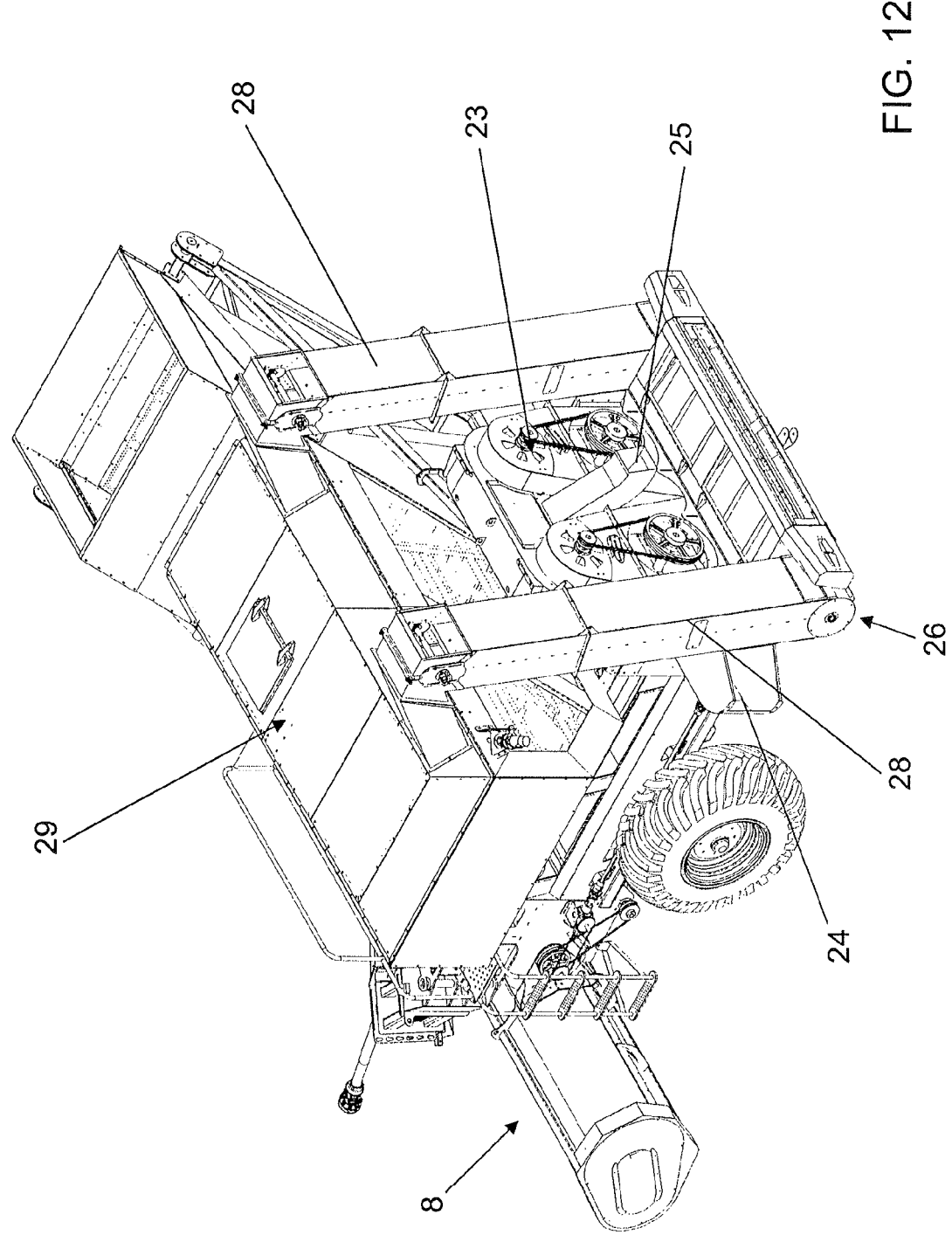
FIG. 12 is a posterior perspective view pointing out the grain elevators for the grain bucket.

In FIGS. 1-3, the present invention is featured by initially comprising a box-shaped structural part (1) which is ordinarily with a parallelepiped form, in which all sets are aggregated, starting from its lower part, wherein the wheeling set (2) is mounted and, in the anterior part, a top passageway (3) is provided with a handrail (4) and side stair (5), as well as the set of the coupling shaft (6) with the tractor (not depicted) is mounted on the anterior part of said structure (1) and the first set of cardan takeoff (7) is aggregated inside of it, which stands under said sets and is mounted in the transversal direction regarding the structure (1), the double gathering set (8), which, in turn, has a supplementary structure (9) with box-shaped side portions (10), wherein other takeoff sets (11-12-13) are mounted in synchronization with the first takeoff (7) and, furthermore, the edges of three internal rotating sets are born among said boxes (10), one of which is lower positioned so as to be displaced close to the ground, which is defined as double gathering roller (14), wherein it rotates clockwise and cooperates to grip and rise the plants and to drive them upwards and backwards, a guiding cylinder (15) standing above the double gathering roller, which rotates in the opposite direction and cooperates to keep or guide the backward displacement of the branches, wherein another equally even and posterior roller (16) (depicted only in the FIG. 3), with a smaller diameter however, has a similar function of guiding said branches so that the same may be received by a joining roller (17) which, in turn, concentrates the gathered branches in the central portion of the machine, wherein said joining roller (17) also cooperates to displace again the plants backwards, however, now it is done inwards a distributing roller (18) which, in turn, is also transversally mounted in the initial portion of the structure (1), wherein it is interconnected with the takeoff (7-11) on one side and, on the opposite side, it is coupled with another takeoff (19), this roller (18) also divides the flow of the gathered material into two different flows and throws them backwards into two sets of beating cylinders (20), better viewed in FIGS. 4-6, through which it is noted that the same are parallelly and longitudinally mounted inside the structure (1), wherein they cooperate to separate the grains from the other unwanted remainders, however, minor grains and particles drop on a large set of vibrating sieve (21), positioned on said beating cylinders (20), so that onto said sieve the grains and other light particles may be retained, whereas particles such as land and sand, which are smaller than said grains, drop free directly to ground, and a spreading set (22) is further mounted onto said portion, which, in turn, is positioned among the posterior edges of the vibrating sieve set (20) and the posterior edges of the beating cylinders (20), which, as it has already been said, separate grains and particles smaller than the same (thin straw) and retain the heavier and bulkier material, mainly leaves, branches and others (thick straw), displacing them backwards, wherein said beating cylinders runs inwards, as the section views of FIGS. 7 and 8 illustrate, a double ventilating and discharge set (23), whose lower portion is provided with side outlets for thick straw (24) and, in the central portion (FIG. 9), an outlet for thin straw (25) is also provided and, furthermore, such as illustrated in FIGS. 10 and 11, the posterior portion of said vibrating sieve set (21) also runs under said set, so that all of its transversal border may be onto a transversal set defined as a gathering channel of clean grains (26) and respective double horizontal transportation set (27A-27B), the latter two carry out the transportation in reverse and cooperating directions so that the clean grains may be displaced from the central portion to the sides of the machine through two different and uniformly divided flows, wherein each flow or each horizontal transporter (27A-27B) concentrates the clean grains in the opposite edges of the gathering channel (26), from which ascending and slightly inclined backward tunnels rise, such as illustrated in FIG. 12, one at each side, which constitute vertical transporting elevators (28) for clean grains, top edges of which runs into the top portion of a grain bucket (29), wherein the entirely clean grains are stored for a later discharge by the inclination of said grain bucket (29).

Figure 13:
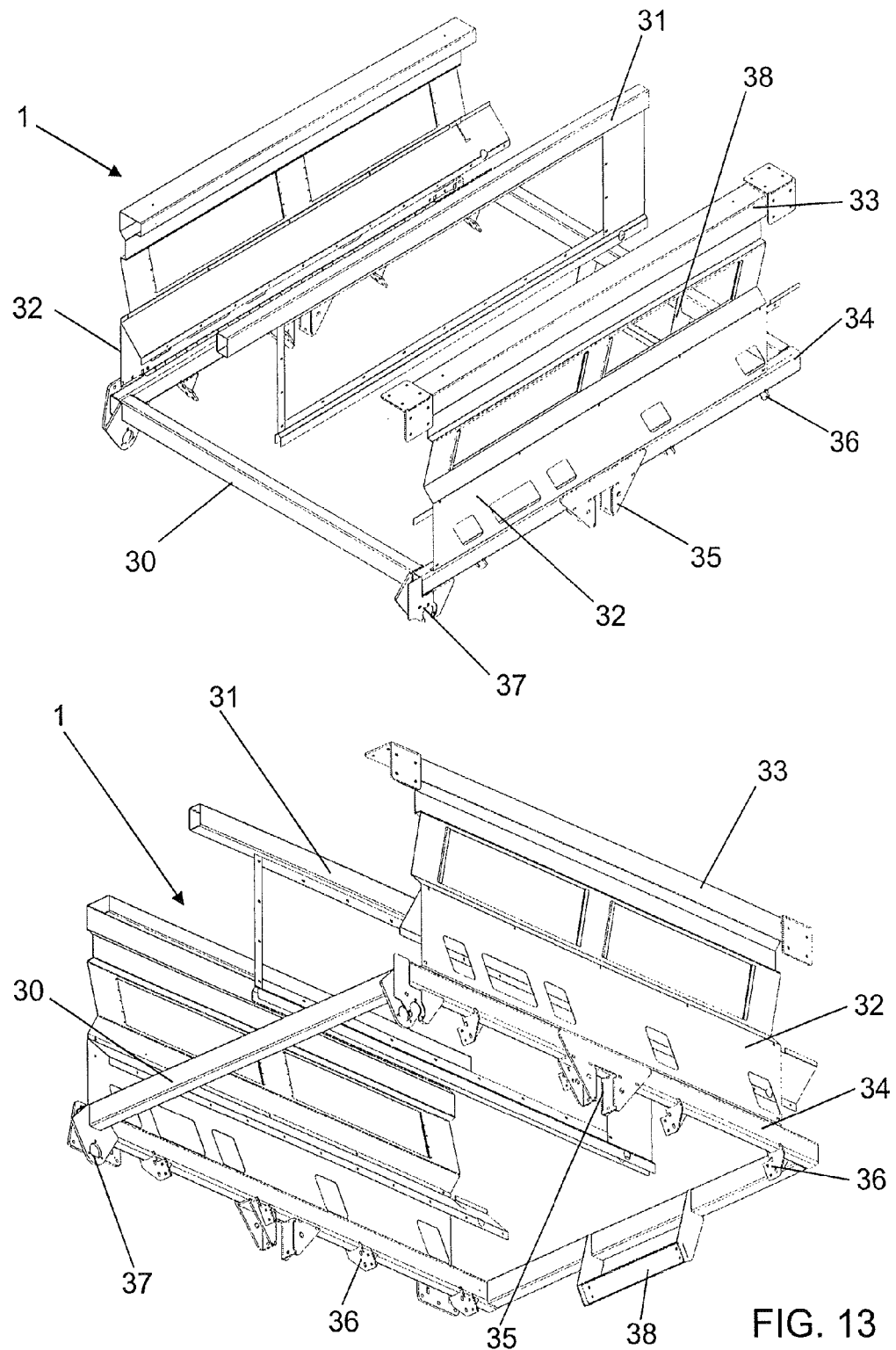
FIGS. 13 and 14 are perspective views of the assembling details of the central portion of the structure.
Figure 14:
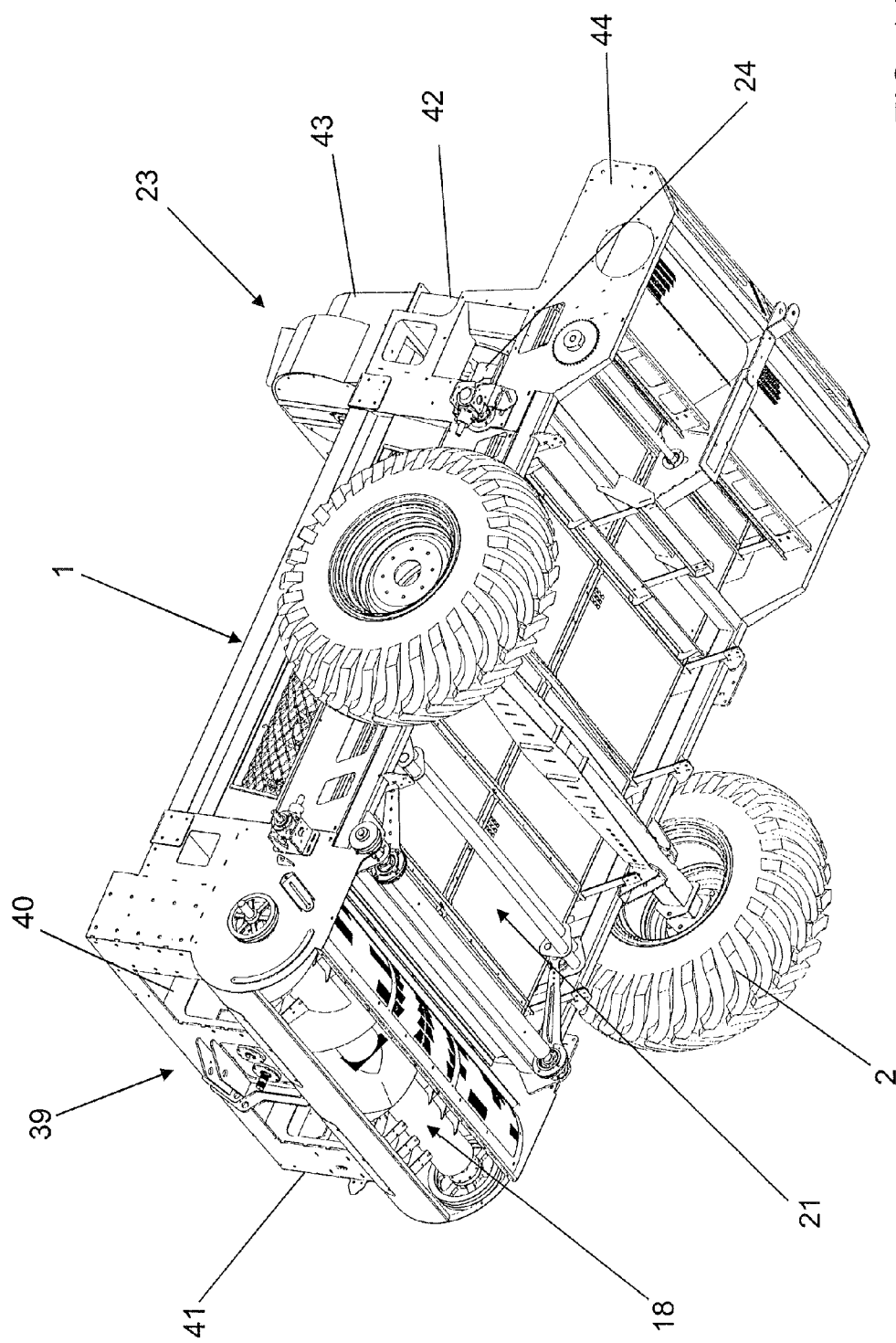

The box-shaped structure (1) is illustrated in details in FIGS. 13 and 14, by which it is noted that the same is comprised by a basis in a tubular square shape (30), the top portion of which includes a vertical division (31), whereas closing plates (32) raise from its side borders, these and the median (31) have the top borders with a structural reinforcement (33) of ordinarily square tubular profiles, and, furthermore, by the lower side (FIG. 13), said structure have its longitudinal bars (34) provided with inverted U-shaped supports placed medianly (35) for fixing the wheeling set (2) with the corresponding axis, being provided before and afterwards said supports (35) other supports (36), which are each other identical, and other two different ones, of which two are in the shape of a bearing (37) placed on the anterior corners of the structure (1) and another one in the shape of a crossbar (38) positioned in the median portion of the posterior edge of said structure (1), wherein said supports (36-37-38) constitute a fixation point of the vibration sieve set (21).

Figure 15:
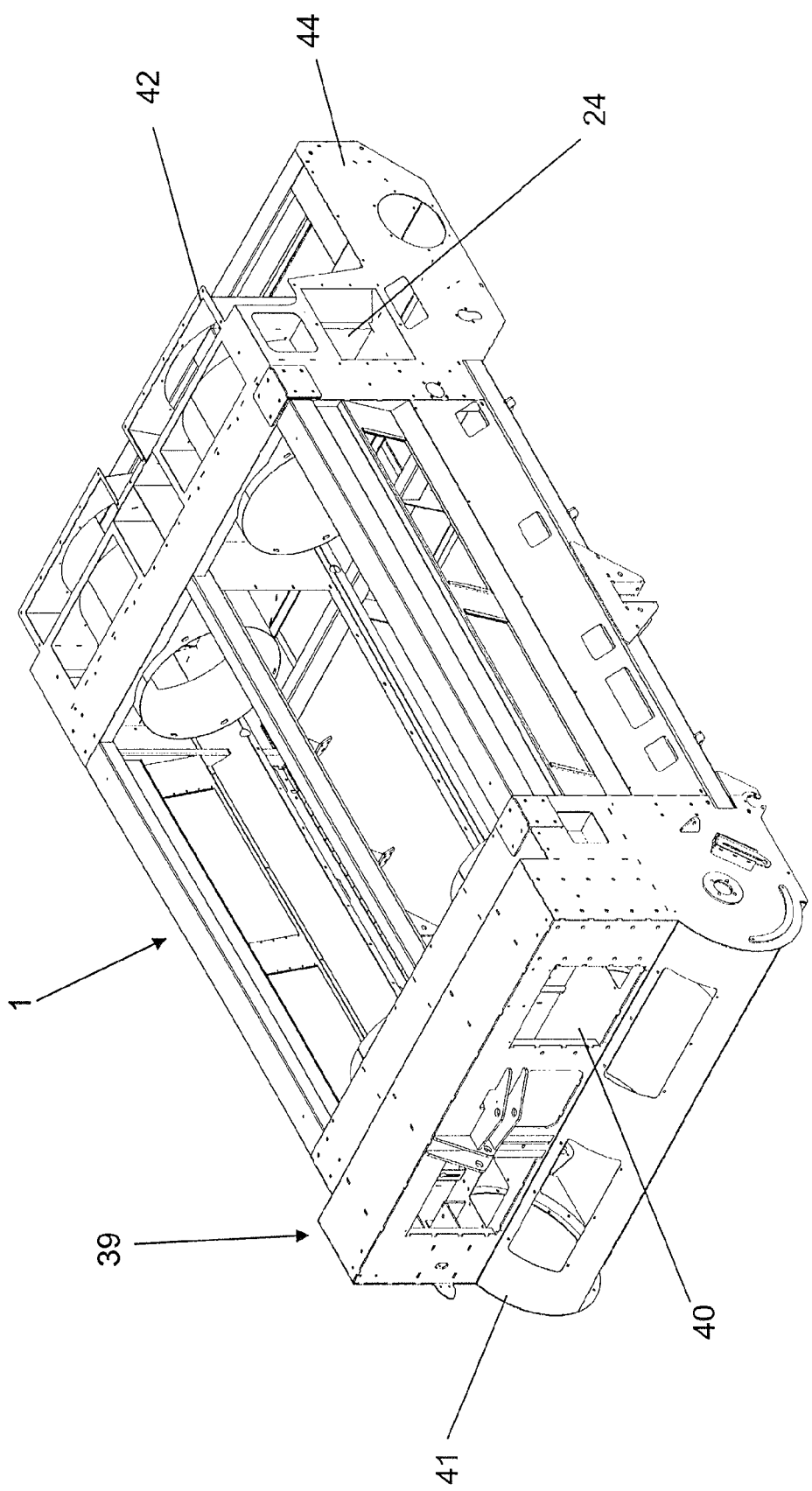
FIGS. 15-18 depict perspective views that point out box-shaped complements for the assembly of the joining roller and the cleaning set.
Figure 16:
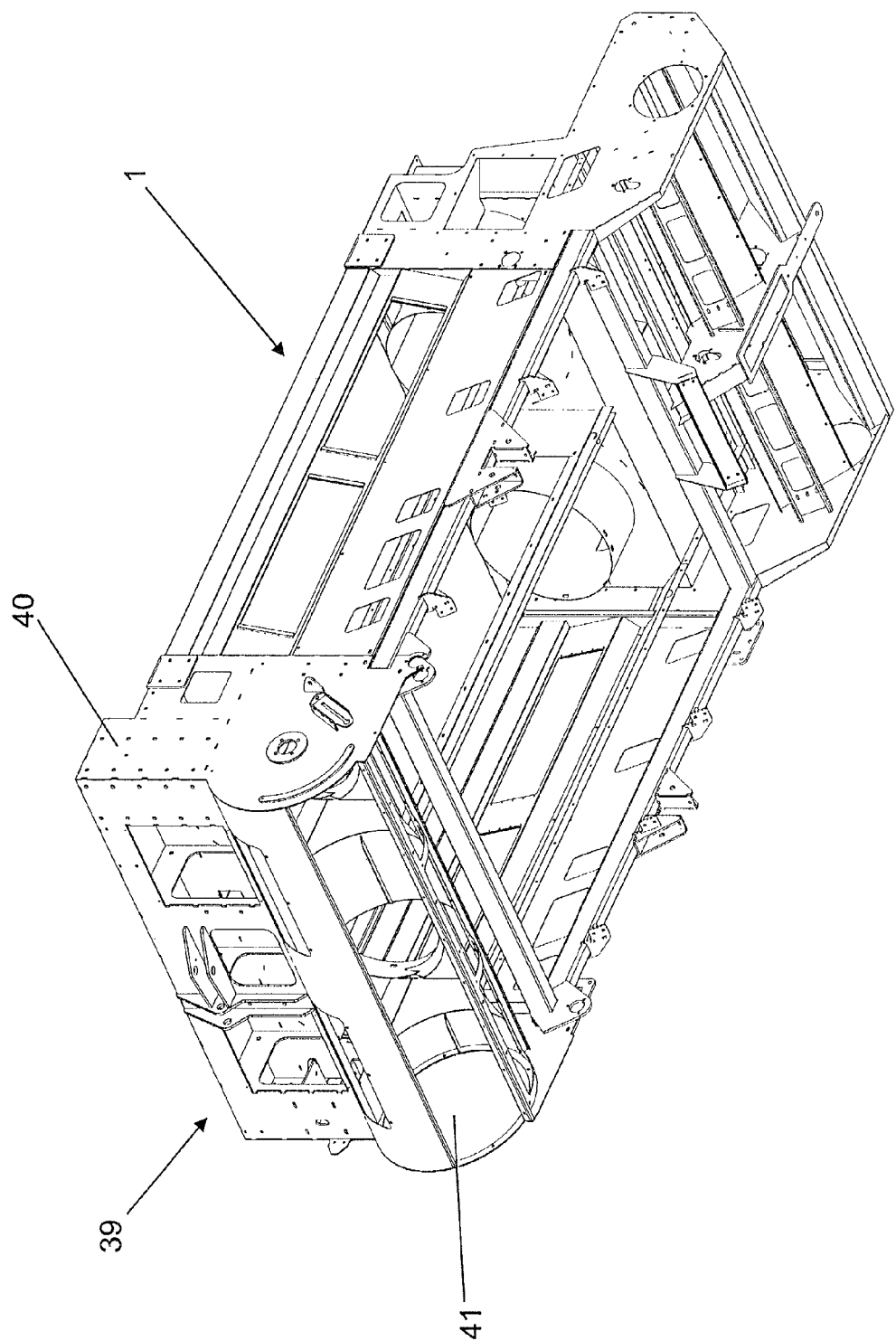

Such as it is illustrated in FIG. 15, the anterior edge of the structure (1) is prolonged forwards with a structural supplement in the shape of a plate box (39) which, besides of including several openings, has also its top portion shaped as a true parallelepiped box (40), whereas its lower portion is cylindrical shaped (41), in which the first portion (40) externally defines the top plan to configure the top passageway (3) and to assemble the side stair (5) and the coupling shaft (6), whereas the lower cylindrical portion (41) configures an inside and outside lodging for assembling the takeoff sets (7-11-19) and for the adjustable fixation of the structure (9) of the gathering set (8).

Figure 17:
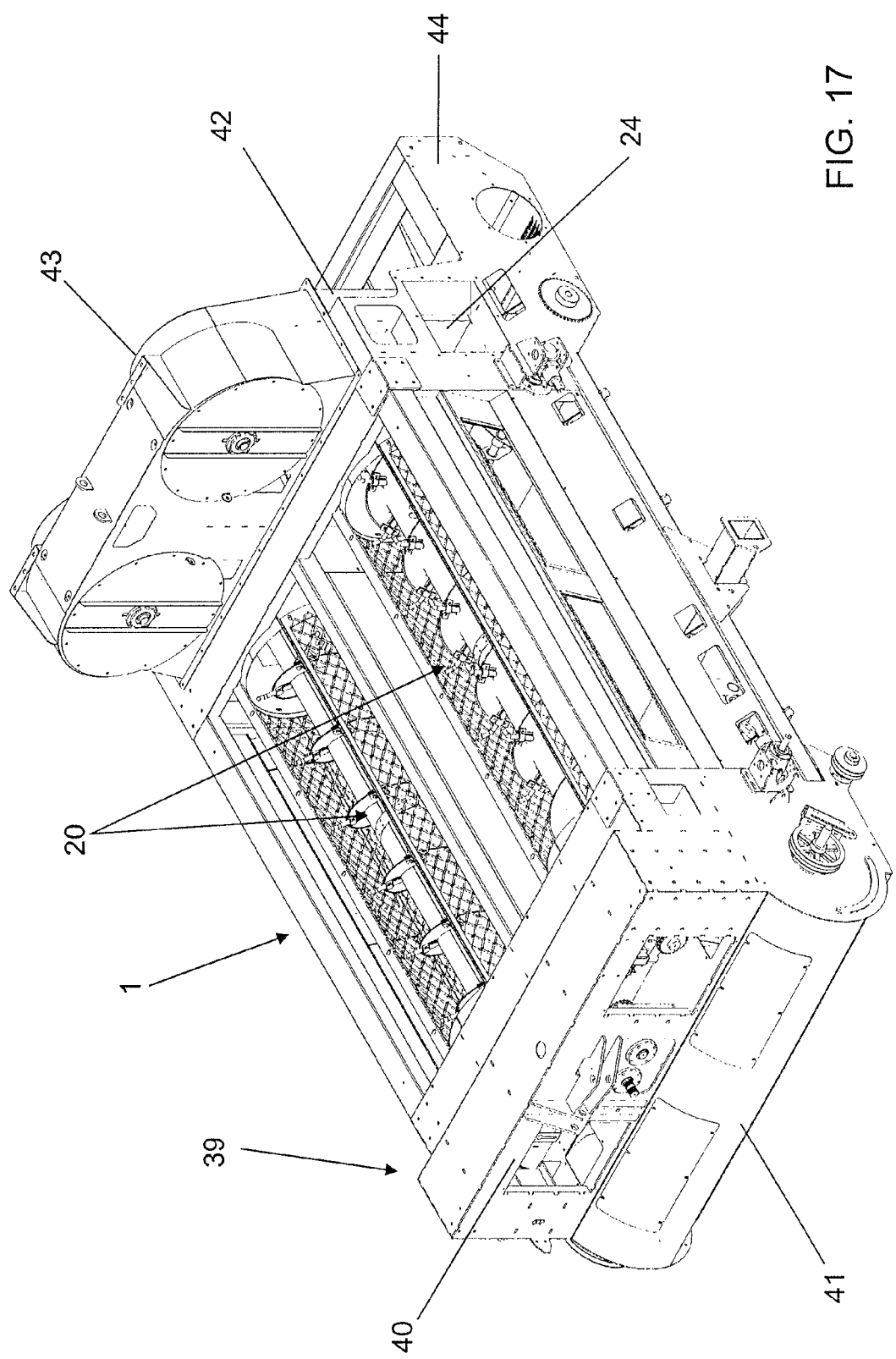
Figure 18:
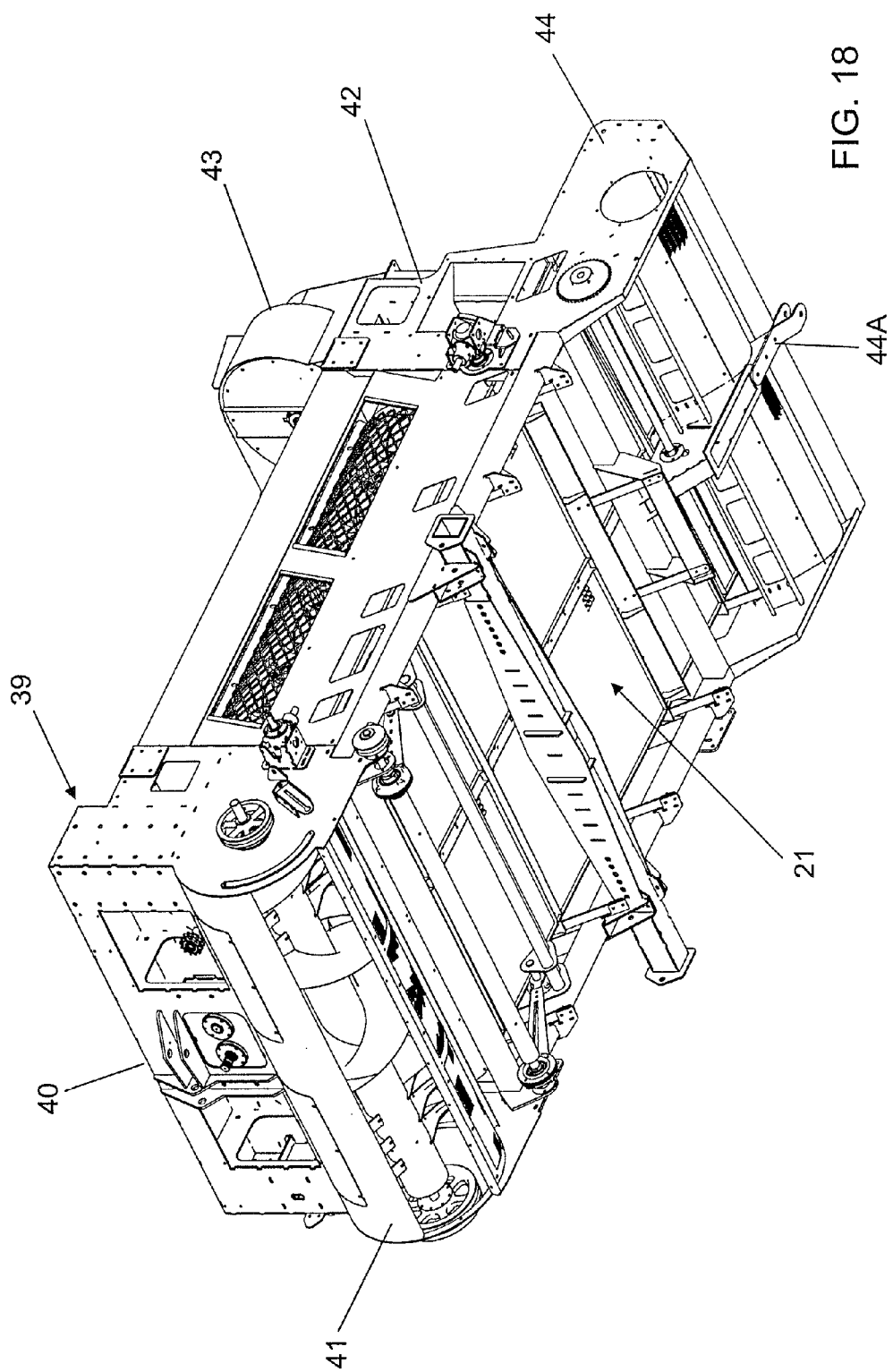

As it is illustrated in FIGS. 17 and 18, the posterior portion of the structure (1) is structurally integrated with other details in the shape of plate boxes, one of which is in a median (42) position, another is in a top (43) position, and another one is in a lower (44) position, under which a universal coupling (44a) stands, from which the double ventilation and discharge set (23), the side outlets for thick straw (24), the outlet for thin straw (25), the gathering channel set of clean grains (26) and the respective double horizontal transportation set (27A-27B) are mounted.

Figure 19:
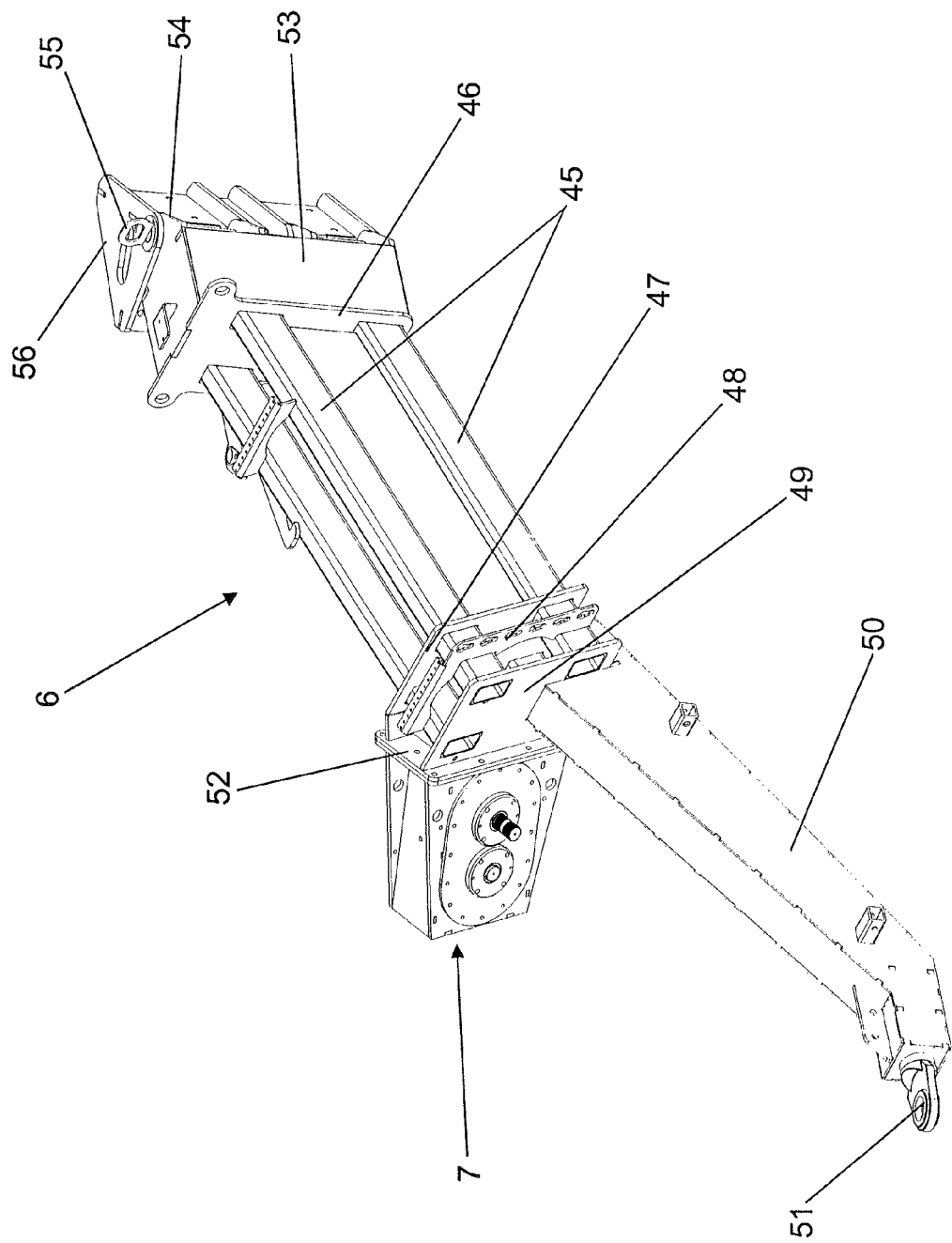
FIGS. 19-22 are perspective views depicting the assembling details of the coupling shaft with the tractor.
Figure 20:
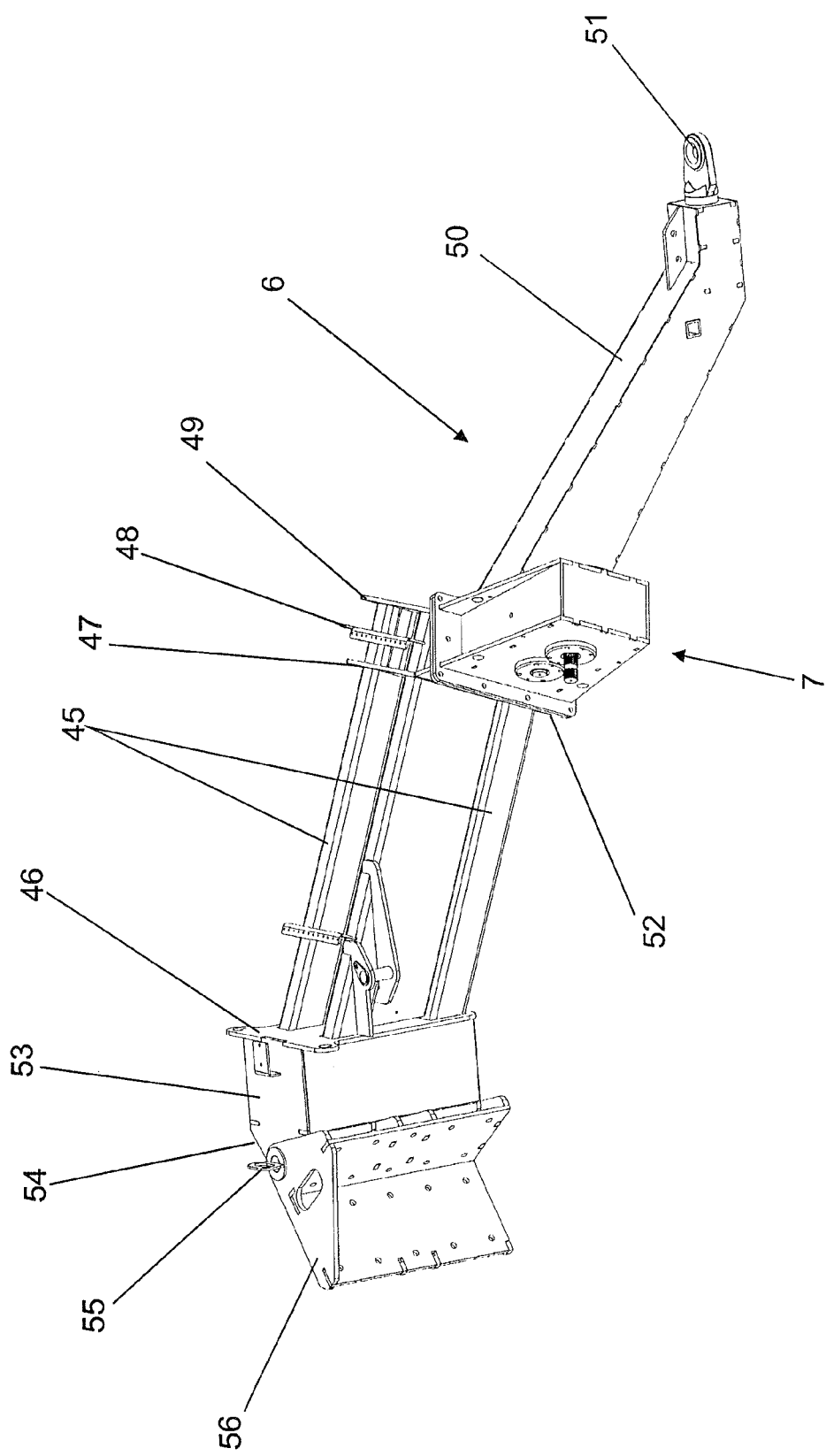
Figure 21:
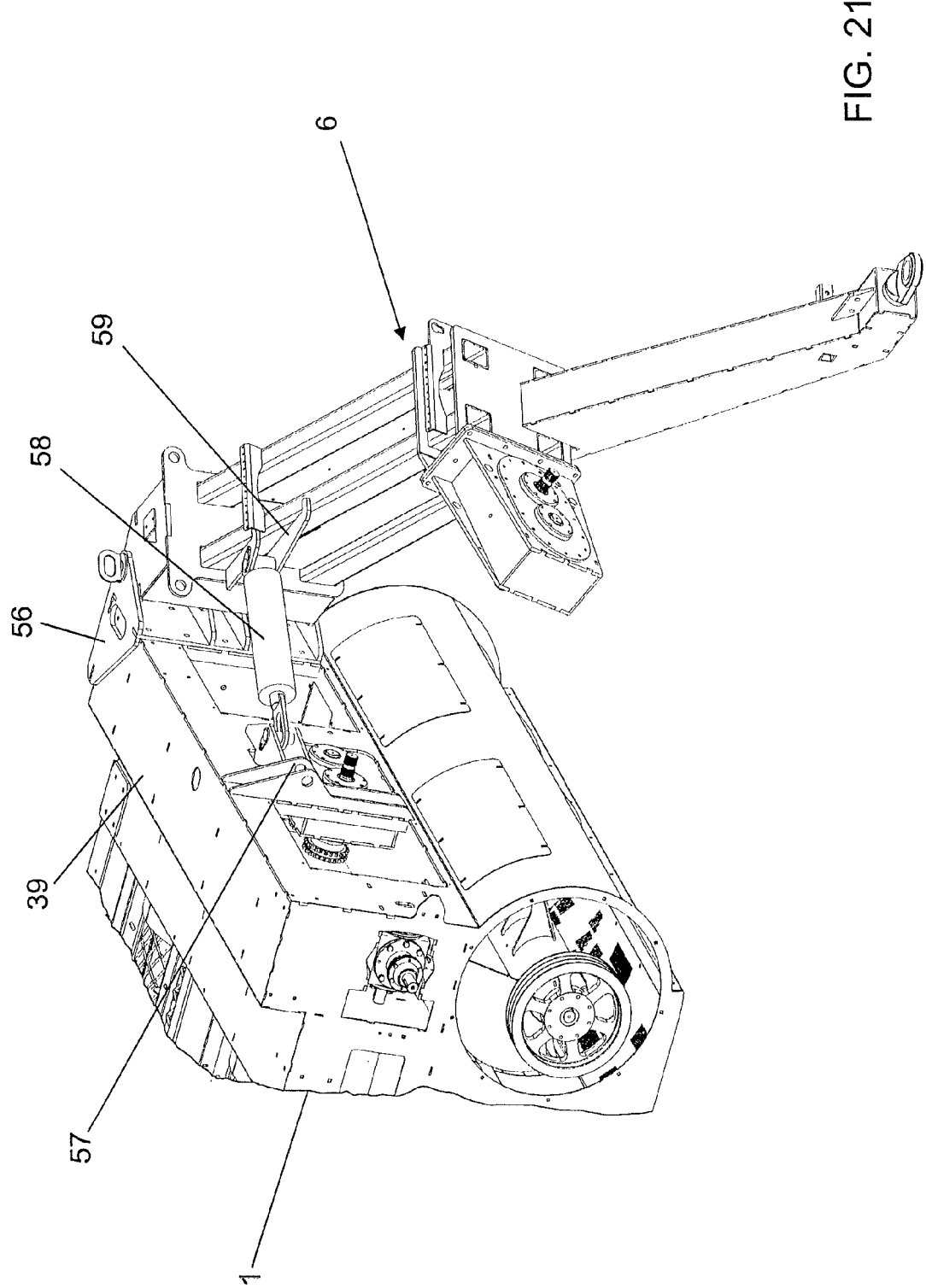
Figure 22:
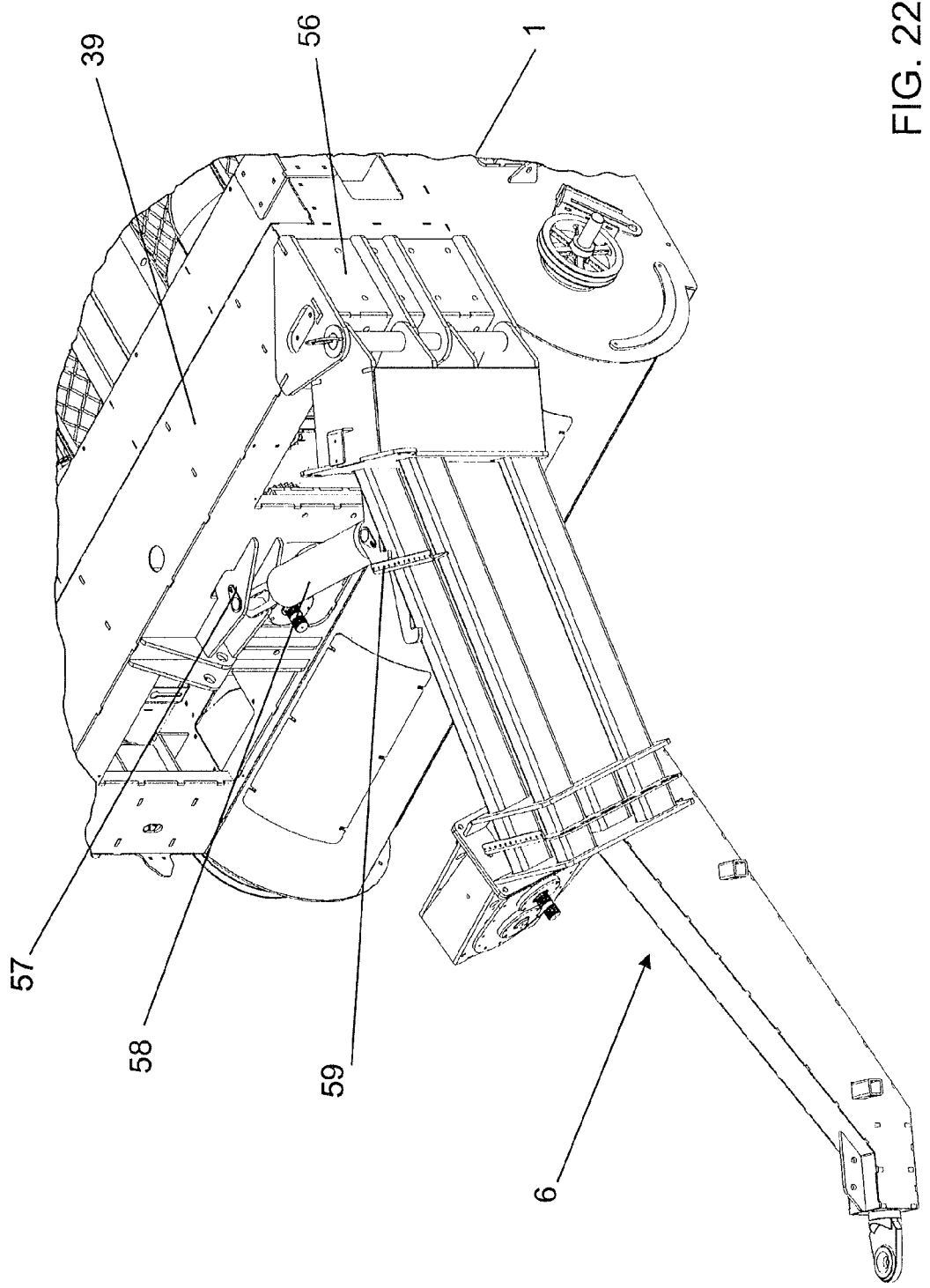

The coupling shaft (6) is illustrated in details in the FIGS. 19 and 20, by which it is noted that the same is formed by a central block formed by four longitudinal tubes (45), whose edges are united by pieces of rectangular plates (46-47-48-49), wherein the plates (49-48-47) are provided between the tubes (45) and the edge corresponding to the end of the shaft (50) with universal coupling (51), as well as the plate pieces (49-48-47), are each other substantially near and configure means for the fixation of another piece of side plate (52), wherein part of the takeoff (7) is coupled with and, further, in the posterior portion of the tubes (45), its union plate (46) has a transition box (53) fixed therewith which, afterwards, ends in the shape of a wedge (54), wherein a vertical link-pin (55) is crossed over, for articulated coupling with a piece such as a corner stand (56) which, in turn, such as FIGS. 21 and 22 illustrate, constitutes support for this set to be fixed in the corner corresponding to the box (39) of the structure (1), wherein said box (39) includes a support (57) for an edge of a hydraulic cylinder (58), whose other edge is jointly fixed in other support (59) provided for in the body of the shaft (6).

Figure 23:
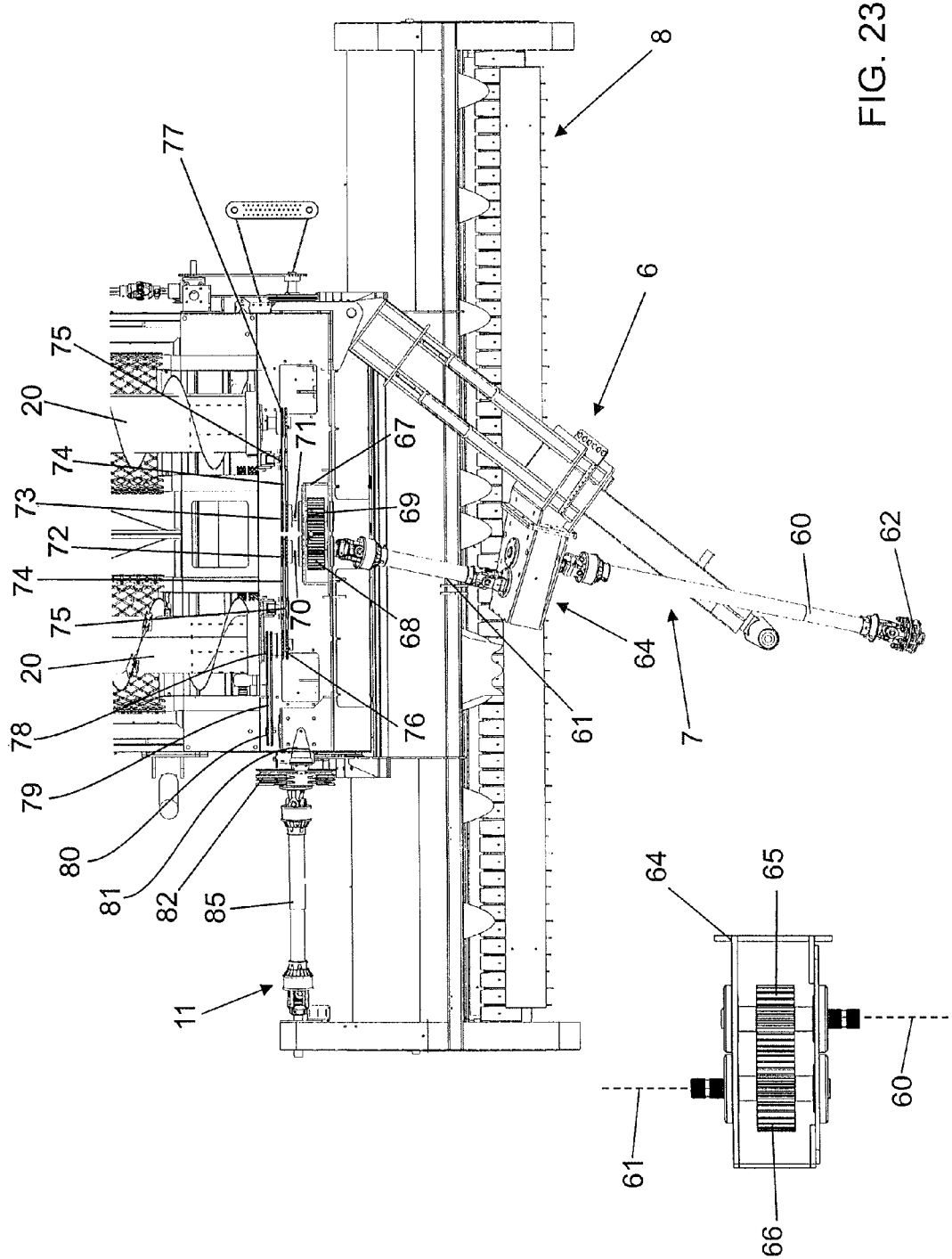
FIGS. 23 and 24 are perspective views of the takeoff set to be coupled with the tractor power socket.
Figure 24:
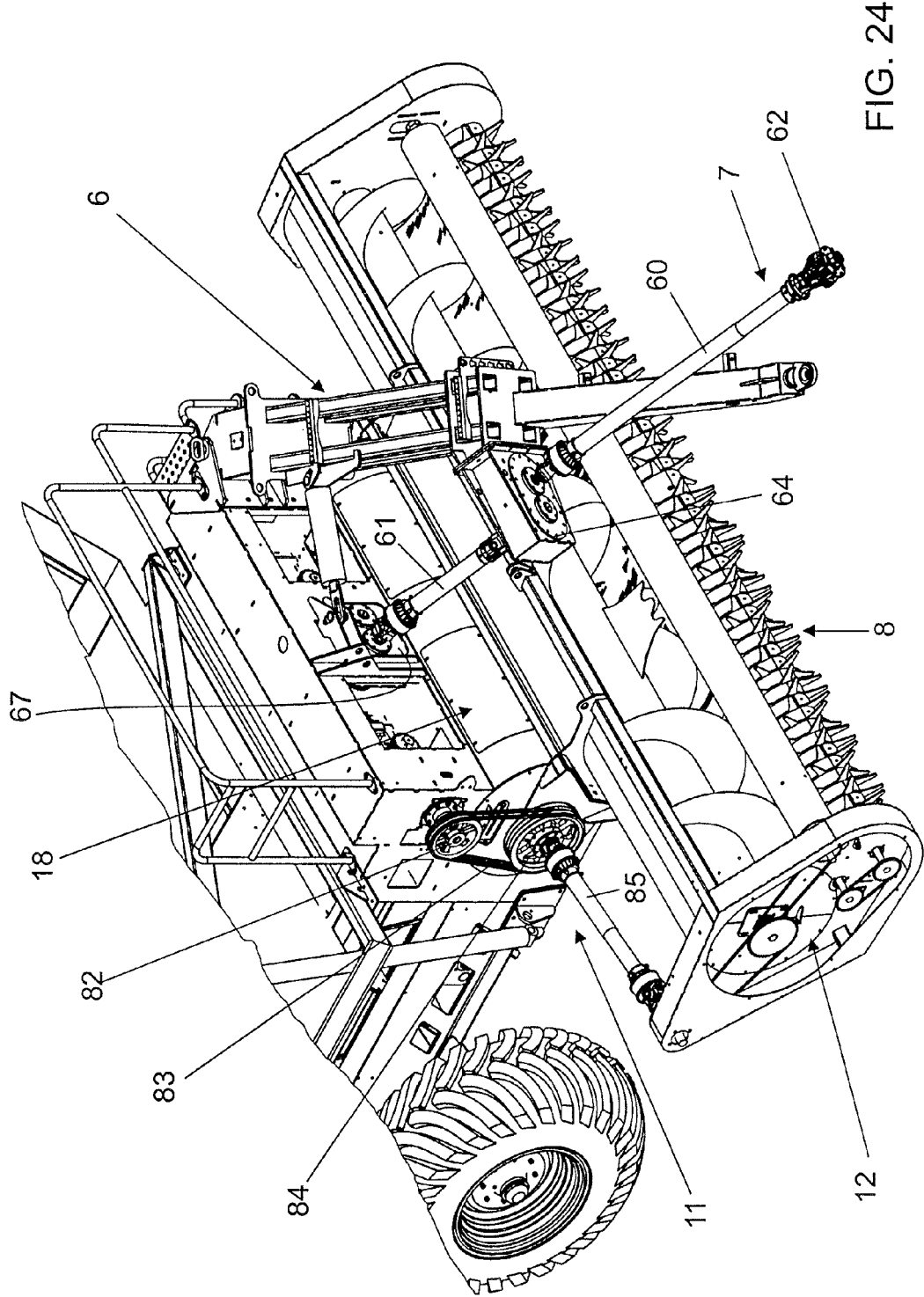

As FIGS. 23 and 24 illustrate, the takeoff set (7) is formed by two sections of cardan axis, one of which is anterior (60) and the other is posterior (61), in which the first one has its distal edge with friction (62) and universal coupling (63) for being coupled with the tractor power socket, whereas the other edge is coupled with a first transmission box (64) which, in turn, is fixed on the side of the shaft (6), this box being provided with two gears (65-66) and corresponding axis, through which universal joints couple one of them with the first cardan (60) and the other, with the second (61) which, in turn, has its other edge equally coupled with a second transmission box (67), which is equally provided with two gears (68-69), wherein two outlet axis are formed (70-71), both with gears (72-73) that, through chains (74), tensioners (75) and other gears (76-77), configure a transmission for the rotational movement of the beating cylinders (20), one of which includes a second gear (78) that, by means of a chain (79), is synchronized with another gear (80) of a third transmission box (81), whose outlet axis includes a pulley (82) for the coupling with the right side transmission (11), wherein a belt (83) is coupled with another pulley (84) mounted in the axis of the distributing roller (18) and, in this same axis of said pulley (84), it is coupled the edge corresponding to a third cardan (85), whose other edge is synchronized for the rotational movement of the takeoff set (12) mounted inside the box (10) of the gathering set (8).

Figure 25:
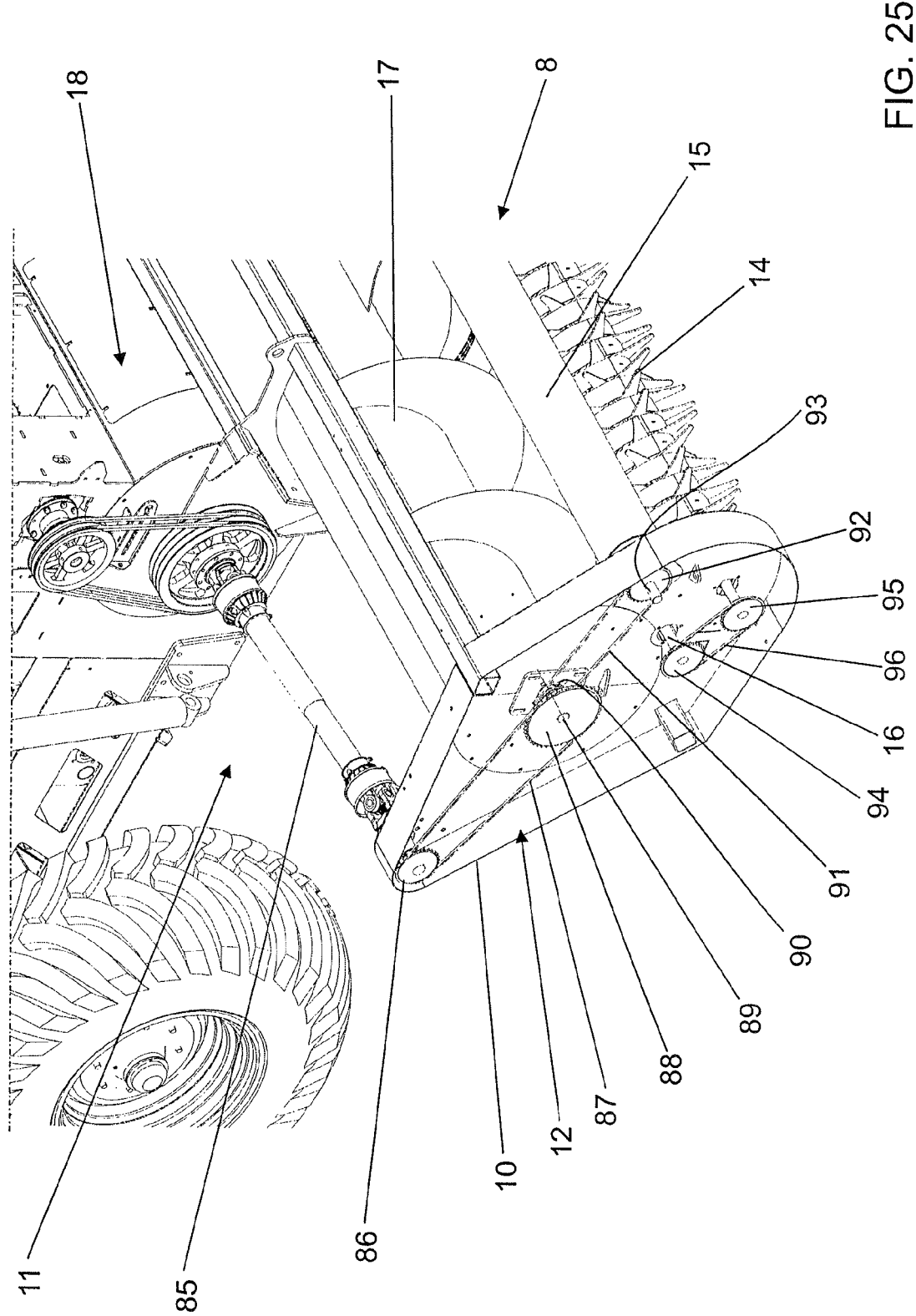
FIGS. 25-27 depict the takeoff transmissions of the gathering set.
Figure 26:
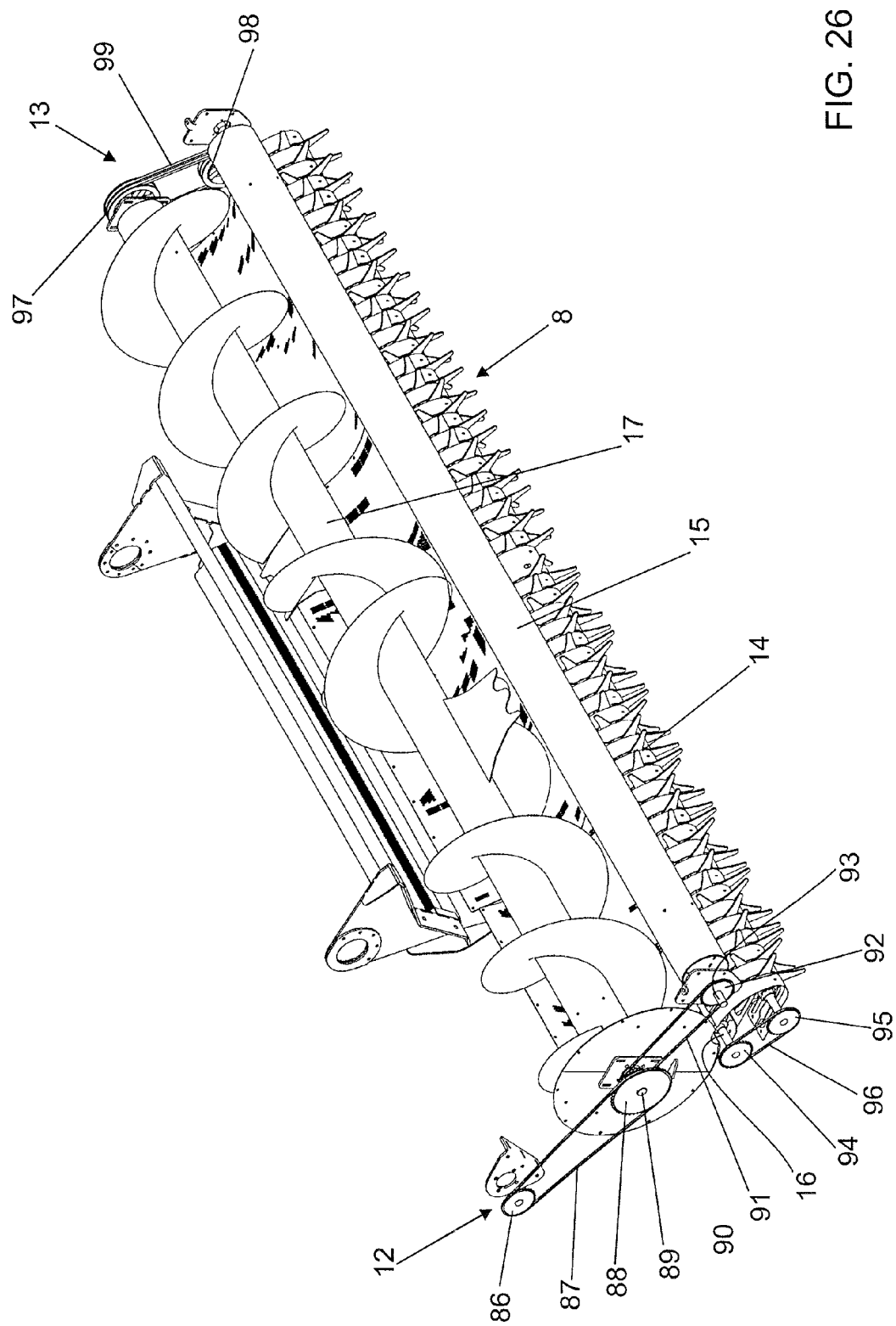
Figure 27:
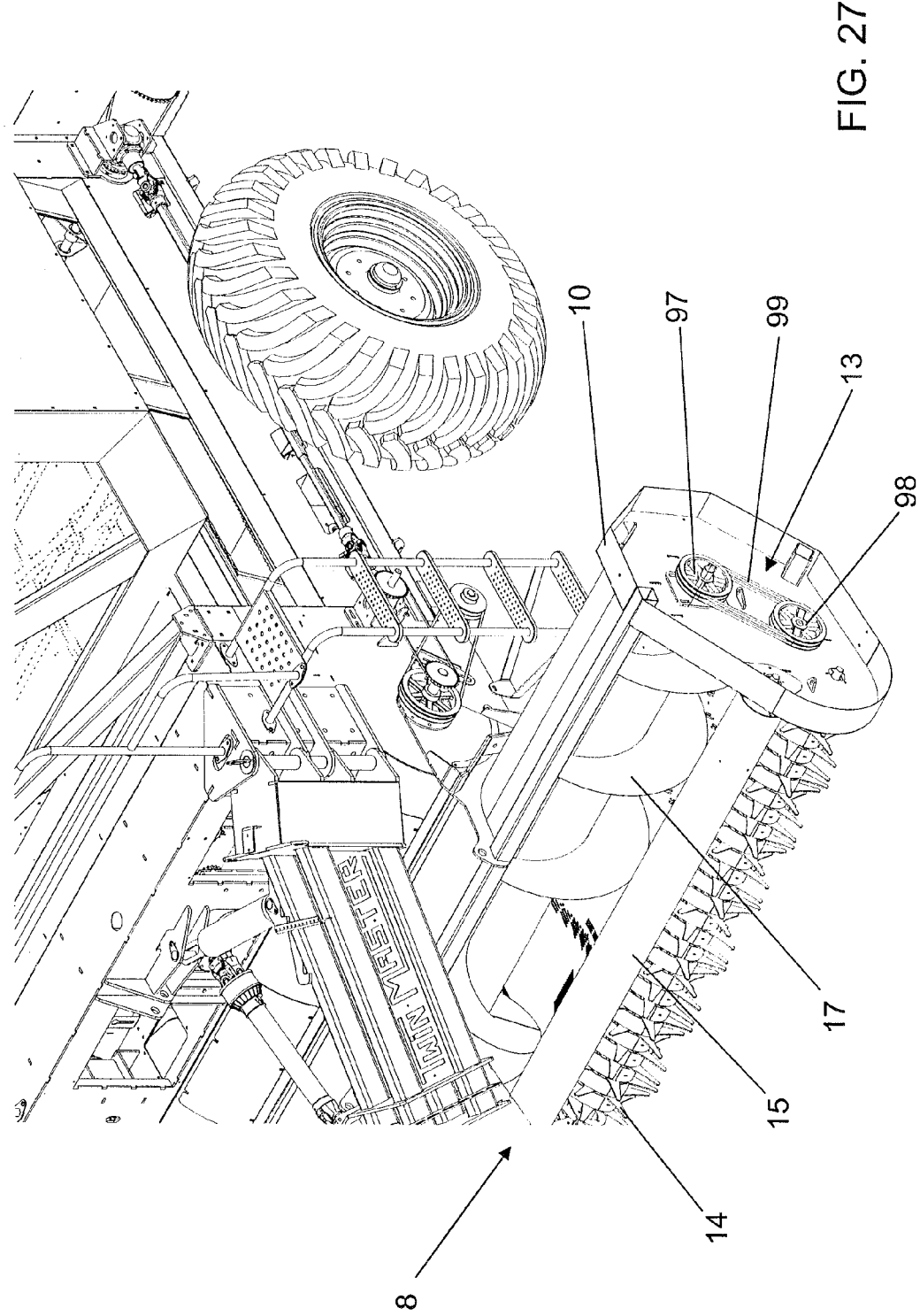

FIG. 25 illustrates the takeoff set (12), by which it is noted that the same is integrally mounted inside the side box (10) of the gathering set (8), wherein that cardan (85) is coupled with a first gear (86) and, by means of a chain (87) and another gear (88), it transmits the rotational movement to the axis (89) of the joining roller (17), whereas in this same axis (89) is mounted another gear (90) with a chain (91) coupled with another gear (92) which, in turn, is fixed in the axis (93) of the even roller (15), under which another even roller (16) and the gathering roller (14) have their edges of axis with gears (94) and (95) synchronized by chain (96), however, the rotational movement of the same is obtained from the opposite side by the takeoff (13) which, in turn, such as FIGS. 26 and 27 illustrate, is formed by two pulleys (97-98) interconnected by belts (99), as well as the first pulley is coupled with the axis of the joining roller (17), whereas the other pulley (98) is coupled with the axis of the even roller (16), thereby completing the synchronization of transmission as shown in FIG. 26, that is, the rotational movement of the cardan (85) is transmitted to the first gear (86) and from this one to the gear (88) of the joining roller (17) which, in turn, transmits this rotational movement through the chain (91) and gear (92) to the even roller (15) and, furthermore, the opposite edge of the joining roller (17) transmits the rotational movement by transmission (13) through the pulleys (97-98) to the even roller (16) which, finally, through the gears (94-95) and chain (96) transmits rotational movement to the gathering roller (14).

Figure 28:
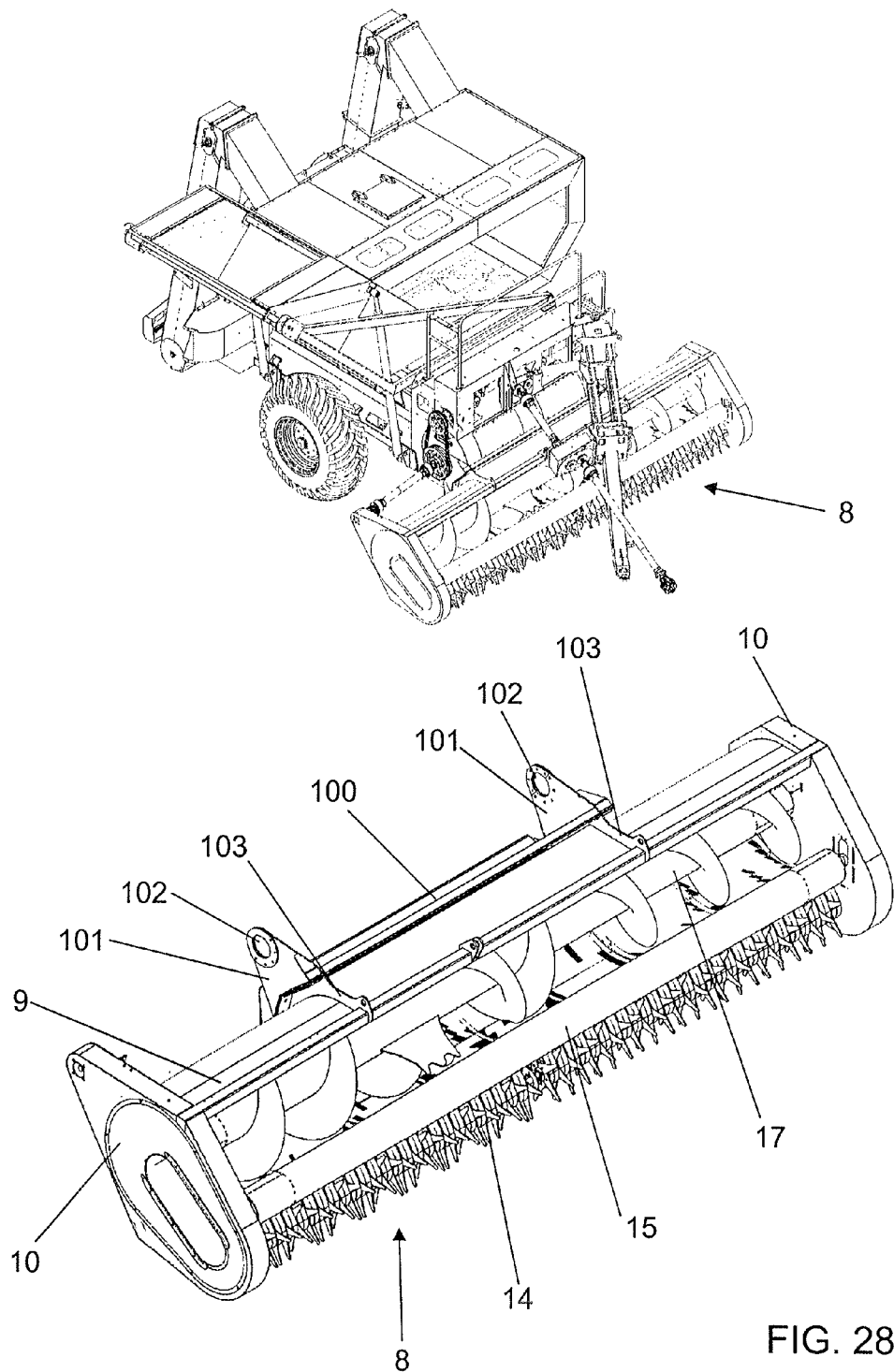
Figure 29:
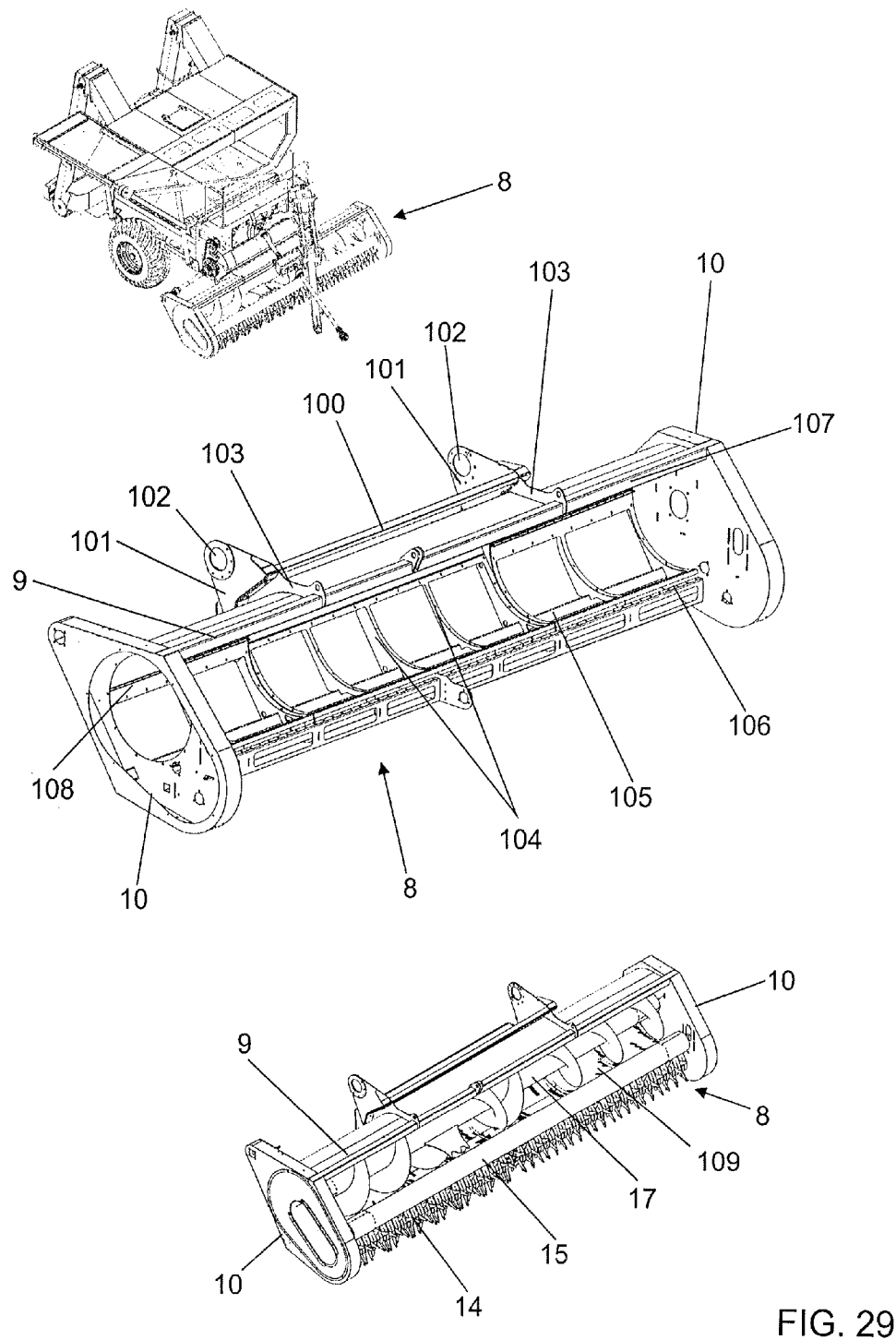
Figure 30:
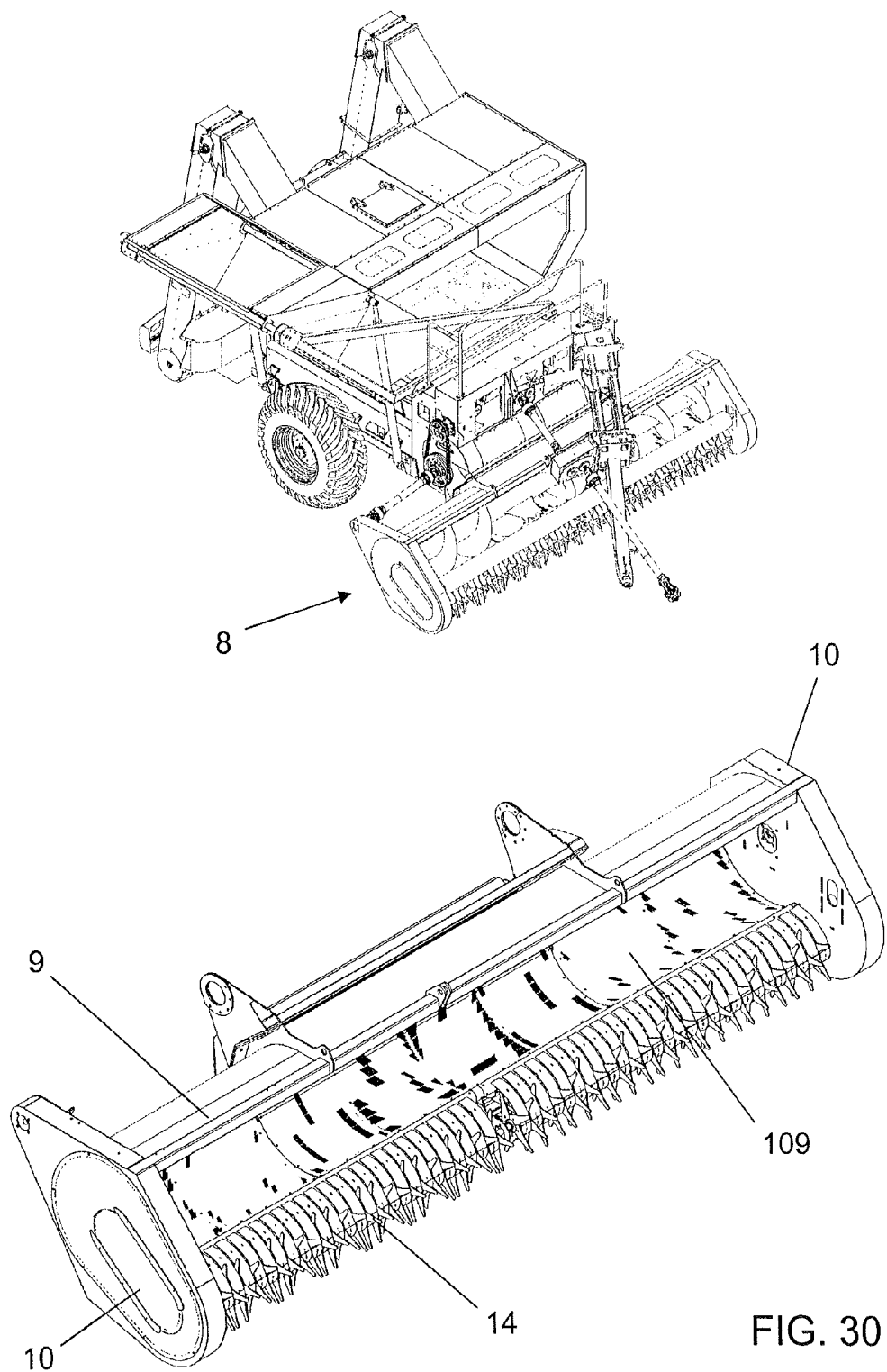

FIGS. 28-30 shows in an enlarged view the double gathering set (8), by which it is noted that the same comprises a posterior coupling in the shape of a rack (100), whose edges are defined by two rectangular plates (101), the vertexes of which are round and hollowed (102) directed to backwards, wherein they configure bearing points that are articulated for the coupling in the edges of the distributing roller (18), whereas through the basis of said plates they are integrated with legs (103) that are fixed in the posterior portion of the structure (9) that, besides of being bordered by the boxes (10), they also have an ordinarily circular shape such as a barrier, wherein their anterior portion is open, whereas the posterior portion of which is divided into ribs (104) positioned between the bars (105-106-107-108), so that above said ribs a closure in the shape of a plate sieve (109) may be placed, which configures a lodging for the joining roller (17) and, in front of this, the double gathering roller (14), the guiding cylinder (15) and the even roller (16) are positioned.

Figure 32:
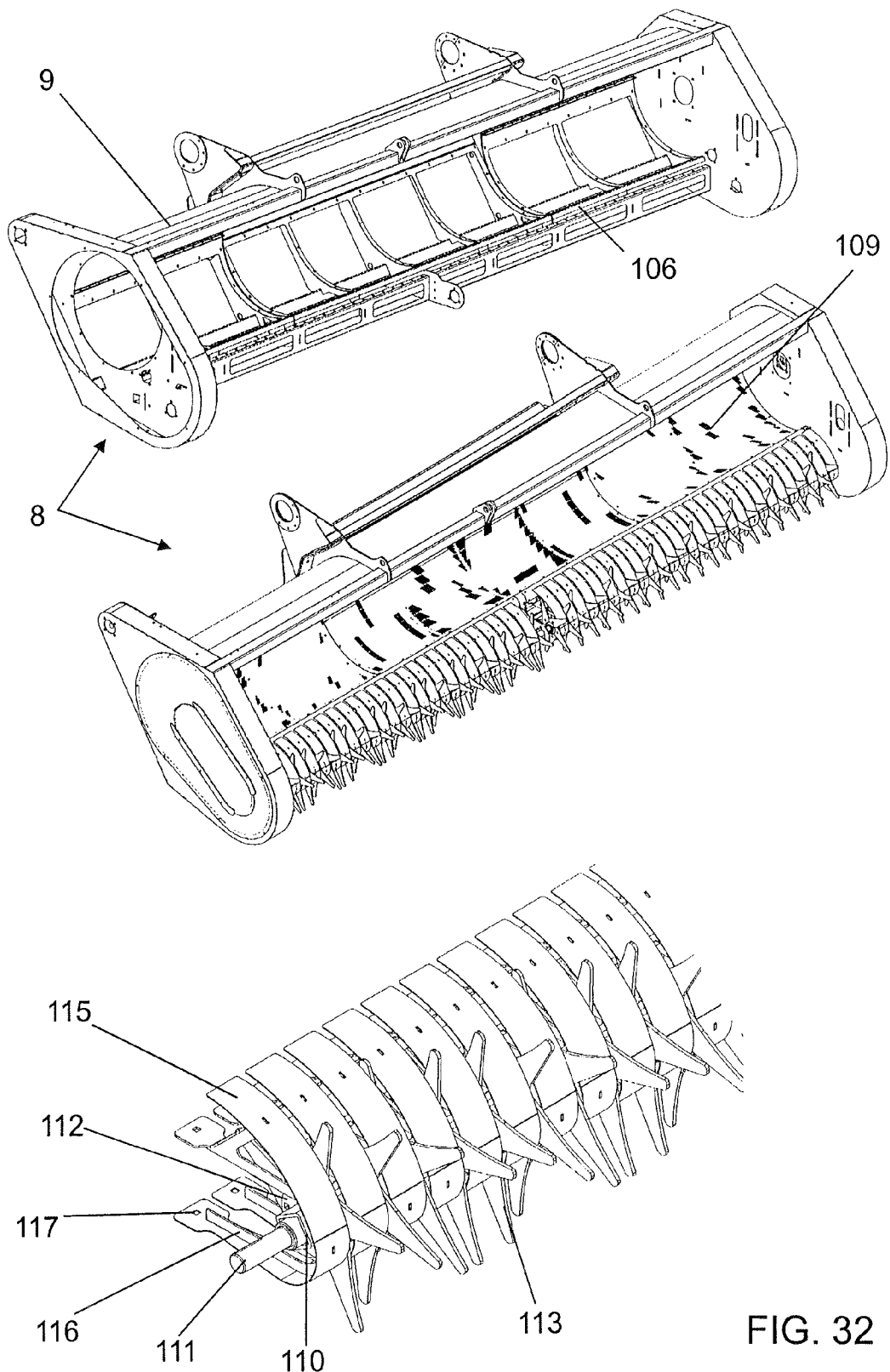
Figure 33:
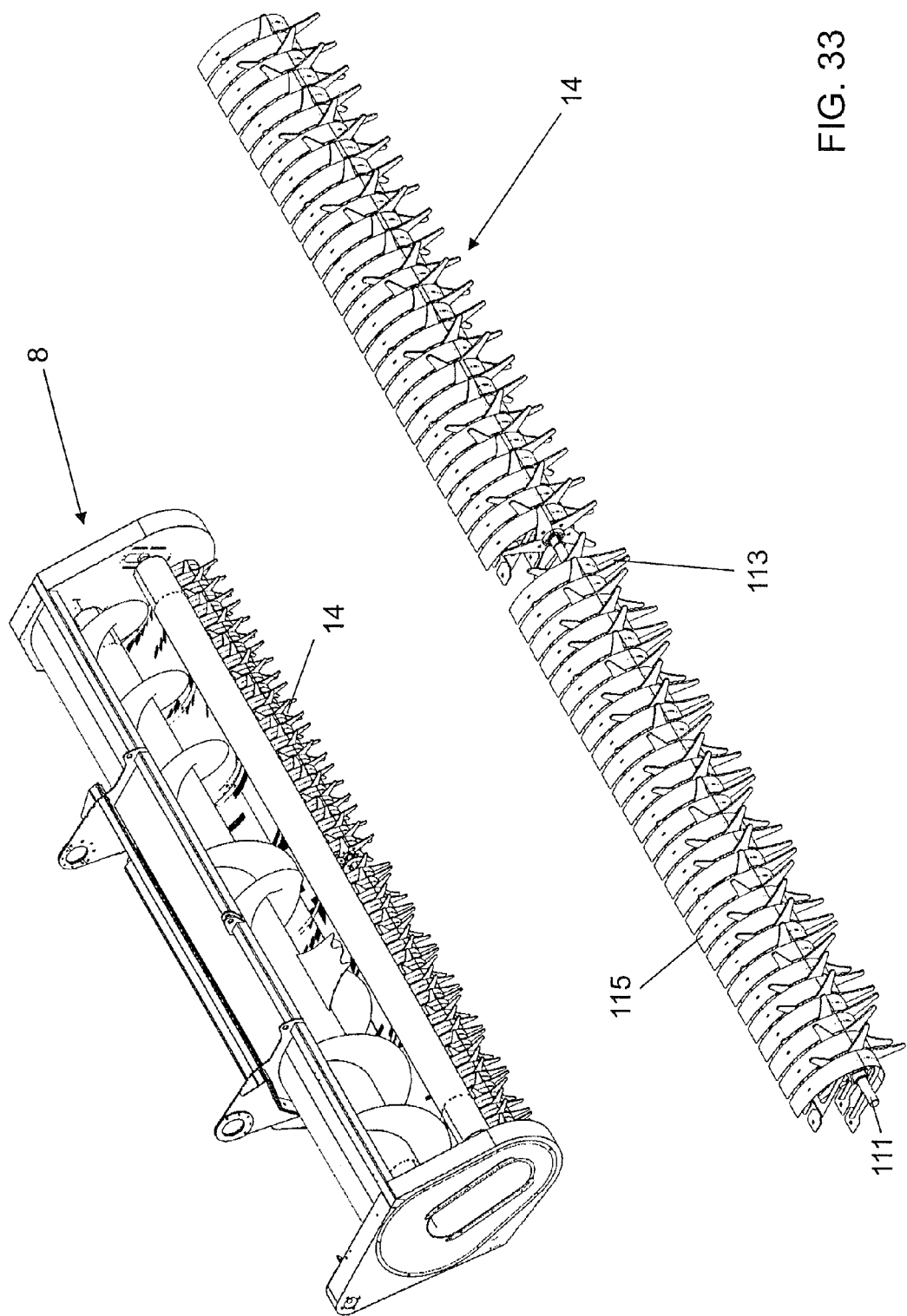

The gathering roller (14), as it has already been said, is formed by two equal sections, as well as said gathering roller (14) is initially detailed in the FIG. 31, by which it is noted that the same is constituted by an mixed axis formed by a square tube (110), whose edges receive cylindrical ends (111) for the bearing and fixation of the means for their rotational movement whereas, along the square tube (111), are equidistantly distributed various discs (112), all of them is equally provided with ordinarily triangular plates, radially placed, which configure gathering grips (113), each disc is preferably provided with five plates or gathering grips, and furthermore, this disc has a hollowed center by a hole in the shape of a ring of round teeth (114), which cooperate with each other so that the same may be positioned in different angles in relation with the four corners of said tube (110), consequently, the grips are also each other angularly positioned in a different manner, so that said grips are not aligned, and, furthermore, such as FIGS. 31 and 32 illustrate, said discs (112) are each other equally spaced by C-shaped plate strips (115) which, by the round side, adjust onto the discs, and for such purposes, their internal side includes a perpendicular supplemented wall (116), and, furthermore, by the opposite side, the lower edge of each plate strip (115) has means (117) for fixation over the bars (116), wherein said plate strips configure means to guide the gathered material, keeping them in a sliding backward movement, among the even discs (15-16) until they reach the joining roller (17).

Figure 34:
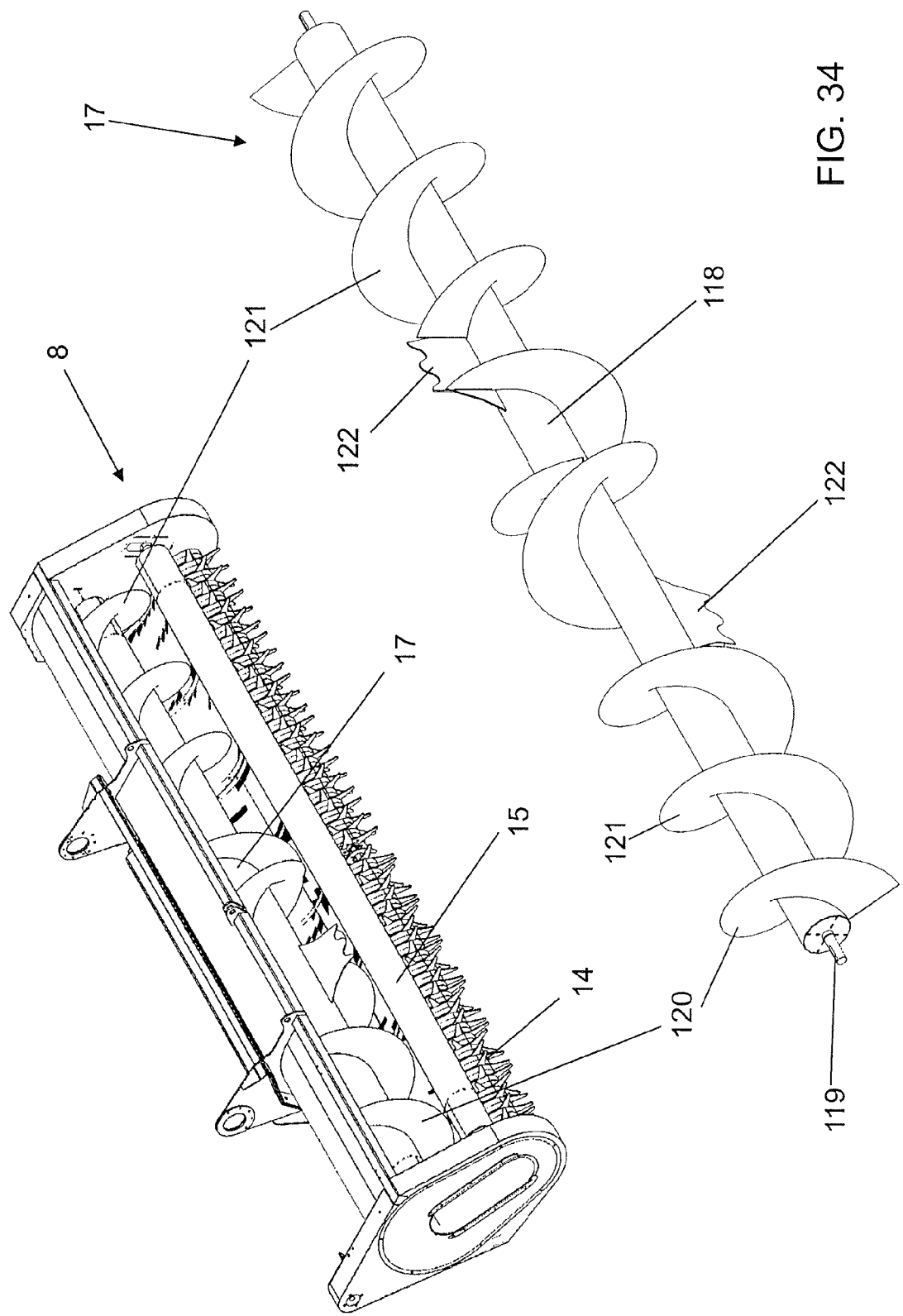
FIGS. 34-36 are perspective views depicting the details of the joining roller.

FIG. 34 show in details the joining roller (17), by which it is noted that the same is constituted by a central tube (118), whose capped edges include ends of axis (119) to the bearing and fixation of means for their rotational movement, as well as, two reverse threads (120-121) are placed along with said tube, whose spirals are directed in a direction to displace the gathered branches to the median portion of said roller, wherein the end of each thread at least includes a radially placed throwing shovel (122), strategically positioned to throw backwards the gathered material of the plants, driven it to the distributing roller (18).

Figure 35:
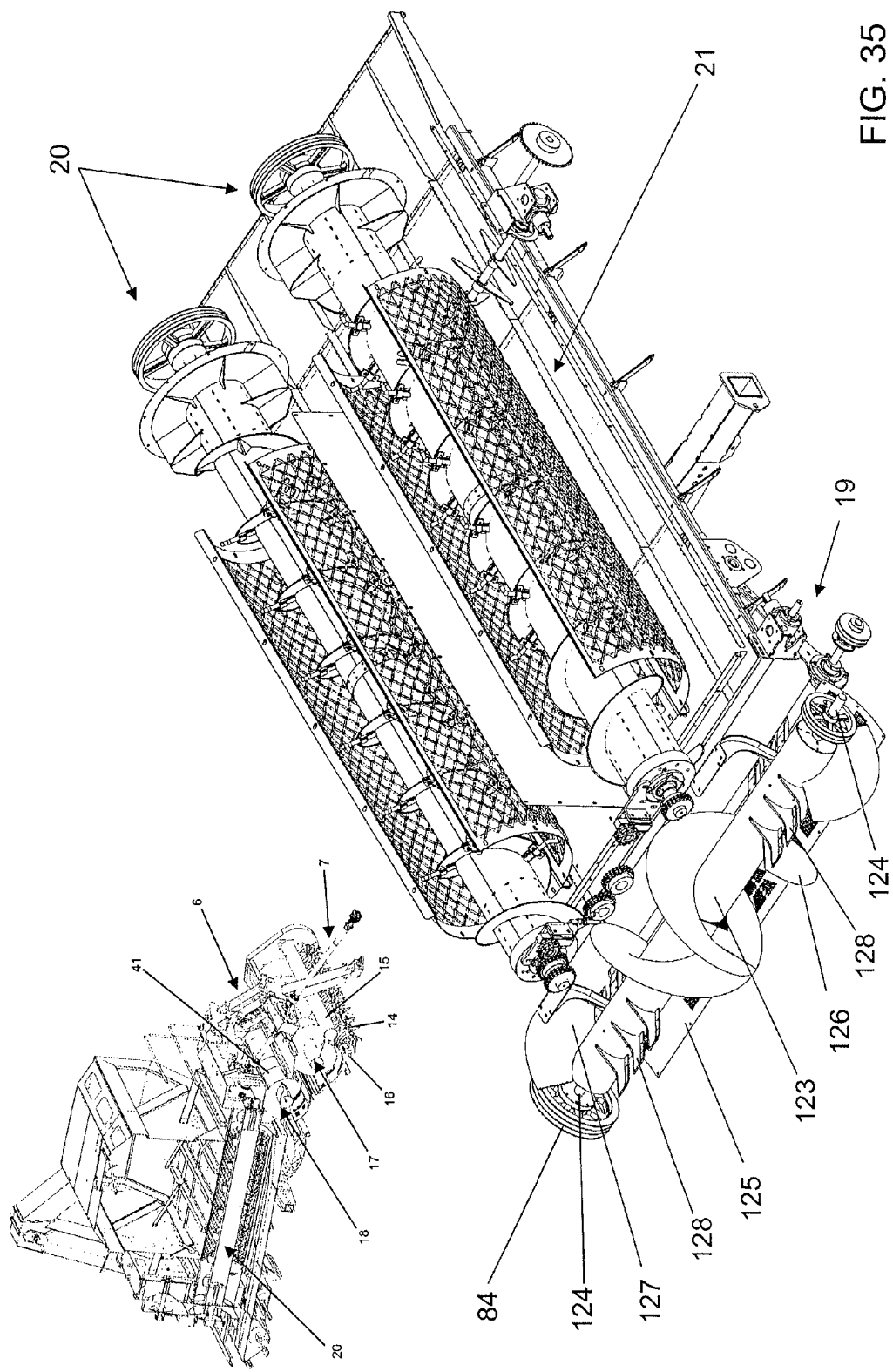
Figure 36:
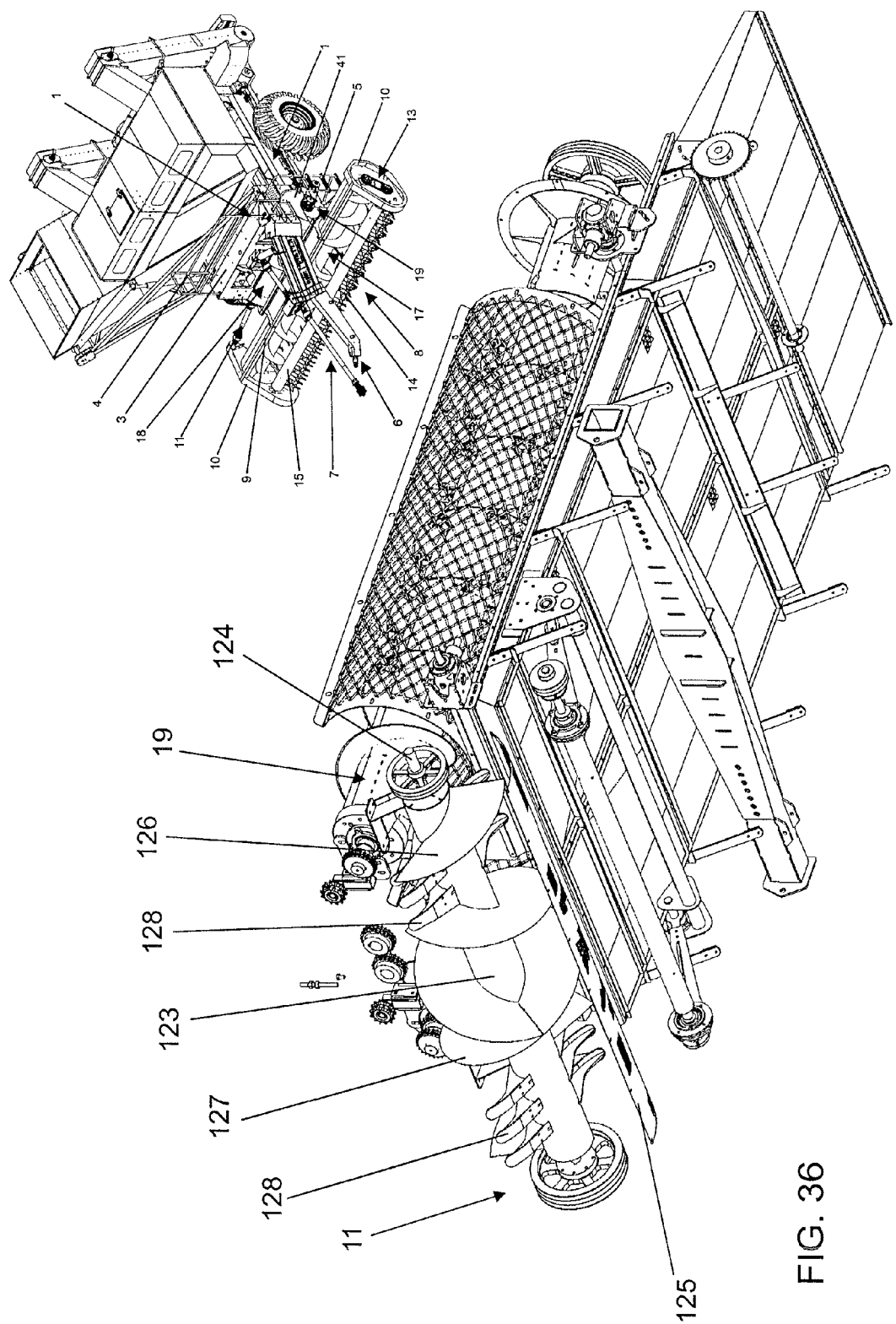

The distributing roller (18) is illustrated in details in FIGS. 35 and 36, by which it is noted that the same, as it has been said already, received the gathered material afterwards the joining roller (17) and, for such purposes, it is constituted by a tube-shaped central portion (123), whose edges have ends of axis (124) to receive the transmission sets (11-19) that are used in their rotational movement and transmission of their movement to other sets and, furthermore, said tube (123), together with a lower sieve (125) is mounted inside the structure (1), more specifically in its front portion and inside the cylindrical box (41), wherein said tube (123) also includes two reverse threads (126-127), driven to divide the flow of the material coming from the joining roller (17) into two uniform flows that are displaced towards the edges of said tube (123), wherein sets of throwing grips (128) are provided, one set at each side, preferably provided with three grips on each side, wherein all are radially placed such as an helix, crossing over said tube (123) and, furthermore, such grips are aligned at each side, so that they proceed to throw the processed material inside the beating cylinders (20).

Figure 37:
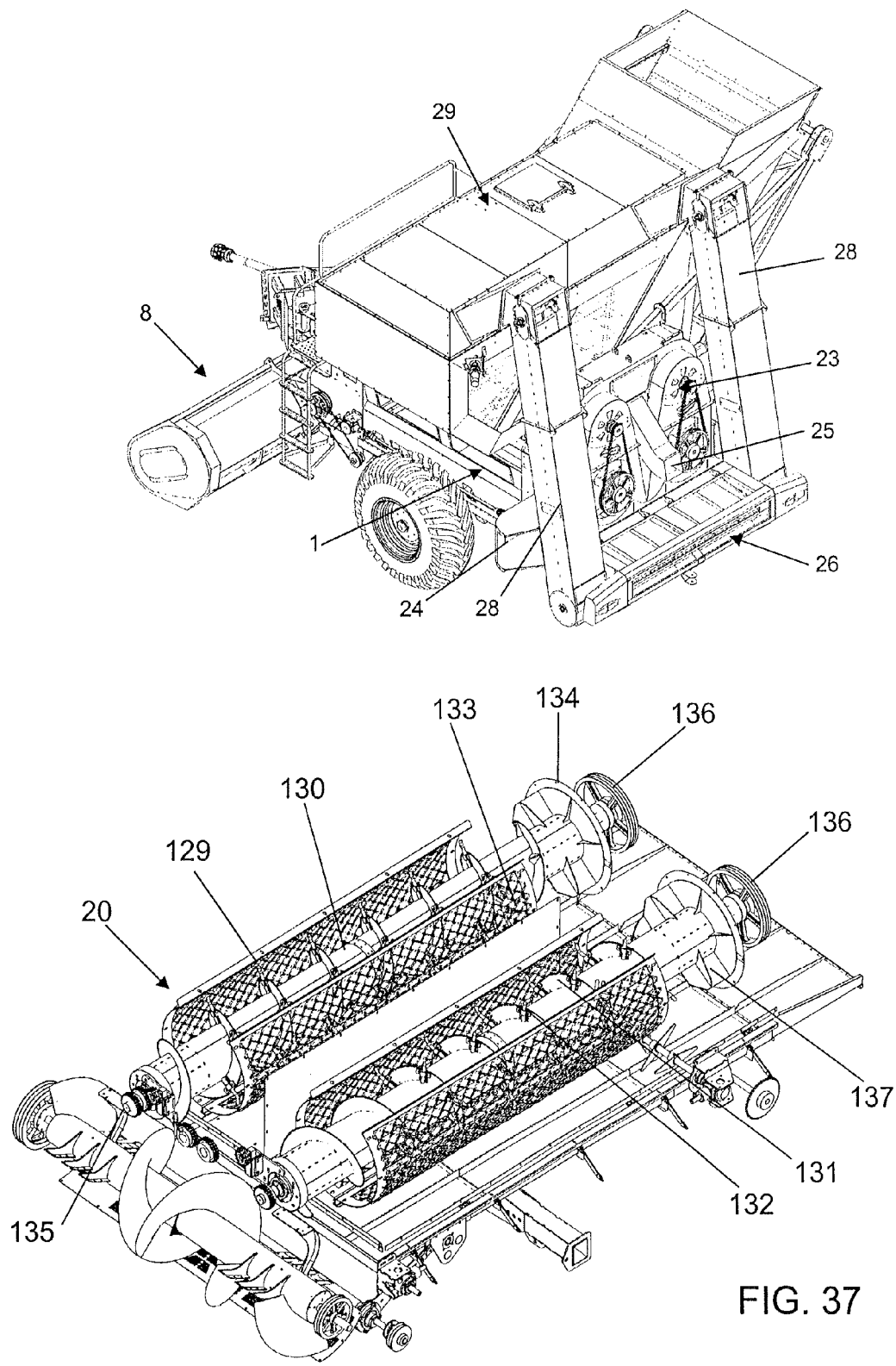
FIGS. 37 and 38 are perspective views focusing on the assembling details of the beating rollers.
Figure 38:
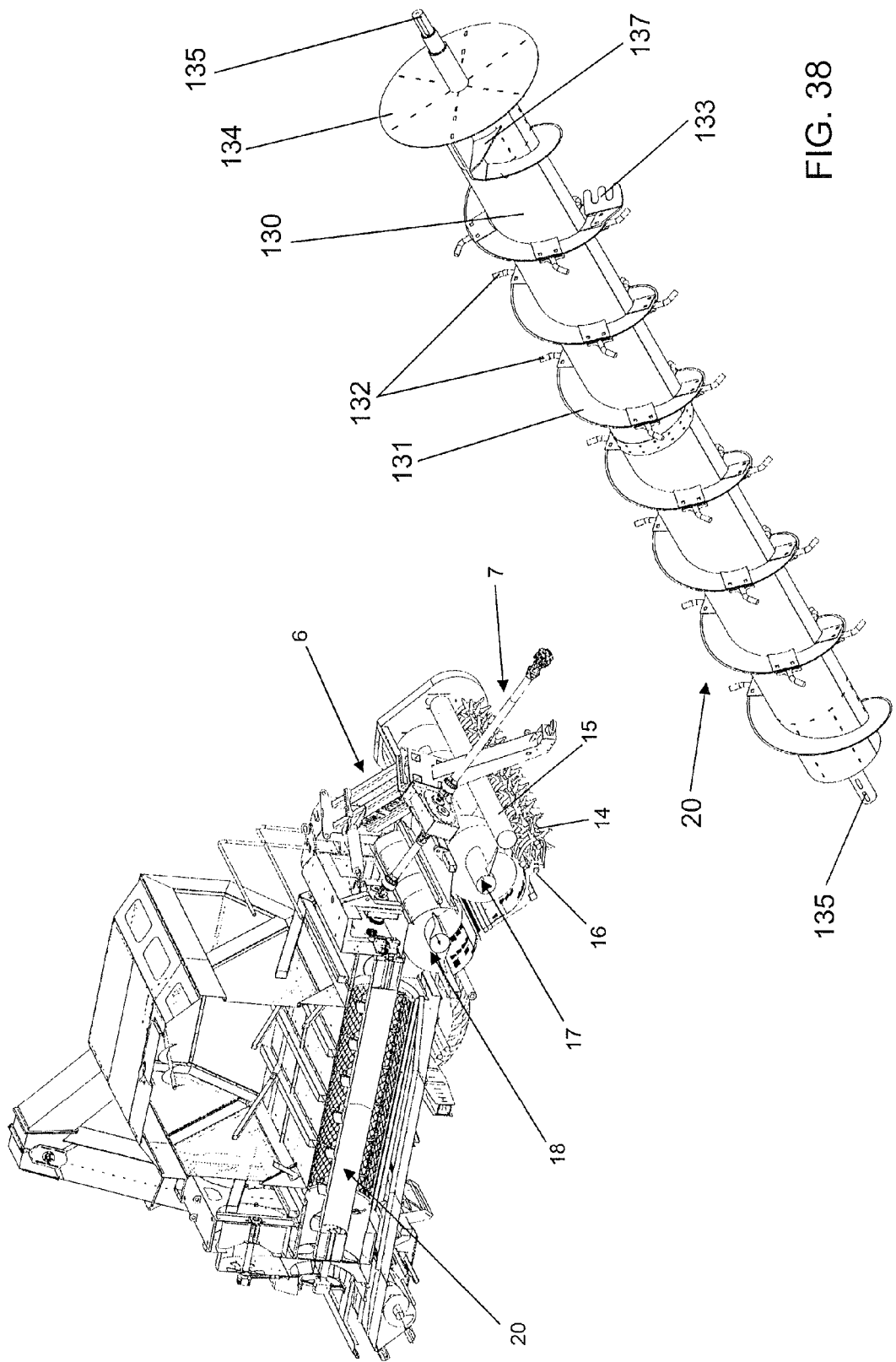

The sets of beating cylinders (20) are illustrated in details in the FIGS. 37 and 38, by which it is noted that the same is featured in that each of them is constituted by a combination of an ordinarily cylindrical sieve (129), longitudinally assembled inside the corresponding space in the structure (1), wherein said screen configures a true processing tunnel, and it has internally a long beating cylinder (130), in the diameter of which a transporting thread (131) develops with radial fingers (132) and grips (133) and, furthermore, the edges of the cylinder (130) have discs (134), rear and front end of axis (135), the latter of which is designed for receiving and coupling the transmission set (7) for its rotational movement, whereas the rear ones receive the transmission pulleys (136) that cooperates in order for the rotational movement of said beating rollers (20) to be transmitted for the double ventilation and discharge set (23) and, in this portion, the end of each beating roller (130) has radial shovels (137) at least, which cooperate for throwing the thick straw through the mouths of said side outlets (24).

Figure 39:
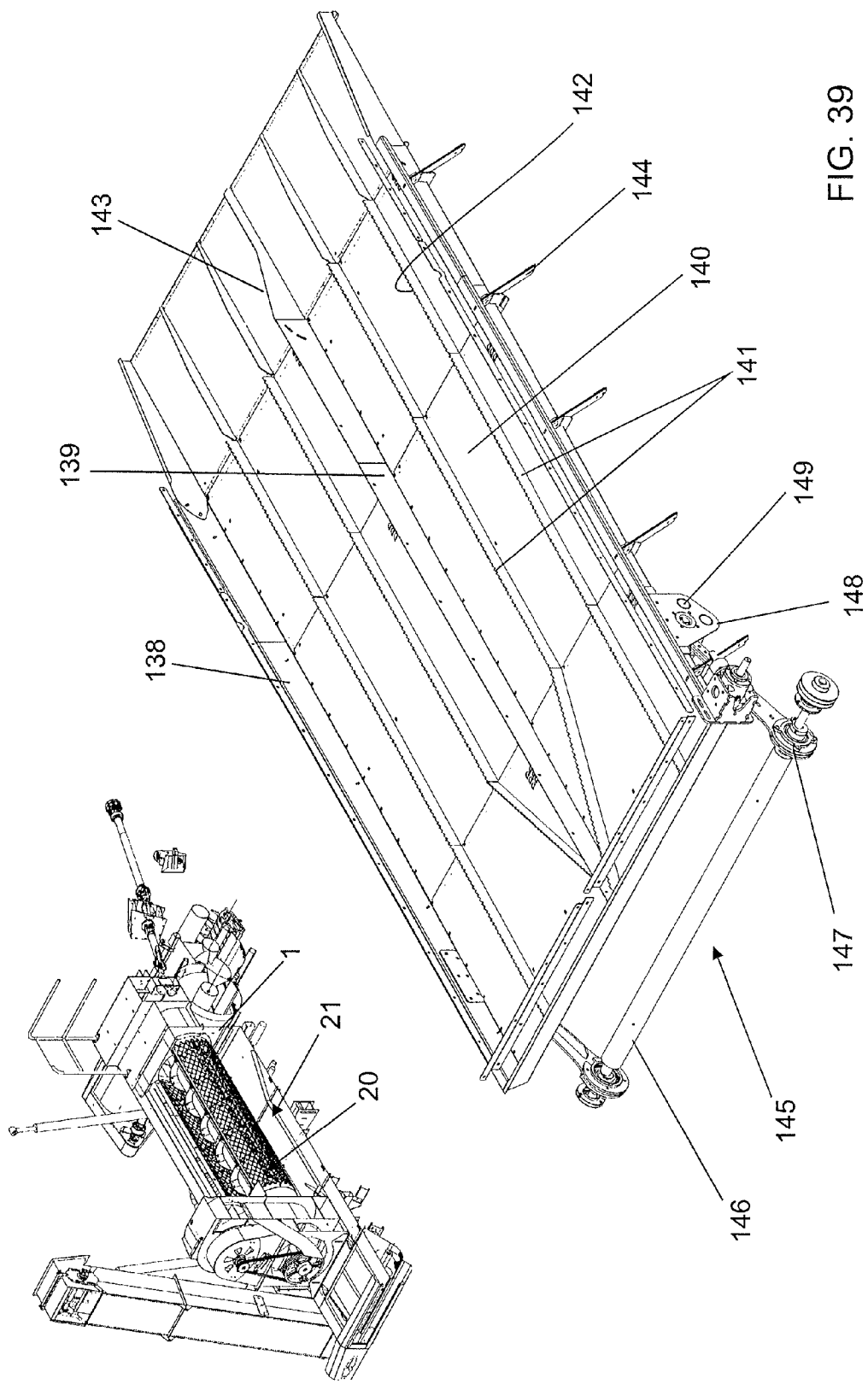
FIGS. 39 and 40 are perspective views detailing the vibrating sieve and its takeoff system.
Figure 40:
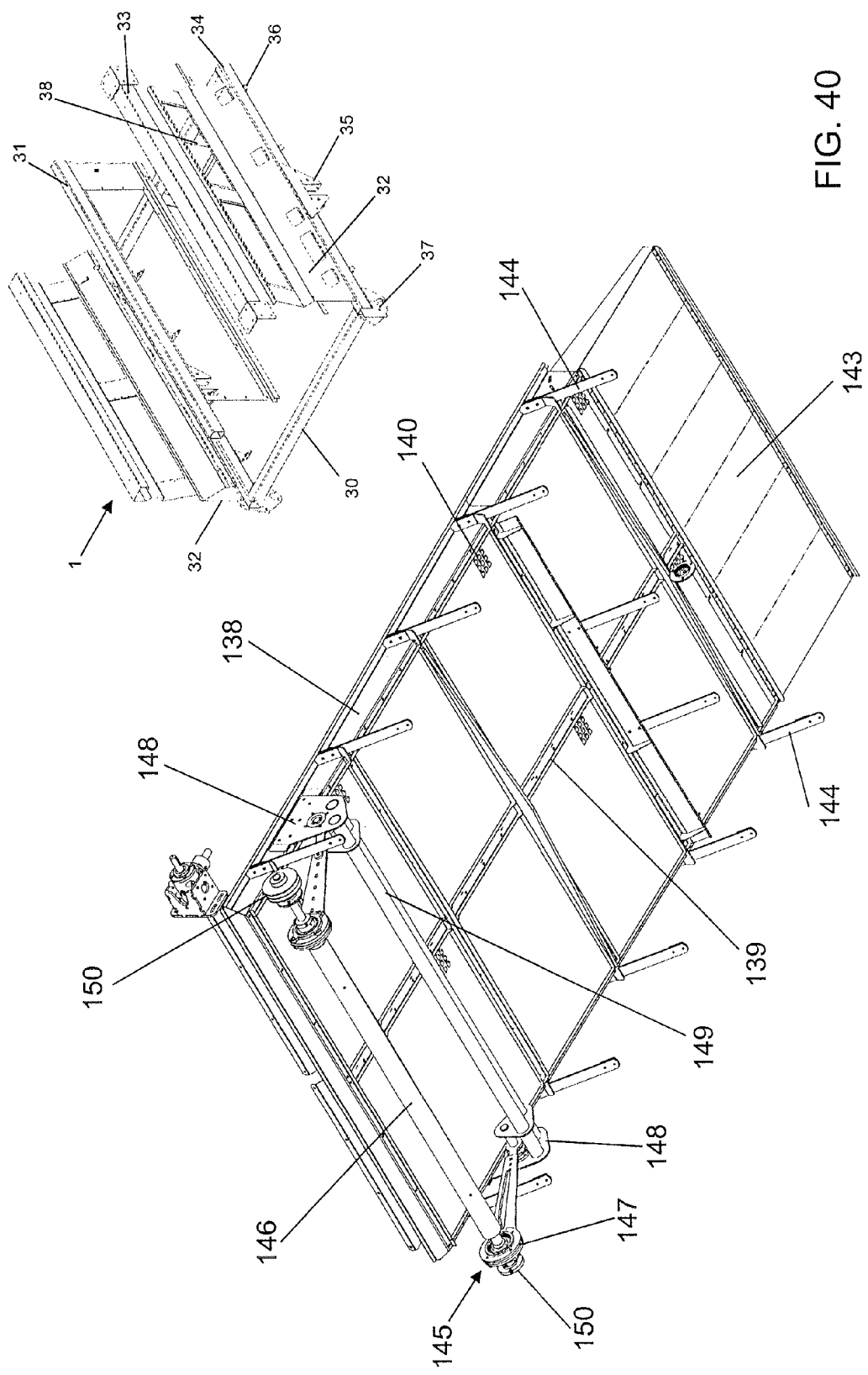

As it has been said before, onto the two beating cylinders (20) is mounted a true platform, which is the set of vibrating sieve (21), which is illustrated in details in the FIGS. 39 and 40, by which it is noted that the same is constituted by a rectangular frame (138) that cooperates to fit in the lower portion and inside the structure (1), this frame (138) being longitudinally divided by a top wall (139), so that onto its two longitudinal halves the beating cylinders (20) may work and, furthermore, these two halves are integrally filled by plate sieves (140), onto which longitudinal rulers (141) are set along, whose top borders are toothed (142) towards to grip the material under processing and to drag it backwards simultaneously with the vibration, so that this material under processing may discharge particles that are smaller than the bean grains (land, sand and others), and retaining only the beans and the thin straw, so that such materials may be driven by vibration till the end of the set, wherein said frame-shaped structure includes an outlet platform (143) which, in turn, finishes on the gathering channel of clean grains (26) and, before this one, the set passes on the double ventilation and discharge set (23) for the aspiration of the thin straw, so that only the clean grains may drop on the channel (26).

Regarding FIGS. 39 and 40 still, the structure (138) is fluctuantly fixed and, for such purposes, on its two side borders, various pieces in the shape of laminated springs (144) are distributed, whose top edges are fixed together various structural beams placed onto the frame (138), wherein the edges of said springs (144) are fixed on the supports (36) of the structure (1) and, furthermore, such as it is shown in FIG. 4, on the anterior portion of the frame (138) is mounted the vibrating set (145), which is constituted by a transversal axis (146) whose edges are in eccentric bearings (147) together with the supports (37) of the structure (1), and said eccentric bearings (147) includes vibrating arms that are coupled with supports (148), one at each side, interconnected by tubes (149), so that the latter and the supports (148) may be fixed on the frame (138), thereby finishing the necessary means for the vibration to be transmitted to said frame (138) with the rotational movement of the axis (146), whose ends of axis include pulleys (150) for coupling with the transmission systems (19).

Figure 41:
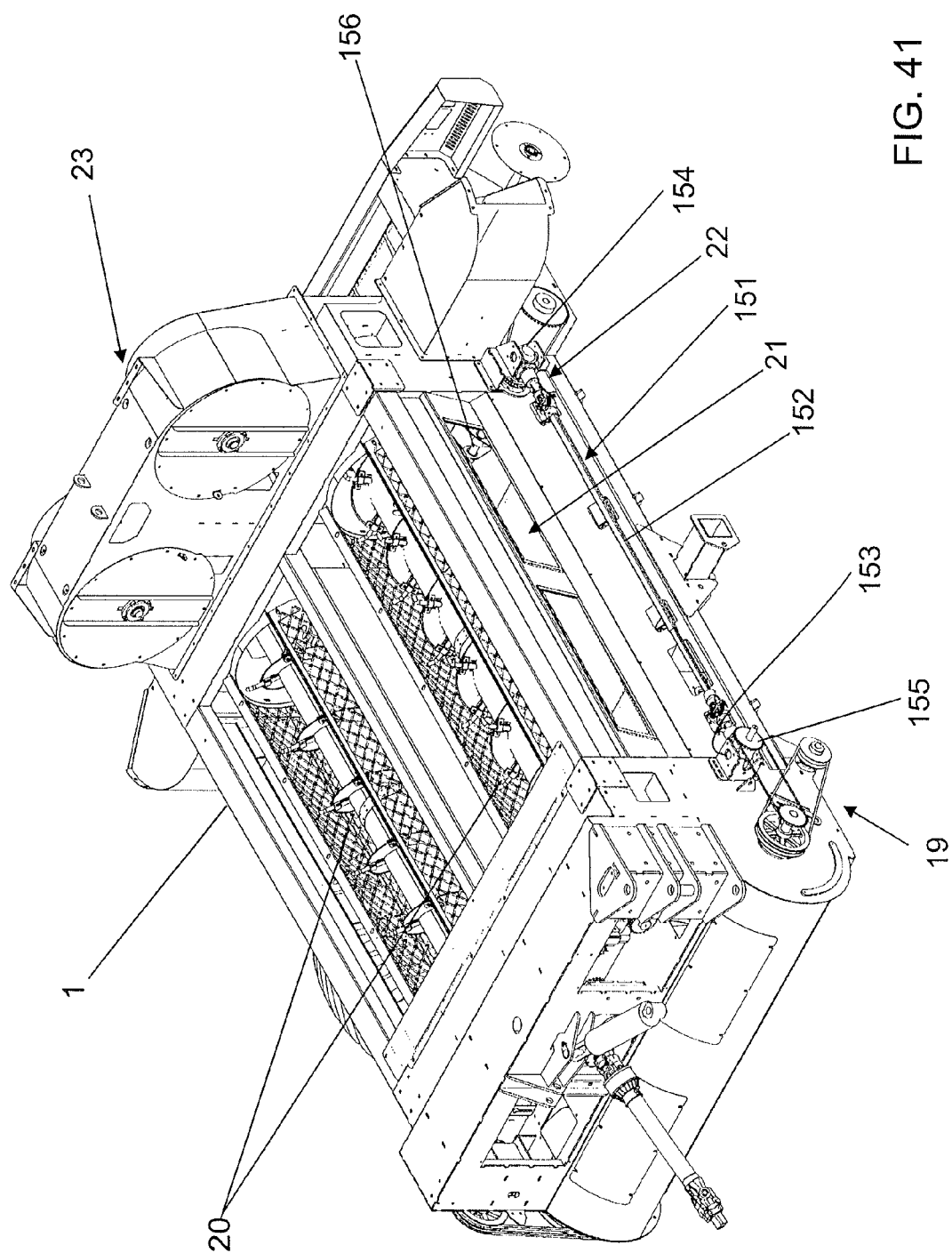
FIGS. 41 and 42 are perspective views detailing the spreading set and its takeoff system.
Figure 42:
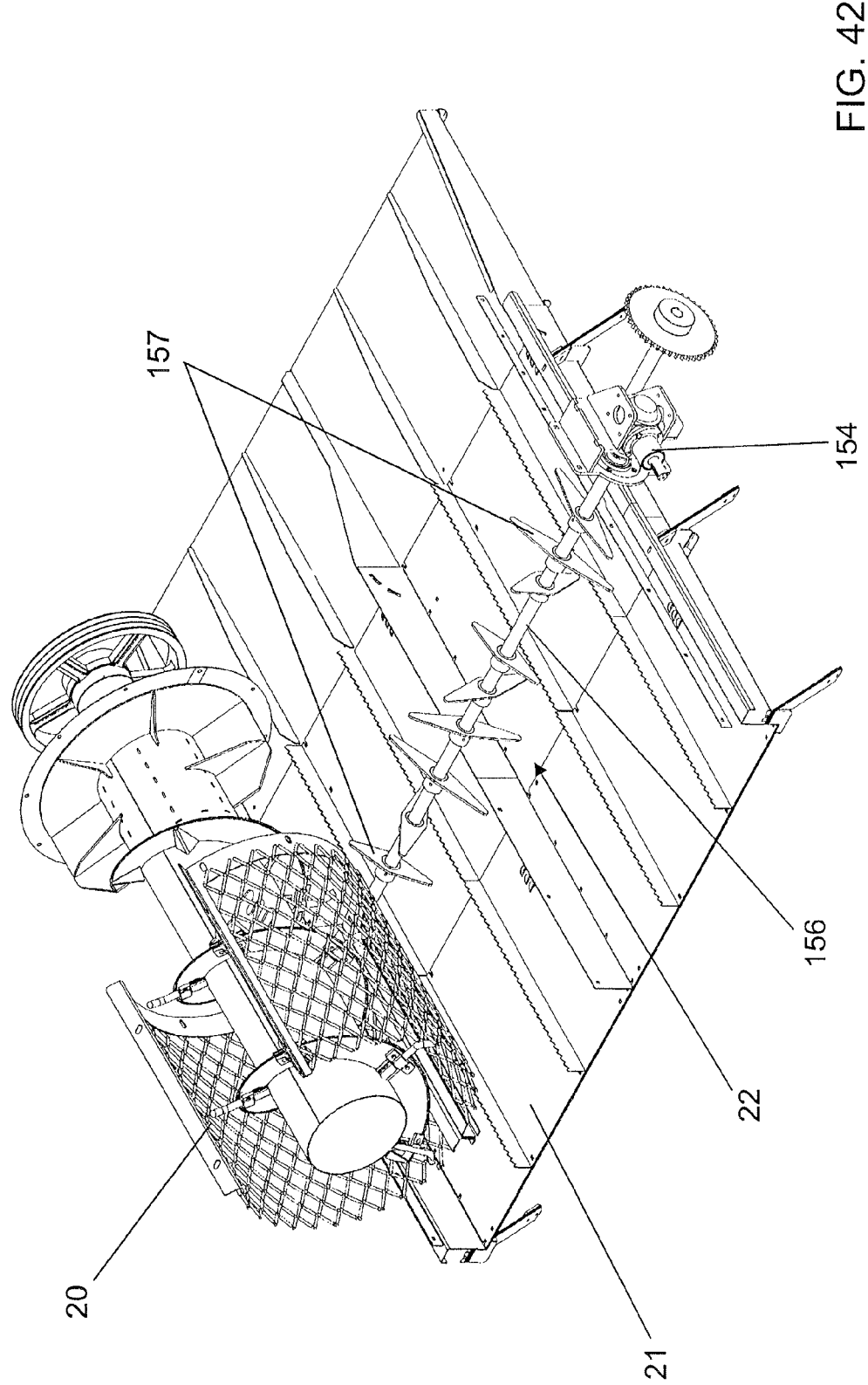

FIG. 41 shows the first details of the spreading set (22), which comprises, initially, a transmission system (151) mounted together with the left side of the structure (1), wherein a cardan axis (152) is provided, whose edges are coupled with transmission boxes (153-154), both of which having inlet and outlet perpendicular axis, so that, in the anterior box (153), the inlet axis with the gear (155) may be coupled with the transmission (19) for the power socket, whereas the other box (154) has its outlet coupled with the axis (156) of the spreading set (22), and this axis transversally extends between the beating roller set (20) and the vibrating sieve set (21), wherein the same, such as shown in FIG. 42, include various helix-like pieces (157), that are distributed so that their shovels may shake the material under processing for the uniform distribution on the vibrating sieve (21) and to avoid abnormal accumulation.

Figure 43:
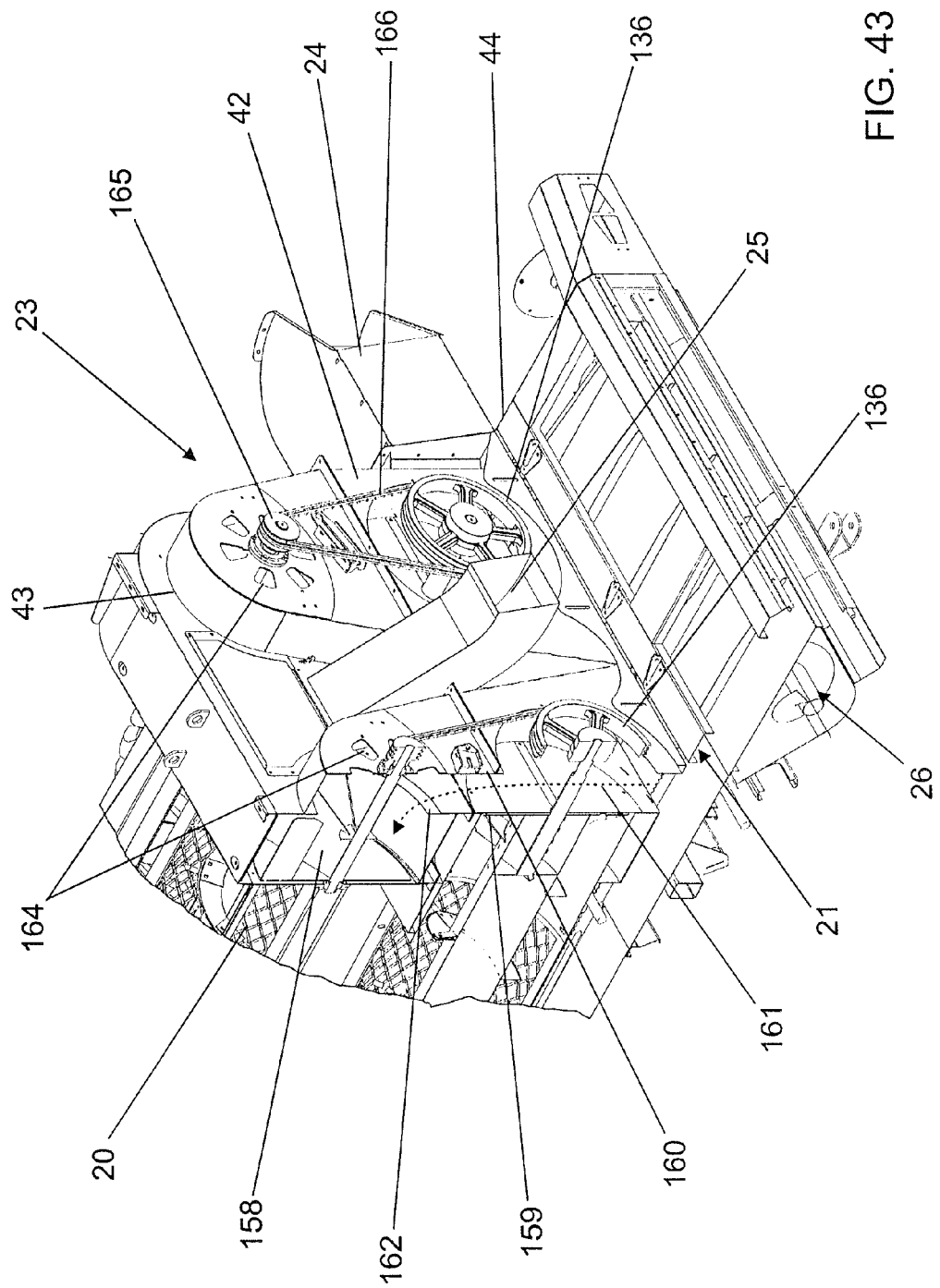
FIGS. 43-46 are views focusing on the details of the cleaning set and discard of thick and thin straws.
Figure 44:
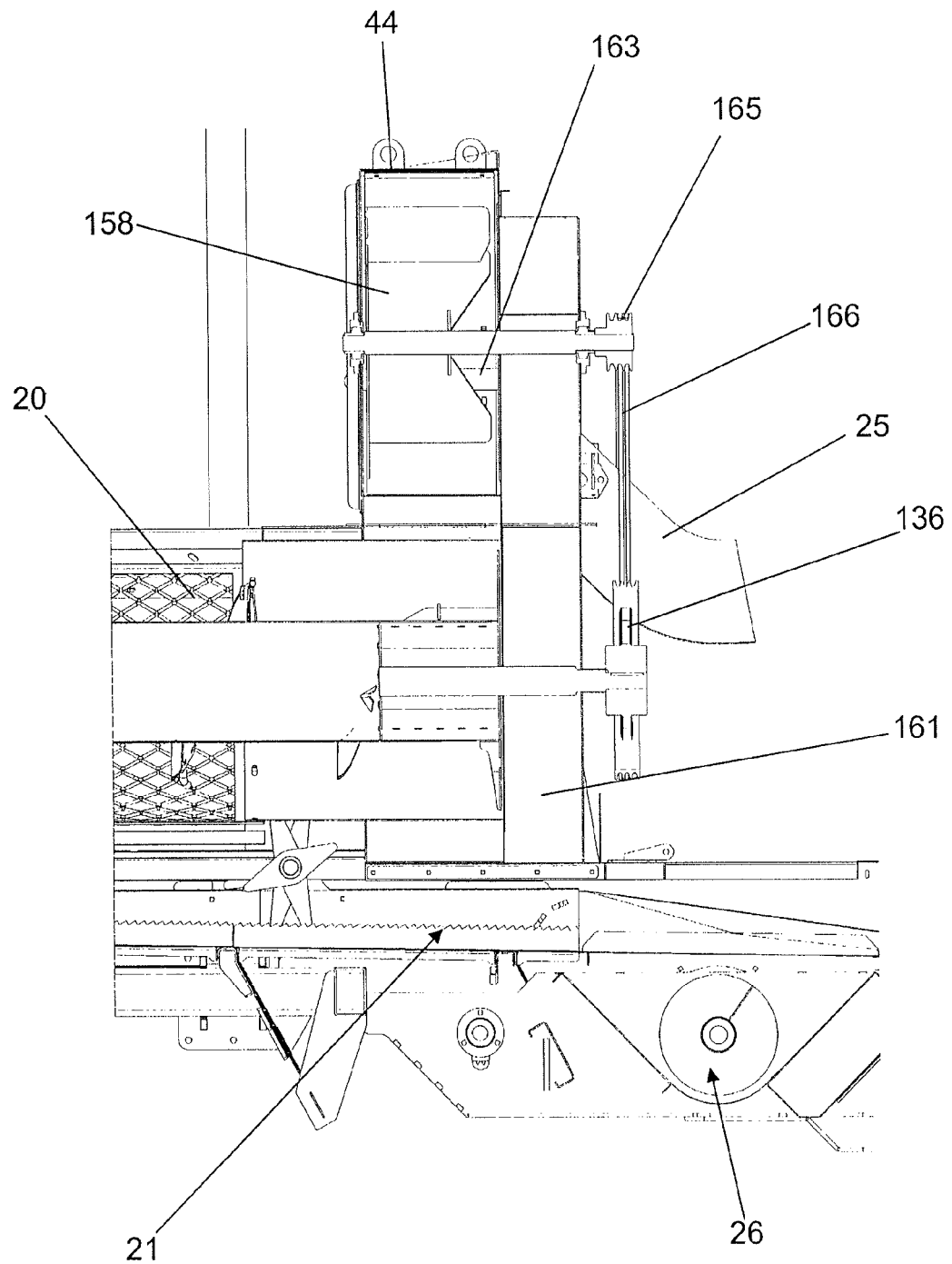
Figure 45:
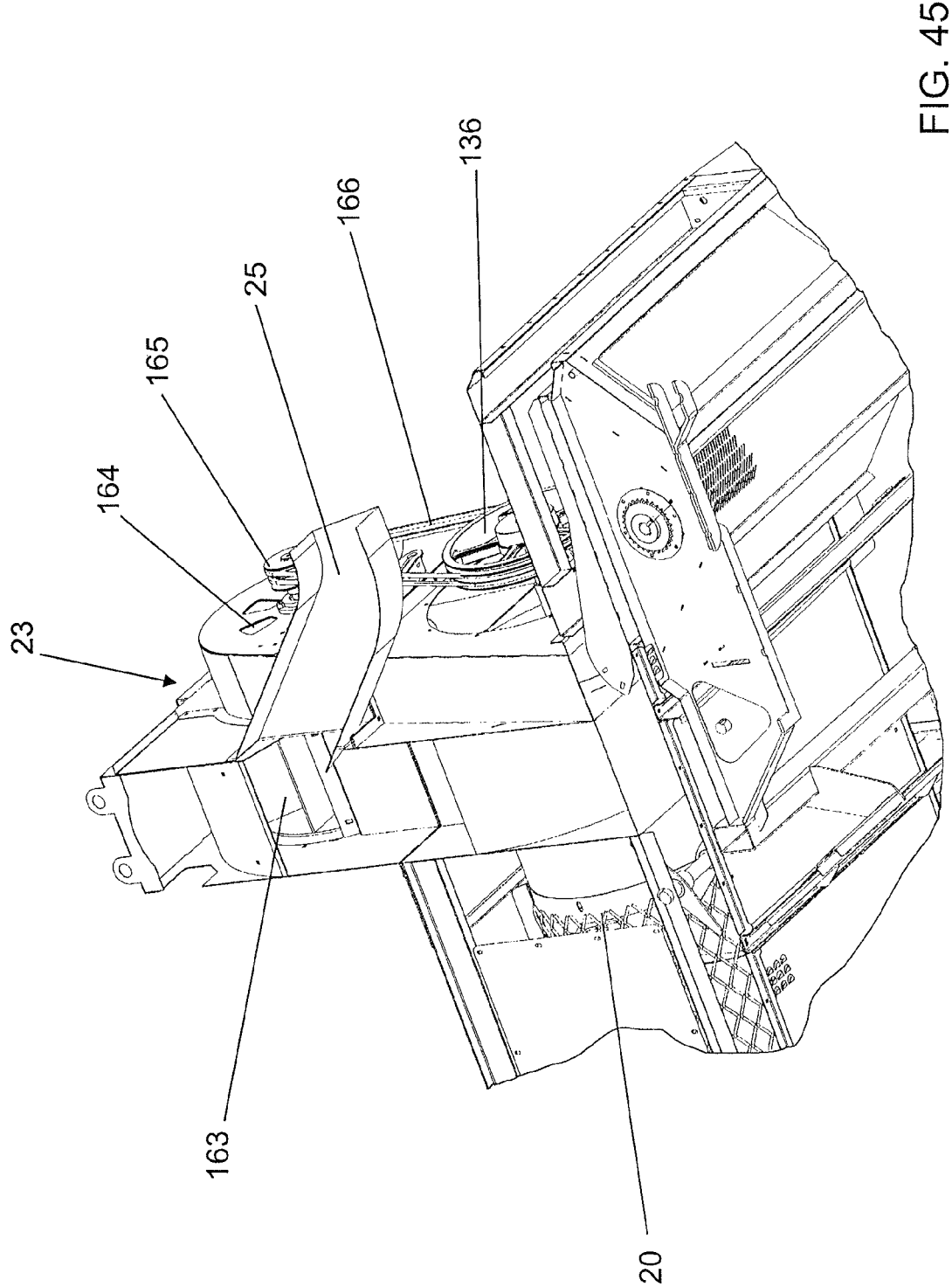
Figure 46:
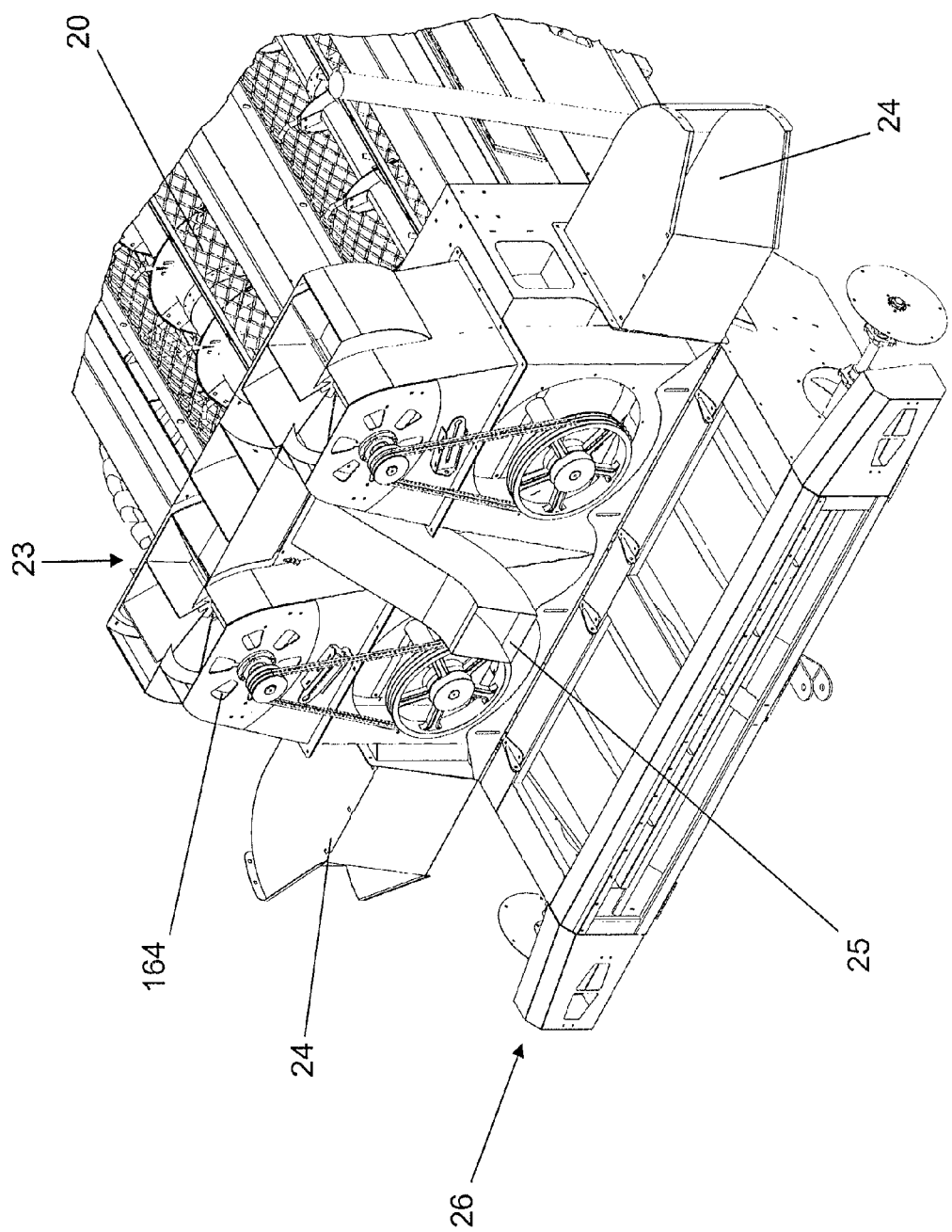
Figure 47:
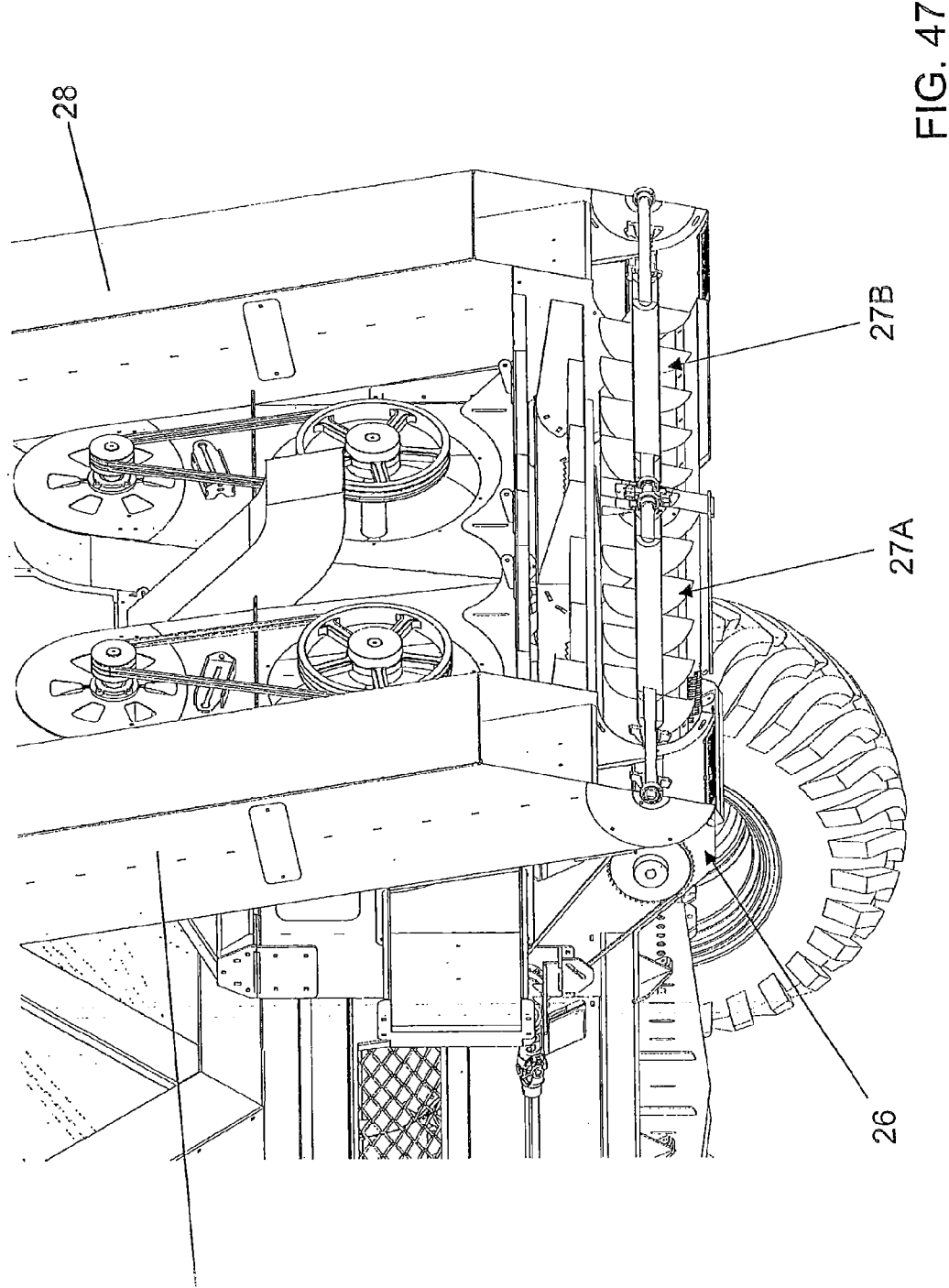
FIGS. 47-51 are perspective views, section views and details focusing on the elevation system of the clean grains to the grain bucket.
Figure 48:
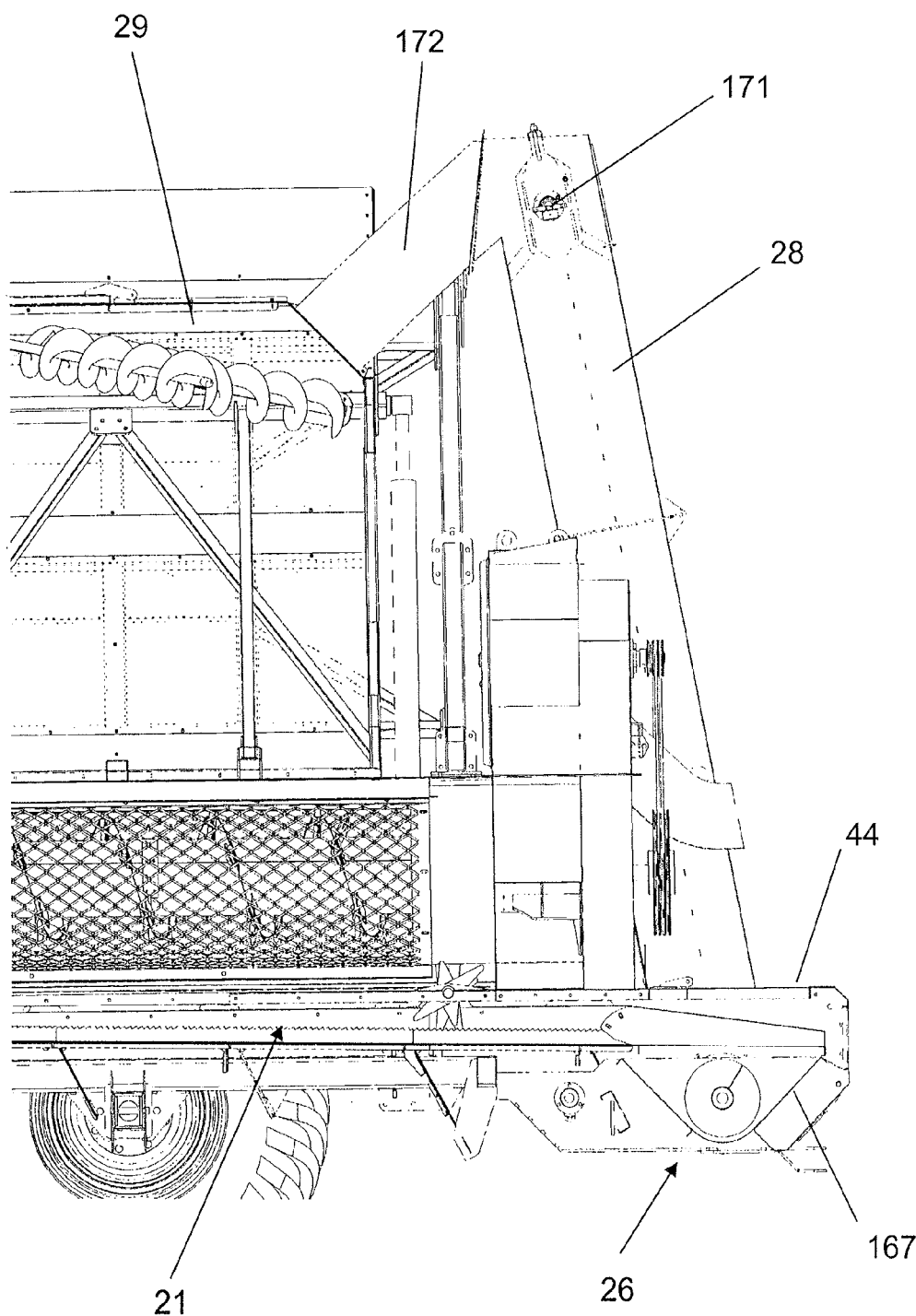
Figure 49:
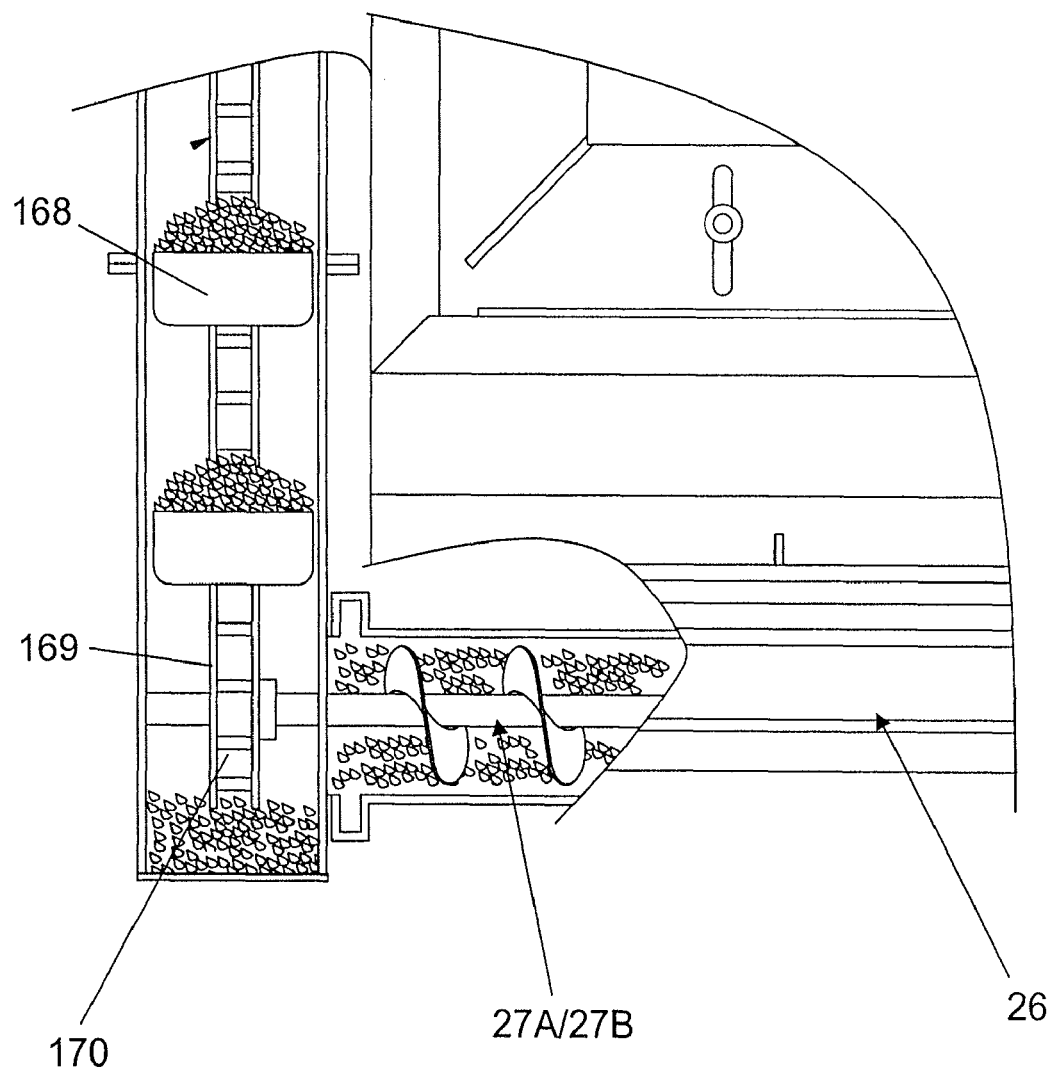

The double ventilation and discharge set (23), such as shown in FIGS. 43-45, is integrated with plate boxes (42-43-44), in which the box (43) houses two ventilators (158), positioned above the end of the beating roller set (20) and vibrating sieve (21), as well as each section (43) of the ventilator (158) has an internal and vertical division (159) followed by another external one (160), both of which are transversal, forming an ascending duct (161), whose lower mouth is positioned on the end of the vibrating sieve (21), so that an ascending flow of aspiration may be obtained, which, through the opening (162), configures a passageway for aspiration of the thin straw existing at the end of the vibrating sieve (21), this ascending flow is unified between the two ventilators (158) through passageways (163), which are unified to configure an outlet of thin straw (25) and, furthermore, this air flow may be regulated in relation with the pressure and speed through the false air inlet defined by obturator openings (164) and, finally, each ventilator (158) has its axis equipped with a pulley (165) which, by means of belts (166), are coupled with the pulleys (136) of the beating rollers (20), which thereby takes advantage from the takeoff of the same to also make the ventilators to takeoff (158).

Figure 50:
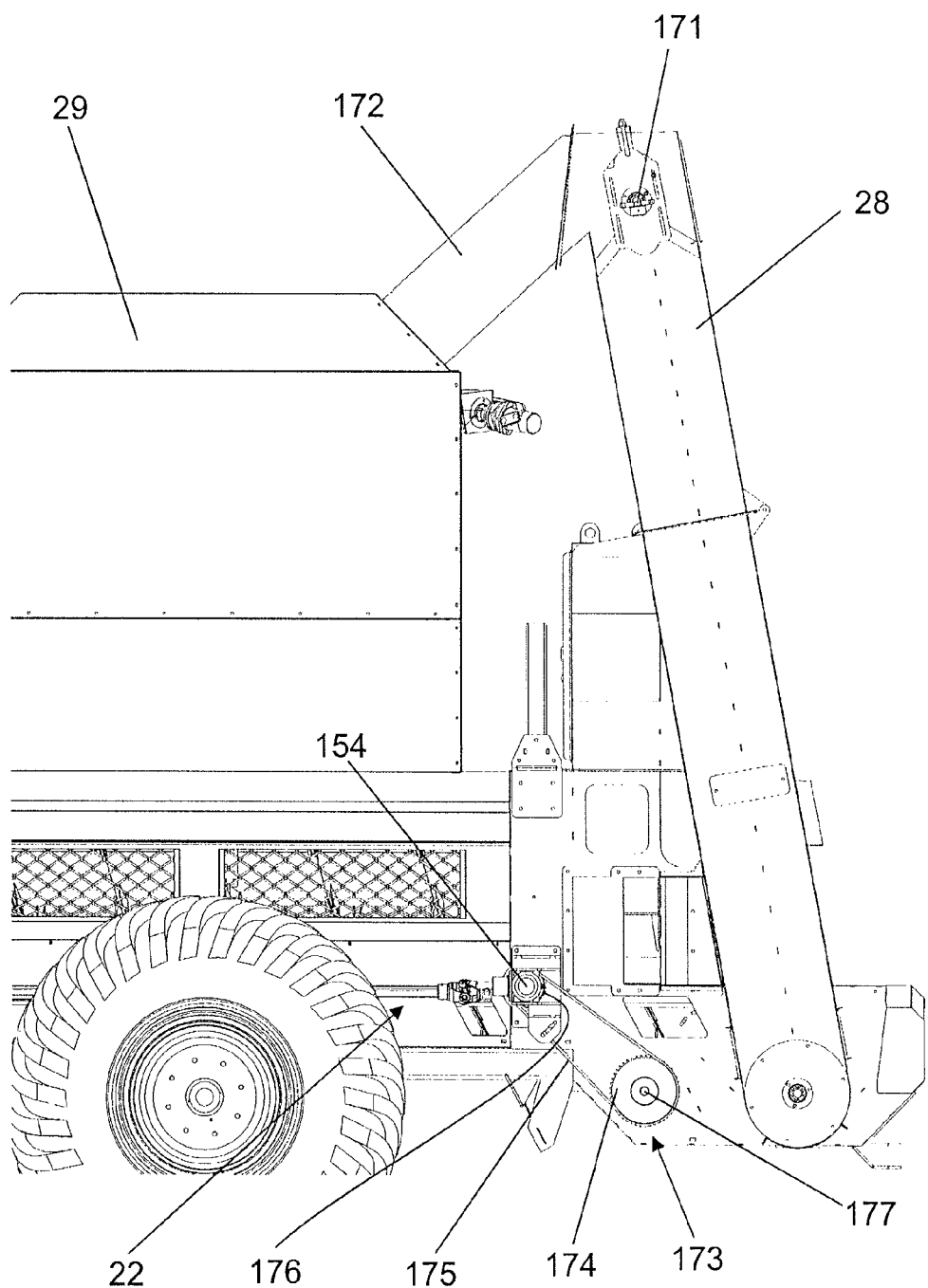
Figure 51:
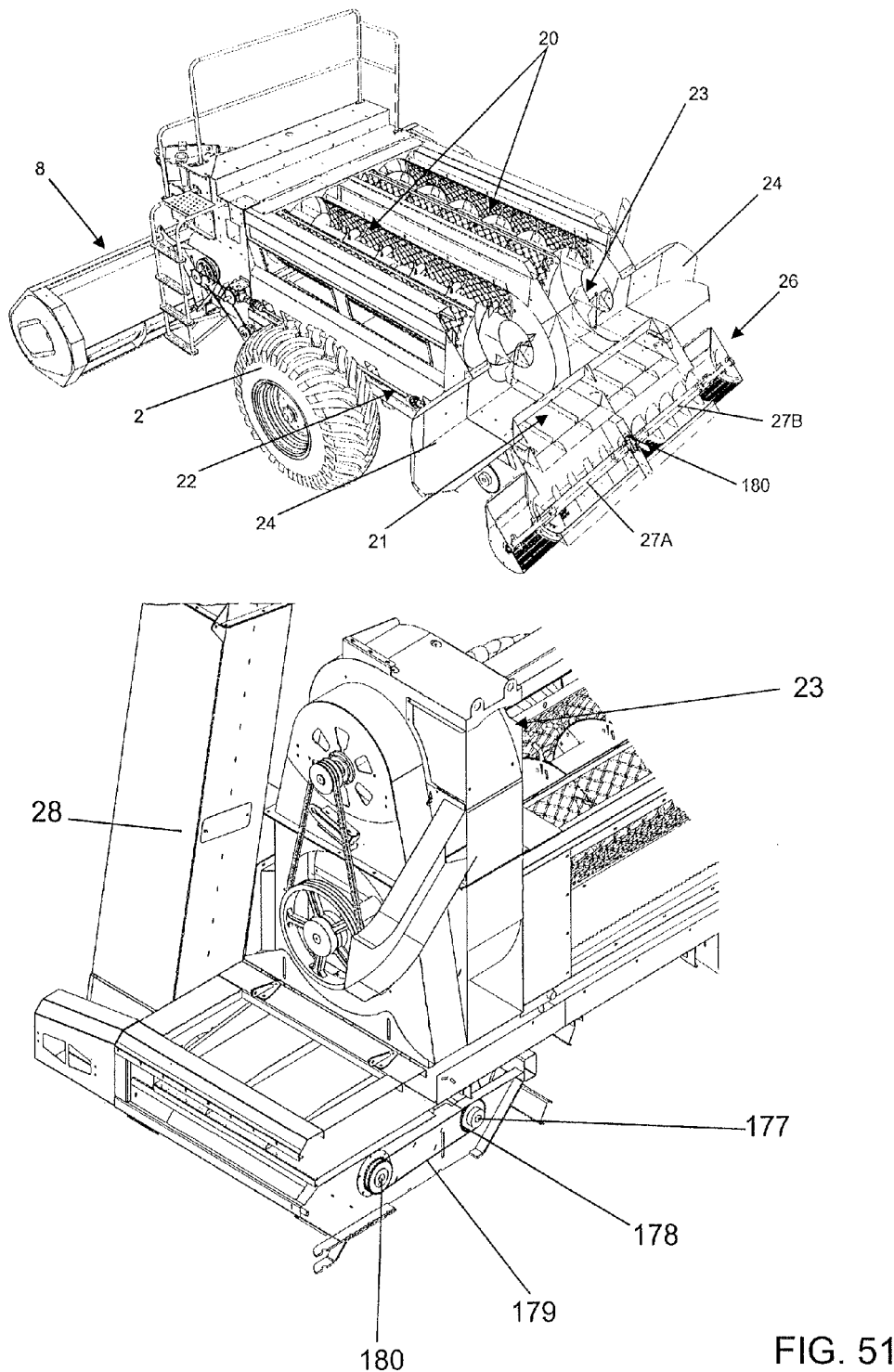

The gathering channel set of clean grains (26) and the corresponding double horizontal transportation set (27A-27B) are illustrated in details in the FIGS. 47-51, by which it is noted that the same (FIGS. 47 and 48) is formed by a V-shaped channel/sieve (167), transversally mounted inside that box-shaped projection (44), this channel being positioned on the end of the vibrating sieve (21), as well as the two transportation threads (27A-27B) lodges inside it, which rotates and have their threads provided for moving the grains from the central portion to the edges of the channel (167), wherein the vertical transportation elevators (28) for clean grains are placed, one at each side, (FIG. 49), internally provided with transporting mugs (168) that are moved by adequate chain (169) coupled with toothed wheel (170) existing in the axis of the sets (27A-27B), which also occurs in the top portion (171), wherein each elevator is projected forwards in inclined ducts (172) that run inside the grain bucket (29) and, furthermore, such as shown in FIGS. 50 and 51, the transportation threads (27A-27B) and the vertical elevators (28) are rotated by a side transmission (173) and the corresponding gear (174) which, in turn, through the chain (175), is coupled with other gear (176) mounted on the axis of the transmission box (154) of the spreading set (22), said gear (174) being fixed to the edge of an axis (177) which transversally develops until the central portion of the machine, wherein its edge receives other gear (178) which, by means of chain (179), is coupled with a gear (180) coupled at the joining point of the transportation threads (27A-27B) in the center of the machine.

Figure 52:
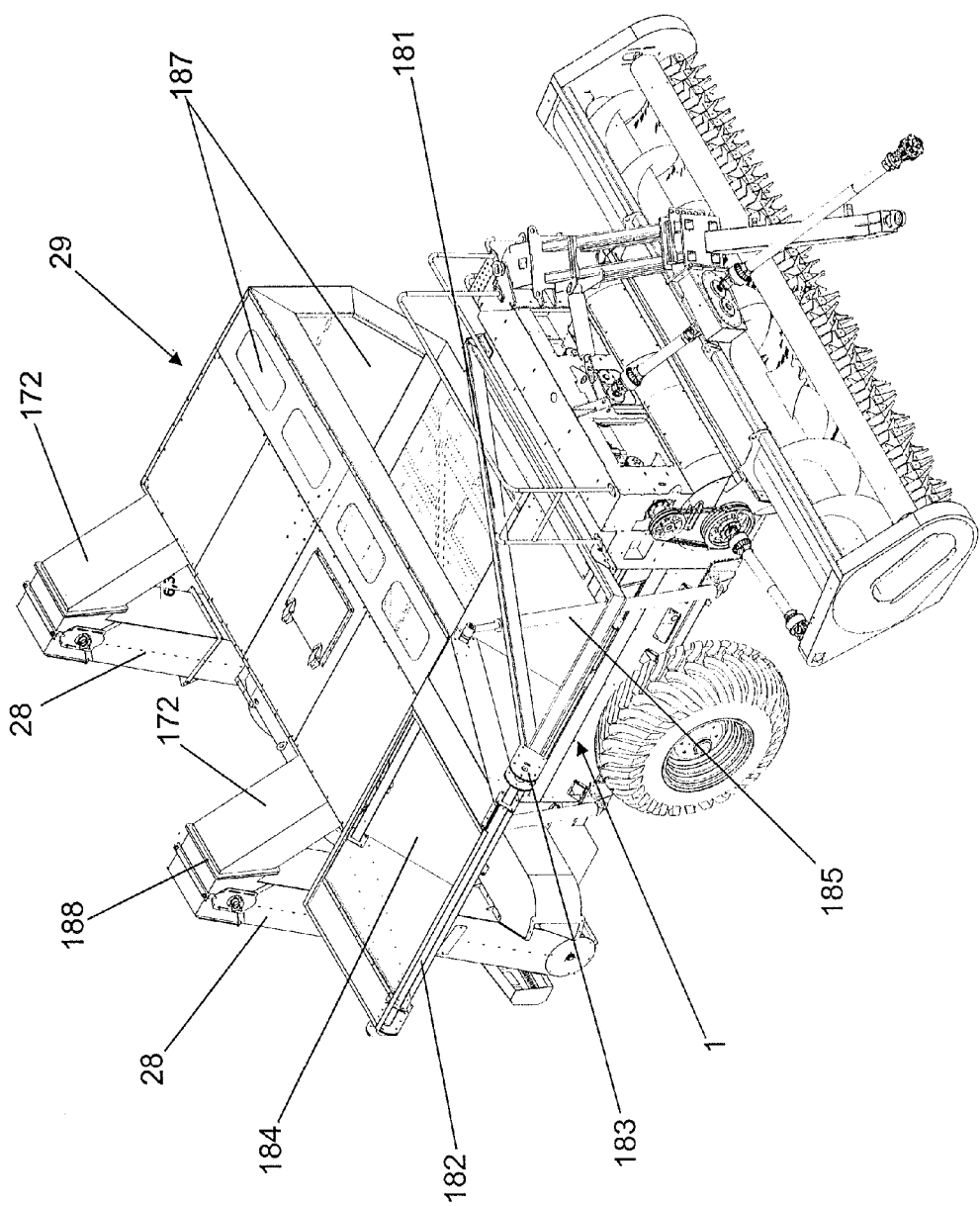
FIGS. 52-54 are perspective views detailing the grain bucket.
Figure 53:
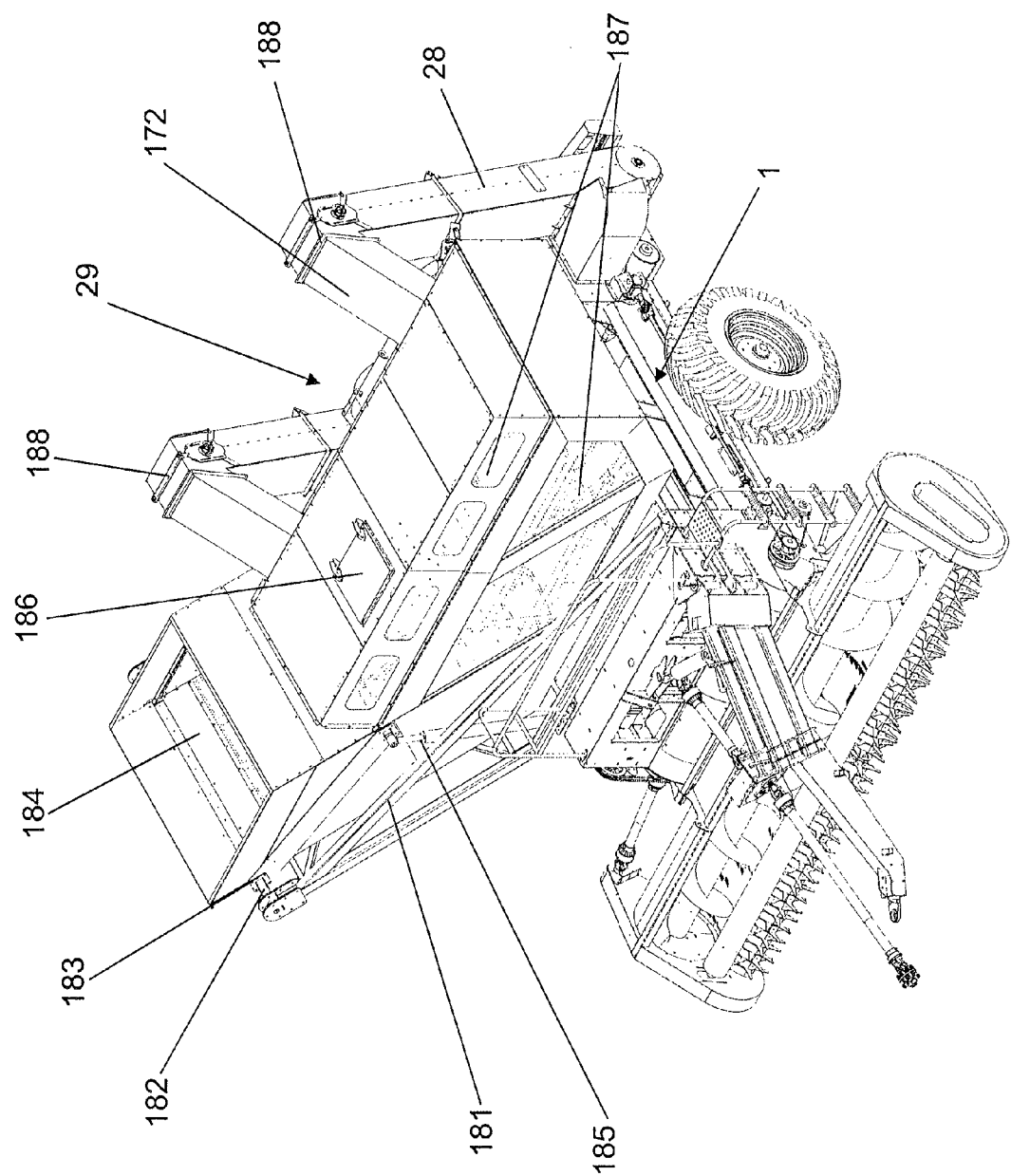

The grain bucket (29) is illustrated in details in the FIGS. 52 and 53, by which it is noted that the same comprises an assembling structure in the shape of triangular racks (181), one of which is anterior and another, posterior, appropriately fixed on the structure (1), wherein one of the vertexes of said racks runs outwards from the right side of the machine, where said vertexes are interconnected by an axis (182) and, on the latter, the grain bucket (29) is jointly coupled (183) and, at this same fixation point, said bucket includes a discharge mouth (184), which is slightly higher and integrates in an inclined shape with the side corresponding to the referred to bucket which, furthermore, includes two hydraulic cylinders (185), one of which is anterior and the other, posterior, to rise said bucket, which, finally, includes a top hatchway (186), anterior openings for internal views (187) and those inclined ducts (172), which only meet with the elevators (28) through an approximation joint (188).

Figure 54:
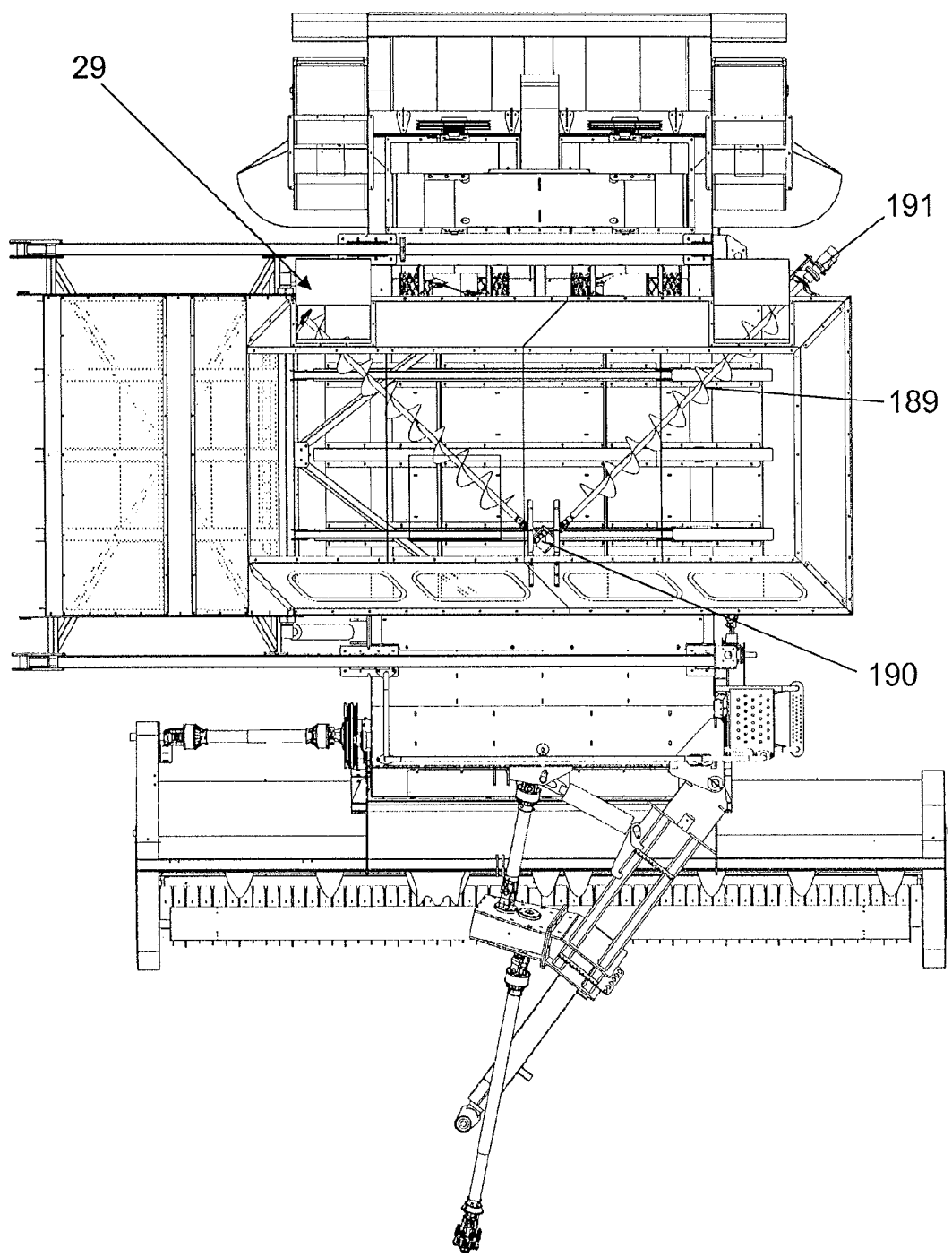
Figure 55:
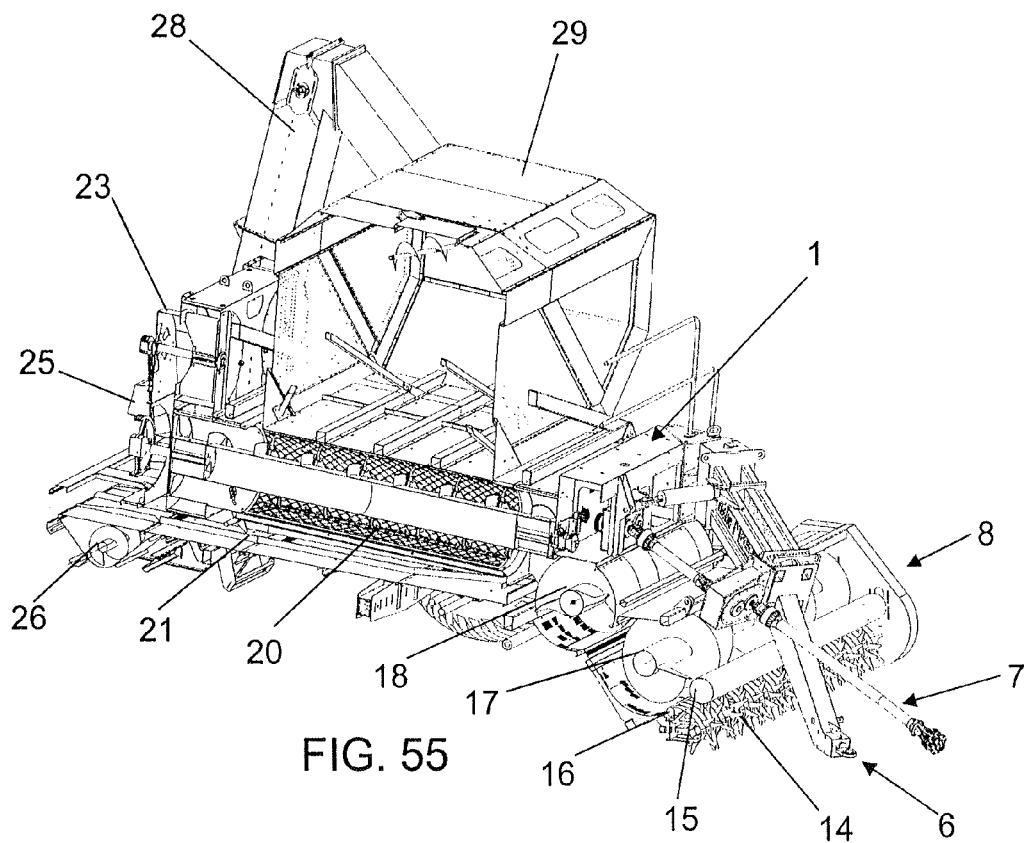
FIGS. 55 and 56 are perspective views to elucidate the description of the machine running.
Figure 56:
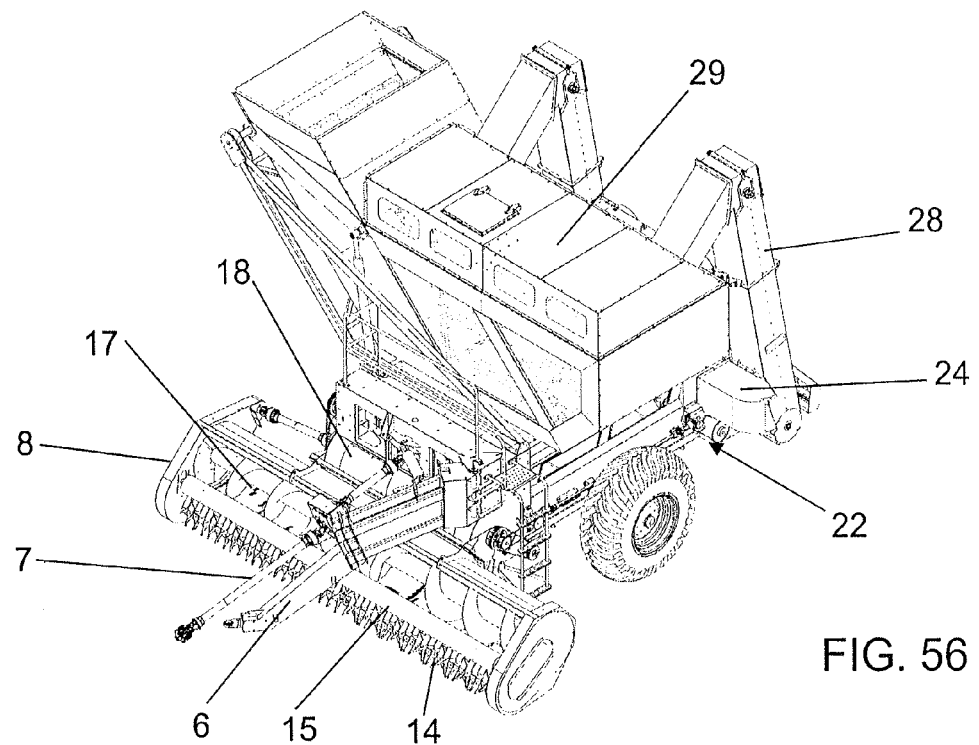

As FIG. 54 illustrates, for a better distribution of the load inside the grain bucket (29), two V-shaped spreading threads are placed (189), coupled with each other by a transmission box (190), one of which also includes the takeoff by hydraulic engine (191). In this condition, the accumulated load inside said bucket is dispersed, thereby avoiding the accumulation in the central portion thereof.

The operation of the agricultural implement in reference is really very easy since, as it has been said already, it is classified as a trailered type, consequently, it is capable of working with a conventional tractor power socket and, for such purpose, a universal coupling is provided, defined by the shaft (6) and takeoff system (7) to be coupled with the tractor power socket. This takeoff, by means of synchronization and various transmission boxes, allows the simultaneous takeoff of all parts of the machine, which still includes hydraulic components that are also coupled with the tractor hydraulic system, fitting all the set to be put in motion by an operator only, who handles the tractor. All the equipment has been developed to have a double width, that is, it allows to collect numerous plants, such as bean, peanut and other grain plants, these plants being previously plucked and aligned, whereas the second function is carrying out a whole cleaning process by separating the grain (seeds) from the remaining unwanted parts. Simultaneously with the displacement of the set over the aligned material, the double gathering set (14) is rotating, which cooperates to grip and rise two plant alignments and driven them upwards and backwards, a guiding cylinder (15) being placed on the double gathering roller, which rotates in the opposite direction and cooperates to keep or to guide the displacement of the branches backwards, wherein another equally even posterior roller (16), with a smaller diameter however, has a similar function of guiding said branches so that the same may be received by the joining roller (17), wherein the material is concentrated at the central portion of the machine and, afterwards, it is thrown backwards by the joining roller (17) and towards the distributing roller (18) which, in turn, is also transversally mounted in the initial portion of the structure (1), wherein said roller (18) divides the material flow into two uniform flows and throws them backwards inside two beating cylinder sets (20), which cooperate to separate the grains from the unwanted remainders, however, minor grains and particles drop on a wide set of vibrating sieve (21), which are positioned on said beating cylinders (20), so that, on said sieve, the grains and other light particles (thin straw) may be retained, whereas particles such as land and sand, smaller than said grains, drop free directly to ground. In this same portion, the spreading set (22) arranges the material on the vibrating sieve (21), avoiding that the same is abnormally accumulated. The beating cylinders (20) separate grains and particles smaller than the same (thin straw) and retain the heavier and bulkier material, mainly leaves, branches and others (thick straw), displacing them backwards, wherein said beating cylinders run inside a double ventilation and discharge set (23), whose lower portion has side outlets for thick straw (24) and, in the central portion, includes an outlet for thin straw (25) and, furthermore, under such set, the posterior portion of the vibrating sieve set (21) also runs, so that all of its transversal border may be over a transversal set defined as gathering channel of clean grains (26) and the corresponding double horizontal transportation set, the latter two rotate in reverse directions and cooperate for the clean grains to be displaced from the center to the side of the machine into two different flows and uniformly divided, concentrating the clean grains in the edges of the gathering channel (26), wherein they are positioned on ascending tunnels slightly inclined backwards, one at each side, which constitute vertical transportation elevators (28) for the clean grains, these elevators having top edges that run inside the top portion of a grain bucket (29), wherein the entirely clean grains are stored for a later discharge by inclination of said grain bucket (29).

The invention claimed is:
1. A grain reaper comprising:
A) a box-shaped structural housing having an anterior portion and a posterior portion;
B) a wheel set mounted to a lower surface of said structural housing;
C) a passageway mounted to said anterior portion of said structural housing, said access walkway having a handrail and a side stair;
D) a coupling shaft mounted to said anterior portion of said structural housing and extending outwardly from said anterior portion of said structural housing, said coupling shaft having an internal first cardan takeoff, said coupling shaft adapted to couple the grain reaper to a tractor;
E) a double gathering set, said double gathering set mounted in a support structure and comprising
 i) an anterior portion,
 ii) a posterior portion,
 iii) a first box shaped side portion,
 iv) a second box shaped side portion,
 v) a gathering roller adapted to rotate clockwise and gather plant materials upwardly and backwardly into said double gathering set, said gathering roller having a first cylindrical end, a transversely extending square tube, and a second cylindrical end, said first cylindrical end and said second cylindrical end adapted to rotatably mount said gathering roller in said first box shaped side portion and said second box shaped side portion of said double gathering set, said square tube having a plurality of equidistantly distributed discs, said plurality of discs having a plurality of radially extending triangular plates, each disc having a centrally located toothed hole adapted such that the disc can be mounted on said square tube in a variety of angular positions, said plurality of discs spaced along said square tube by a plurality of c-shaped plate strips, each of said c-shaped strips having a perpendicular supplemental wall, each of said c-shaped strips fixed to said anterior portion of said support structure of said double gathering set, said plurality of c-shaped strips adapted to guide gathered plant material backwards in a sliding movement,
 vi) a transversely extending guiding roller located adjacent and directly above said gathering roller and adapted to rotate counterclockwise and guide upward and backward displacement of plant materials,
 vii) a transversely extending posterior roller located adjacent and posterior to said gathering roller having a smaller diameter than said gathering roller and adapted to guide upward and backward displacement of plant materials,
 viii) a transversely extending joining roller adapted to collect gathered plant materials in a central portion of said joining roller, and
 ix) at least one power transfer shaft, said at least one power transfer shaft operatively linked to transmit rotational power to said gathering roller, said guiding cylinder, said posterior roller and said joining roller of said double gathering set from said first cardan takeoff;
F) a distributing roller, said distributing roller mounted transversely at said anterior portion of said structural housing posterior to said joining roller and adapted to displace gathered plant materials from said central portion of said joining roller, said distributing roller adapted to rotatably communicate with said first cardan takeoff, said distributing roller adapted to separate gathered plant material into a first stream and a second stream such that said first stream is directed to a first beating roller and said second stream is directed to a second beating roller, said first beating roller and second beating roller mounted parallely and axially within said structural housing, said first beating roller and said second beating roller adapted to separate gathered plant materials into grains and discardable remainders, said first beating roller and said second beating roller each having a vibrating sieve, each vibrating sieve extending in a around said first beating roller and said second beating roller, each vibrating sieve adapted to retain large diameter particles such as grain and plant materials while allowing smaller diameter particles such as dirt to be discarded;
G) a spreading set, said spreading set internally mounted transversally at said posterior portion of said structural housing below said first beating roller and said second beating roller, said spreading set adapted to separate the large diameter particles retained by said vibrating sieve into a stream of heavy material and a stream of lighter material while allowing clean grain to pass through said spreading set to the end of said first beating roller and said second beating roller;
H) a double ventilating and discharge set, said double ventilating and discharge set communicating with said first beating roller and said second beating roller, said double ventilating and discharge set having a first lower outlet adapted to dispose the stream of heavy material and a central outlet adapted to dispose the stream of lighter material; and
I) a gathering channel adapted to communicate clean grain from said first beating roller and said second beating roller to at least one horizontal transporter at least one vertical transportation elevator adapted to transport clean grain from said gathering channel to a grain bucket, said grain bucket located at the top of said structural housing, said grain bucket adapted to store clean grain, said grain bucket having an inclined bottom surface that facilitates collection of clean grain at one side of said inclined bottom of said grain bucket.

2. The grain reaper of claim 1, wherein said structural housing further comprises a square frame constructed of a plurality of square tubes, said square frame having a front edge, a rear edge a first side and a second side, said square frame having a vertical division having an upper edge constructed of a square tube, said square frame having two upwardly projecting closing plates located along each side and having upper edges constructed of square tubes, said square frame having a first and second U-shaped supports, said first U-shaped support located at the midpoint of said first side of said square frame, said second U-shaped support located at the midpoint of said second side of said square frame, said first and second U-shaped support adapted to receive said wheel set, a first bearing support located at the intersection of said front edge and said first side, a second bearing support located as the intersection of said front edge and said second side, a first intermediate support located on said first side between said first bearing support and said first U-shaped support, a second intermediate support located on said second side between said second bearing support and said second U-shaped support, a third intermediate support located on said first side posterior to said first U-shaped support, a fourth intermediate support located on said second side posterior to said second U-shaped support, said square frame having a crossbar assembly downwardly projecting from said rear edge, wherein said intermediate supports and said crossbar assembly are adapted to support said vibrating sieves.

3. The grain reaper of claim 1, wherein the anterior portion of said structural housing further comprises a plate box having a plurality of openings, said plate box having a parallel piped-shaped upper portion and a cylindrically-shaped lower portion, the upper surface of said parallelepiped-shaped upper portion defining said walkway and adapted to receive said stairway at one side, said parallelepiped-shaped upper portion adapted to receive said coupling shaft, said cylindrically-shaped lower portion adapted to receive said at least one power transfer shaft, said cylindrically-shaped lower portion having adjustable fixation for said support structure of said double gathering set.

4. The grain reaper of claim 3, wherein said distributing roller further comprises a first end, a tube shaped central portion, and a second end, said first end and said second end adapted to rotatably mount said distributing roller within said cylindrically-shaped lower portion of said anterior portion of said structural housing, said central portion having a pair of opposed helical threads adapted to divide gathered plant material into two uniform flows distributed to the outer edges of said central portion, each of said opposed helical threads having at least one radially extending throwing grip located at the outer edges of said central portion, said at least one radially extending throwing grip adapted to throw collected plant material into said first beating roller and said second beating roller.

5. The grain reaper of claim 1, wherein said posterior portion of said structural housing further comprises an upper plate box, a median plate box and a lower plate box and a universal coupling, said universal coupling located below said lower plate box, said upper plate box housing said double ventilating, discharge set and said central outlet, said median plate box housing said first lower outlet, said lower plate box housing said gathering channel, wherein said at least one horizontal transportation elevator is affixed to the outer surfaces of said upper plate box, said median plate box and said lower plate box.

6. The grain reaper of claim 5 wherein said double ventilation and discharge set further comprises a first ventilator and a second ventilator, said first ventilator located at the posterior end of said structural housing adjacent and above said first beating cylinder and said second ventilator located at the posterior end of said structural housing adjacent and above said second beating cylinder, said double ventilation and discharge set having a first duct and a second duct, said first duct linking said vibrating sieve with said first ventilator, said second duct linking said second vibrating sieve with said second ventilator, said first duct communicating with said second duct, said first duct and said second duct communicating with said central outlet, said first ventilator rotatably communicating with a first pulley, said second ventilator rotatably communicating with a second pulley, said first pulley rotatably communicating with said first beating roller and said second pulley rotatably communicating with said second beating roller.

7. The grain reaper according to claim 5 wherein said gathering channel further comprises a transversally extending V-shaped channel, said transversally extending channel located at the end of said vibrating sieves, said v-shaped channel having two transportation threads adapted to move grain from the central portion of said v-shaped channel to the outer portions of said v-shaped channel, said at least one vertical transportation elevator located at the outer edge of said v-shaped channel, said at least one vertical transportation elevator having a plurality of transporting mugs operably moved by a chain, said chain communicating with a toothed wheel, said toothed wheel communicating with said two transportation threads, said at least one vertical transportation elevator communicating with an inclined duct, said inclined duct communicating with said grain bucket, said transportational threads operatively linked to said spreading set.

8. The grain reaper of claim 1, wherein said coupling shaft further comprises a central block having four longitudinally extending tubes, said four longitudinally extending tubes projecting from a union plate to a first rectangular plate and a second rectangular plate, a shaft projecting from a third rectangular plate at a first end and having a universal coupling at the second end, said third rectangular plate abutting said second rectangular plate, said first and said third rectangular plate supporting a side plate, said side plate having a first transmission box adapted to receive said first cardan takeoff, said union plate abutting a wedge-shaped transition box, said wedge-shaped transition box receiving a vertical link pin, said vertical link pin coupling said wedge-shaped transition box to a corner stand, said corner stand mounted to a box provided in said anterior portion of said structural housing, said box located at one corner of said anterior portion of said structural housing, said box including a support for a first edge of a hydraulic cylinder, said hydraulic cylinder having a second edge fixed to a support provided on said coupling shaft.

9. The grain reaper of claim 8, wherein said first cardan takeoff further comprises a first anterior section and a second anterior section, said first anterior section having a first end ending in a frictional and universal coupling, said frictional and universal coupling adapted for coupling with a tractor power socket, said first anterior section having a second end coupled with the first transmission box, said first transmission having a first and a second gear, said first gear rotatably communicating with said second gear, said first gear adapted to communicate with said second end of said first anterior section by way of a universal joint, said second anterior section having a first end and a second end, said first end of said anterior section adapted to communicate with said second gear by way of a universal joint, said second end of said anterior section adapted to communicate with a second transmission box, said second transmission box mounted on said anterior portion of said structural housing, said second transmission box adapted to translate rotational power from said first cardan takeoff to a first gear series, said first gear series adapted to communicate with said a second gear series, said second gear series adapted to communicate with a third transmission box, said third transmission box adapted to translate rotational power to said at least one power transfer shaft of said double gathering set.

10. The grain reaper of claim 9, wherein said at least one power transfer shaft communicates with at least one takeoff set located inside at least one of first side box portion and second side box portion, said at least one takeoff set having a first gear rotationally coupled to a second gear, said first gear communicating with said at least one power transfer shaft, said second gear communicating with said joining roller, said joining roller having a first pulley, said first pulley rotationally coupled to a second pulley, said second pulley communicating with said posterior roller, said second gear rotationally coupled to a third gear, said third gear communicating with said guiding roller, said posterior roller having a fourth gear, said fourth gear rotationally coupled to a fifth gear, said fifth gear communicating with said gathering roller.

11. The grain reaper of claim 1, said posterior portion of said double gathering set further comprising a posterior coupling, said posterior coupling adapted to couple said gathering set to said anterior portion of said structural housing, said posterior coupling having a first plate and a second plate, said first plate and said second plate having a rounded vertices, said first plate and said second plate having circular bores located within said rounded vertices, said first plate and said second plate having support legs integrally located in said posterior portion, said anterior portion of said double gathering set having an upwardly concave shape, said anterior portion having a plurality of longitudinally extending ribs located transversely along said anterior portion, said anterior portion having a plurality of plate sieves located between said ribs, said anterior portion adapted to receive said joining roller.

12. The grain reaper of claim 1, wherein said joining roller further comprises a transversely extending central tube, said central tube having capped ends adapted to rotatably mount said joining roller in said double gathering set, said joining roller having a pair of opposed helical threads adapted to displace gathered plant material to the center of said joining roller, said helical threads each having a throwing shovel located at the median portion of said joining roller, said throwing shovels adapted to throw gathered plant material backwards.

13. The grain reaper of claim 1, wherein each of said first beating roller and said second beating roller further comprises a first end and a second end, said first end and said second end adapted to rotatably mount said first beating roller and said second beating roller in said structural housing, a transporting thread extending from said first end to said second end and adapted to move gathered plant material along said first beating roller and said second beating roller, said first end adapted to communicate with said first cardan takeoff, said second end having a pulley, said pulley rotationally coupled to said double ventilating and discharge set, said second end of said beating roller having a throwing shovel adapted to throw gathered plant material into said double ventilating and discharge set.

14. The grain reaper of claim 1 further comprising a rectangular frame, having an anterior end, a posterior end, a first side and a second end, said rectangular frame located within said structural housing, said rectangular frame having a longitudinally dividing top wall located along the axial centre line of said rectangular frame, said rectangular frame having a plurality of plate sieves, said plurality of plate sieves having a plurality of longitudinally extending rulers, said plurality of longitudinally extending rulers having toothed top edges adapted to grip gathered plant material such that said first beating roller and said second beating roller can dislodge particles smaller than grains from said gathered plant materials, the dislodged particles falling through said plate sieves, said plate sieves adapted to vibrate the grains to said posterior end of said rectangular frame.

15. The grain reaper of claim 14 wherein said rectangular frame is fluctuantly fixed to said structural housing, said rectangular frame having a first spring fixed to said first side and a second spring fixed to said second side, said first side having a longitudinally extending structural beam, said second side having a second transversely extending structural beam, said first spring and said second spring affixed to said structural housing, said anterior end of said rectangular frame mounted to a vibrating set, said vibrating set having a first eccentric bearing, a transversal axis, a second eccentric bearing, said first eccentric bearing and said second eccentric bearing constituting vibrating arms, said vibrating arms coupled to supports mounted to said anterior portion of said rectangular frame.

16. The grain reaper of claim 15 wherein said spreading set further comprises a transmission system, said transmission system comprising a first transmission box, a second cardan takeoff, a second transmission box, said first transmission box communicating with a first gear, said first gear rotationally coupled to a second gear, said second gear communicating with said spreading set, said second transmission box communicating with a third gear, said third gear rotatably coupled to a fourth gear, said fourth gear communicating with a first pulley, said first pulley rotatably coupled to a second pulley, said second pulley communicating with said transversal axis of said vibrating set, said spreading set having a shaft, said shaft including a plurality of helical elements, said helical elements adapted to uniformly distribute accumulated grain particles at said posterior end of said rectangular frame.

17. The grain reaper of claim 1, wherein said grain bucket further comprises a first triangular rack and a second triangular rack, said first triangular rack mounted at the anterior portion of said supporting structure, said second triangular rack mounted at the posterior portion of said supporting structure, said first triangular rack connected to said second triangular rack by way of an axis, said grain bucket jointly coupled to said axis, said grain bucket having a discharge mouth, said grain bucket having a first hydraulic cylinder and a second hydraulic cylinder, said first hydraulic cylinder and said second hydraulic cylinder adapted to raise said grain bucket.

18. The grain reaper of claim 17, wherein said grain bucket further comprises a first v-shaped spreading thread and a second v-shaped spreading thread, said first v-shaped spreading thread coupled to said second v-shaped spreading thread by way of a transmission box, one of said first v-shaped spreading thread and said second v-shaped spreading thread operably linked to a hydraulic engine.

* * * * *